United States Patent
Toyoda et al.

(10) Patent No.: US 6,507,415 B1
(45) Date of Patent: Jan. 14, 2003

(54) IMAGE PROCESSING DEVICE AND IMAGE PROCESSING METHOD

(75) Inventors: Masanori Toyoda, Osaka (JP); Akihiko Iwasaki, Nara (JP); Atsushi Narukawa, Yamatokoriyama (JP); Yoshiyuki Nakai, Nara (JP); Masakiyo Okuda, Ikoma-gun (JP); Takeshi Murakami, Hirakata (JP); Takashi Nishimachi, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/182,275

(22) Filed: Oct. 29, 1998

(30) Foreign Application Priority Data

Oct. 29, 1997 (JP) .............................................. 9-297478
Feb. 18, 1998 (JP) ............................................ 10036422

(51) Int. Cl.[7] .............................................. H04N 1/387
(52) U.S. Cl. ....................................... 358/450; 382/284
(58) Field of Search ................................. 382/287, 298, 382/284, 217, 199, 218, 305; 358/450, 474, 451

(56) References Cited

U.S. PATENT DOCUMENTS 5,113,252 A * 5/1992 Yoshiko ....................... 358/77
5,465,163 A   11/1995 Yoshihara et al. ........... 358/450
5,940,192 A * 8/1999 Hiroyuki ....................... 358/53

FOREIGN PATENT DOCUMENTS

JP          07131631 A      5/1995

* cited by examiner

Primary Examiner—Jerome Grant, II
Assistant Examiner—Negussie Worku
(74) Attorney, Agent, or Firm—Dike, Bronstein, Roberts & Cushman IP Group Edwards & Angell, LLP; David G. Conlin; George W. Hartnell, III

(57) ABSTRACT

An image processing device includes a scanner, which reads a plurality of images and inputs them as multivalue digital image data; a matching data producing section which, based on the inputted multivalue image data, produces matching data for joining the respective inputted images; a post-processing section, which binarizes the image data of each image inputted by the scanner; a joining section, which synthesizes the respective inputted images into a single image by joining the binary data produced by the post-processing section, which corresponds to the image data of the respective inputted images, on the basis of the matching data produced by the matching data producing section; and a printer for outputting the image joined by the joining section. Thus an image processing device can be provided which is capable of joining any type of image, whether from written characters, halftone dot, or photographic originals, and of performing this joining processing at high speed.

42 Claims, 37 Drawing Sheets

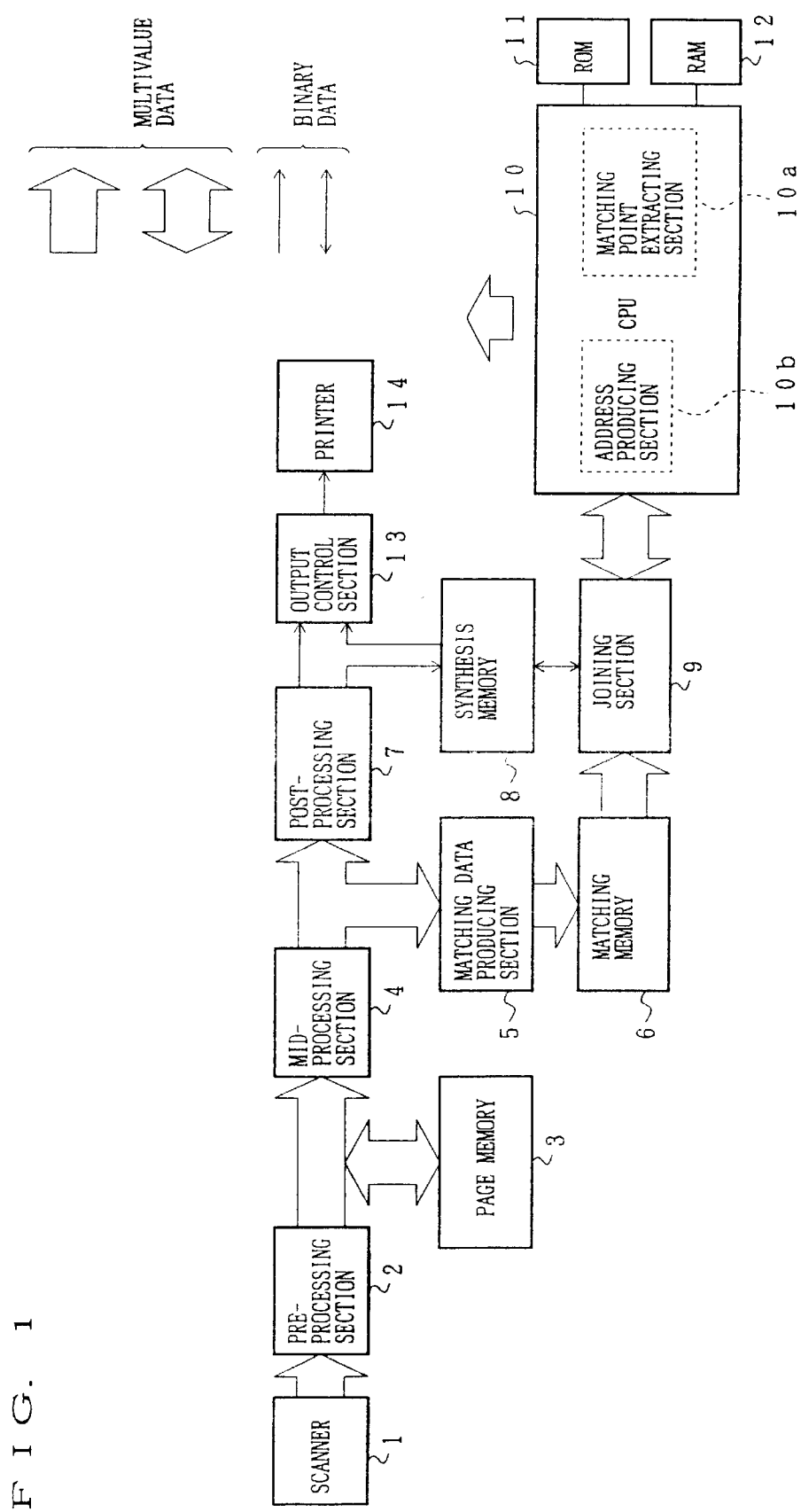

S IS PIXEL IN QUESTION

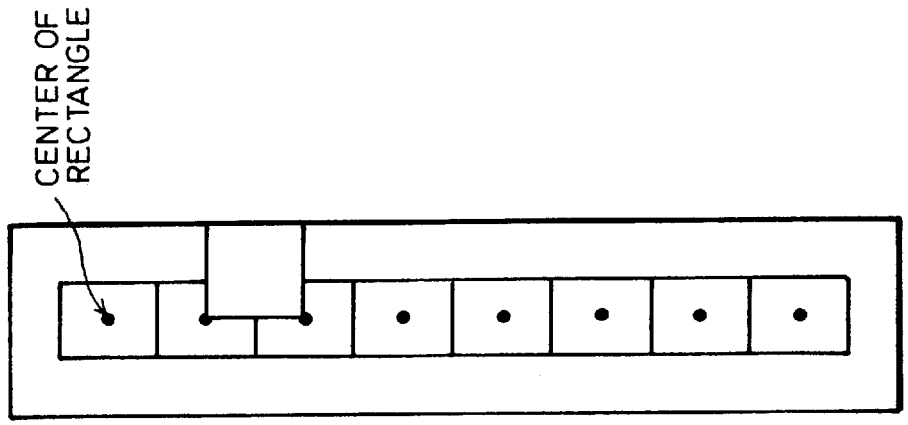
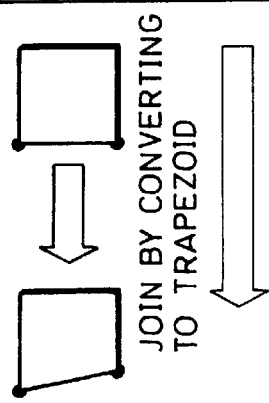
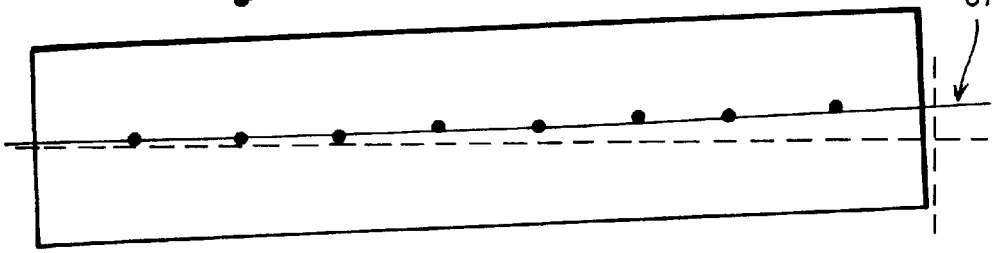
FIG. 11

FIG. 22(a)
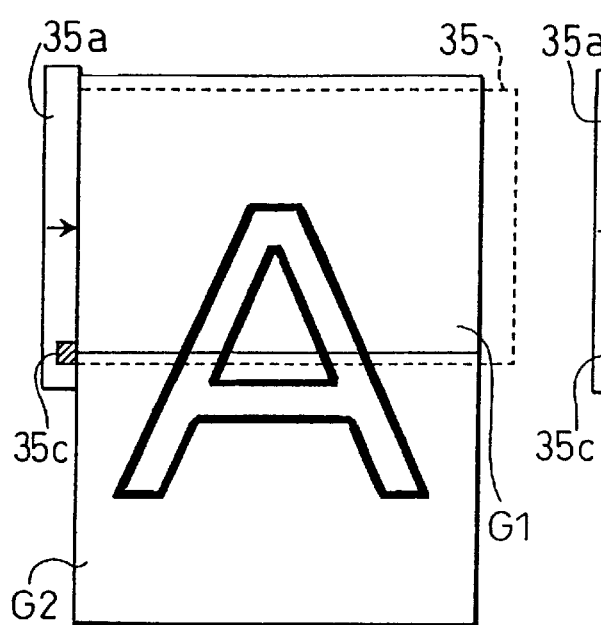
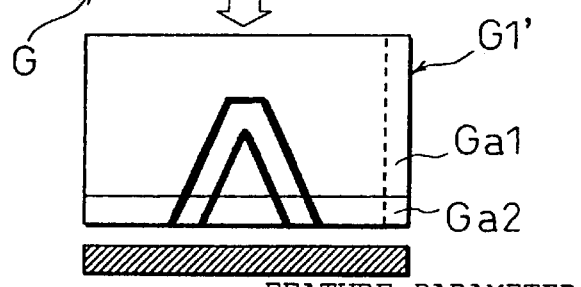
180° ROTATION
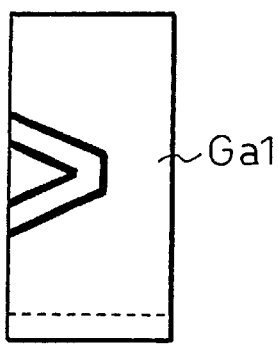
90° ROTATION
FIG. 22(b)
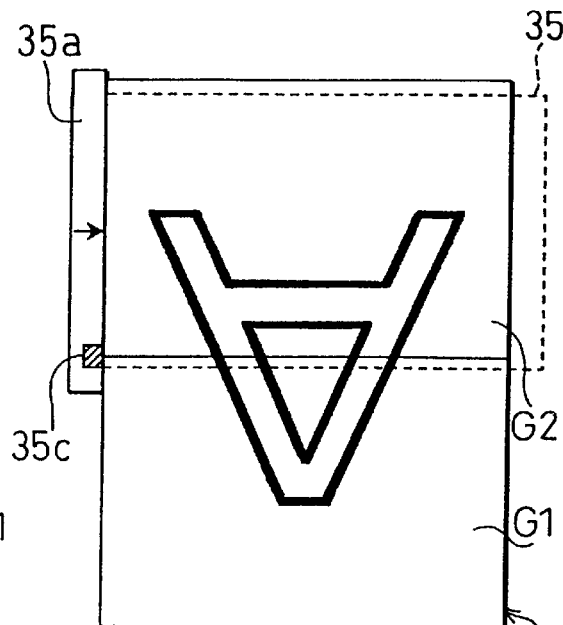
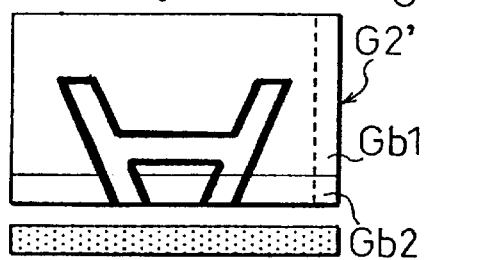
0° ROTATION
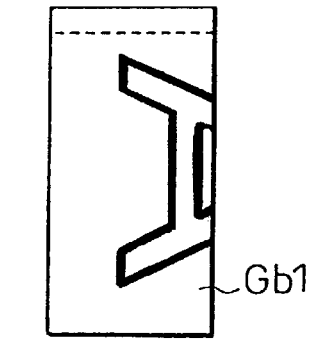
270° ROTATION

270° ROTATION

FIG.25(a)
FIG.25(b)
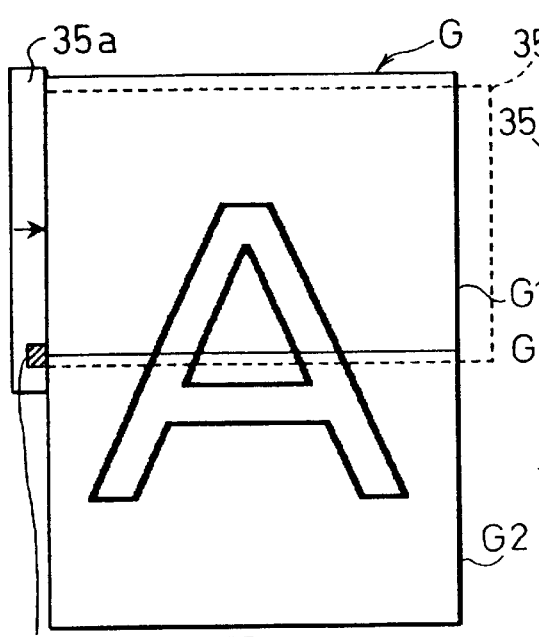
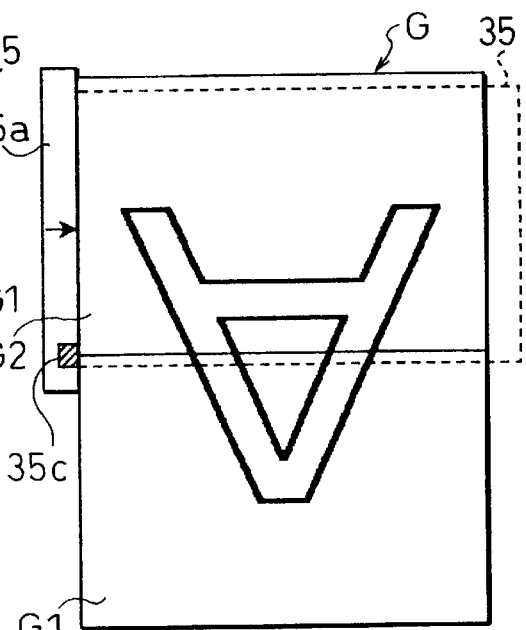
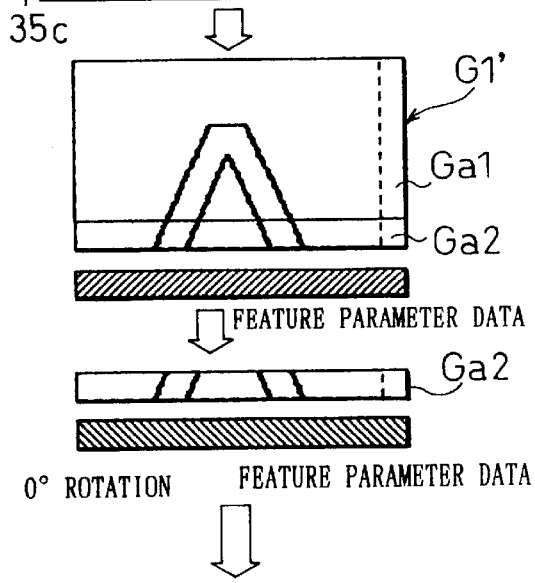
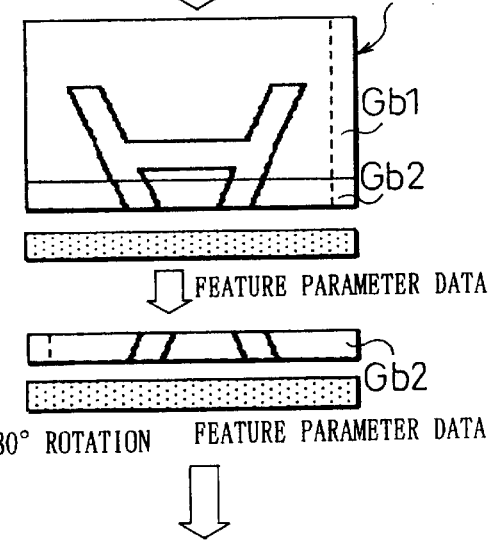
FEATURE PARAMETER DATA
FEATURE PARAMETER DATA
0° ROTATION    FEATURE PARAMETER DATA
180° ROTATION    FEATURE PARAMETER DATA
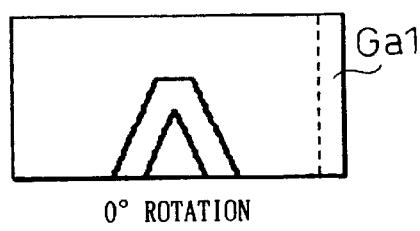
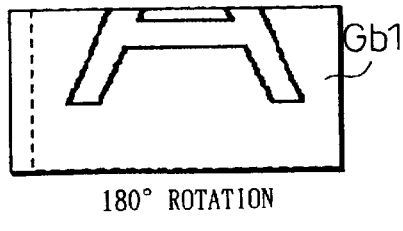
0° ROTATION
180° ROTATION FIG. 27(a)
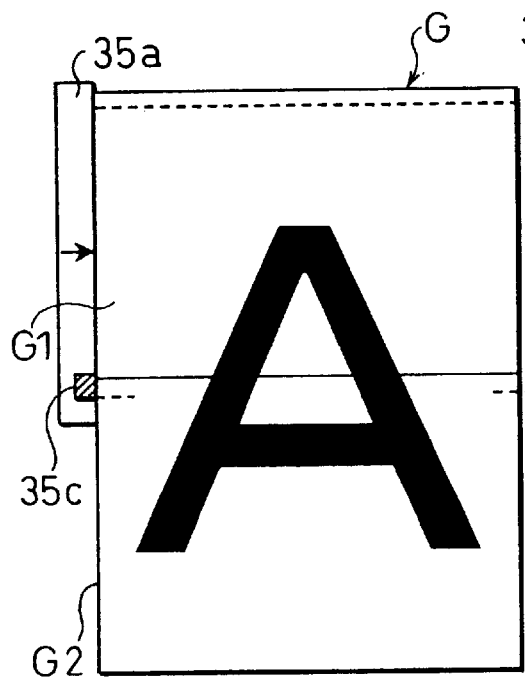
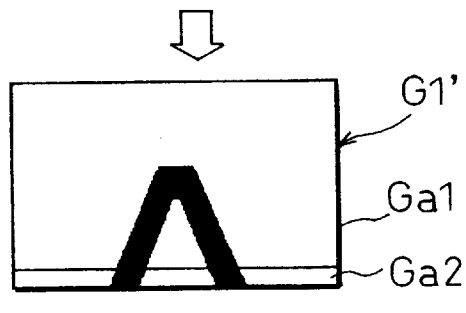
FEATURE PARAMETER DATA
180° ROTATION
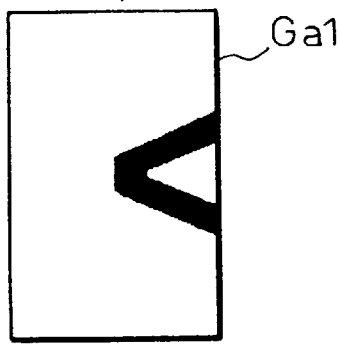
270° ROTATION
FIG. 27(b)
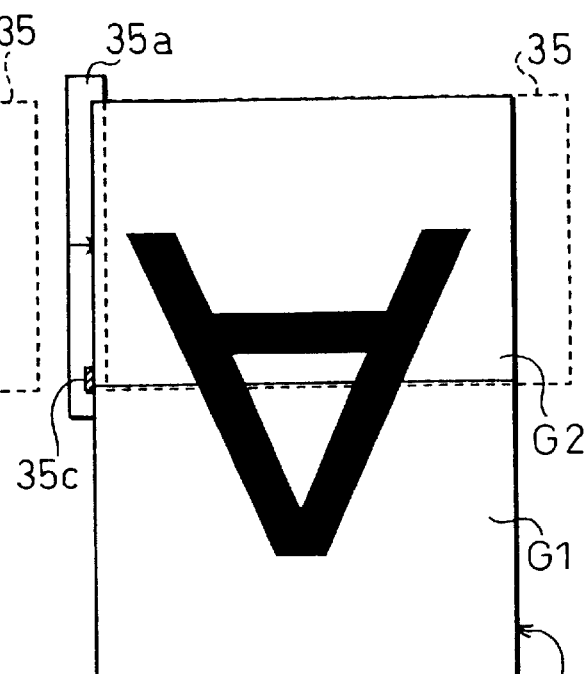
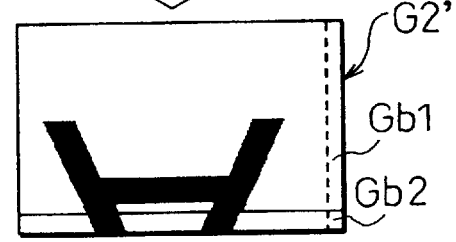
FEATURE PARAMETER DATA
0° ROTATION
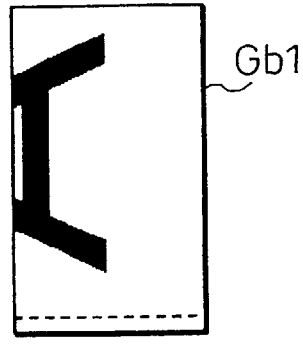
90° ROTATION

REDUCTION OF ORIGINAL IMAGE
(SIMPLE AVERAGING OF FOUR ADJACENT PIXELS)

IMAGE PROCESSING DEVICE AND IMAGE PROCESSING METHOD

FIELD OF THE INVENTION

The present invention relates to an image processing device and an image processing method, and in particular to an image processing device and an image processing method for inputting a plurality of images, joining the respective images, and outputting a joined image.

BACKGROUND OF THE INVENTION

In image processing devices such as copy machines, facsimiles, etc., a conventional method of reading an original document whose size exceeds the maximum image size readable by the reading device such as a scanner (the scanner size), is to read the original document in at least two scans, join together the partial images and output a joined image from an output device such as a printer.

Specifically, in such an image processing device, after reading the original document which exceeds the scanner size in a plurality of scans, each of which includes domains which overlap with adjacent scans, these overlap domains are detected, and, by performing processing to join the partial images, the original image is recreated and outputted in accordance with the paper size.

An example of an image processing device capable of performing such processing for joining images is the image processing device disclosed in Japanese Unexamined Patent Publication No. 4-314263/1992 (Tokukaihei 4-314263). This image processing device reads partial images of an original document larger than the maximum size readable by the reading device, binarizes the partial images and detects edges thereof, and then performs pattern matching and joins the partial images together.

Further, Japanese Unexamined Patent Publication No. 7-131631/1995 (Tokukaihei 7-131631), for example, discloses a digital copying device provided with an image editing function which enables copying, as a single image, of the image of an original document larger than the maximum size supportable by the original placement stand.

This publication discloses a processing method for joining images, in which the digital copy machine reads the original image in a plurality of scans, and then uses pattern matching processing to recognize features of domains where the different partial original images meet, reduces the partial original images, and recreates them as a single original image.

Since the foregoing conventional image processing devices join images by binarizing the images, extracting edges, and performing pattern matching, the images can be joined provided they are text images of written characters, etc.

However, with halftone dot images or photographic images, even if binarized and differential-processed feature points are used, large areas of the image are similar, and thus the precision of matching is greatly impaired, and it is often impossible to join the images.

Further, digital copy machines which use conventional image joining processing methods have problems such as the following.

For example, an A2-size original placed on the original stand is read in two scans as two partial original images of A3 size.

Then the respective partial original images read as images of A3 size, as well as pattern matching images corresponding to areas where the respective partial original images meet, are temporarily stored in an image memory as image data.

Then, by pattern matching of the pattern matching images corresponding to the areas where the respective partial original images meet, the respective partial original images read as images of A3 size are joined together.

When two partial original images of A3 size are joined together in this way using pattern matching, A3-size image data is processed, and thus all processing, including moving the image data, data transfer, etc., takes a long time.

Further, as mentioned above, the original of A2 size placed on the original stand is read in two scans as two partial original images of A3 size. Thus, the respective partial original images read as images of A3 size, as well as the pattern matching domains corresponding to the areas where the respective partial original images meet, are stored in the memory as a large quantity of image data.

For this reason, the image memory for storing and handling this image data must be of large capacity, and another problem is that a long time is required for transfer of partial original image data and pattern matching images. Therefore, it takes a long time to join the two partial original images of A3 size using pattern matching.

SUMMARY OF THE INVENTION

The present invention was created in order to solve the foregoing problems, and its object is to provide an image processing device and an image processing method which are able to join images with precision and perform joining processing at high speed, regardless of whether the images are written characters, halftone dots, or photographs, and, further, which are able to recreate as a single image an original larger in size than an original placement stand, using as little memory capacity as possible and without requiring a long processing time.

In order to attain the foregoing object, a first image processing device according to the present invention has an input section, which reads a plurality of images and inputs each image as multivalue digital image data; a matching data producing section, which produces matching data for joining the inputted images; a binarizing section, which binarizes the multivalue digital image data inputted by the input section, thus obtaining binary data corresponding to image data of each inputted image; a joining section, which, on the basis of the matching data produced by the matching data producing section, synthesizes the inputted images into a single image by joining the binary data for the respective inputted images, obtained by the binarizing means; and an output section, which outputs the single image synthesized by the joining section; in which the matching data producing section produces the matching data on the basis of the multivalue digital image data inputted by the input section.

With the foregoing structure, since the matching data for joining the images is produced on the basis of the inputted images, and the binarized image data is joined on the basis of the matching data, joining of images can be performed according to the data of the inputted images. Accordingly, even with an original, such as a halftone dot image or photographic image, for which binarizing produces large areas of similar images, the matching data is produced on the basis of the multivalue inputted image data prior to binarizing, and thus matching points necessary for joining images can be accurately extracted. Consequently, images of whatever type can be joined with high precision.

In order to attain the foregoing object, a second image processing device according to the present invention has an original image scanning input section, which inputs an original image as a plurality of partial original images by scanning the original image in a plurality of scans; a matching determining section, which, on the basis of predetermined edge domains of the respective partial original images inputted by the original image scanning input section, determines a matching relationship between the respective partial original images; and an image recreating section, which recreates a single original image from the partial original images on the basis of the matching relationship between the partial original images determined by the matching determining section; in which the matching determining section matches two partial original images using a predetermined edge domain image of one partial original image as a standard, by moving a predetermined edge domain image of the other partial original image in a longitudinal direction of the edge domain, and then, in an area of misalignment created by the movement, adds white image data to the matching relationship between the two partial original images.

With the foregoing structure, two partial original images are matched using a predetermined edge domain image of one of the partial original images as a standard, by moving a predetermined edge domain image of the other partial original image in a longitudinal direction of the edge domain, and then, in an area of misalignment created by the movement, white image data is added to the matching relationship between the two partial original images. Consequently, the image recreating section fills with a white image an area of misalignment created when one image for matching processing is matched to the other image for matching processing.

By this means, a single original image recreated from a large original by joining processing by the image recreating section can be faithfully recreated on paper of a desired size. As a result, black areas such as shadows and areas outside the original, which arise from misalignment of the setting position on the original placement stand at the time of scanning a large original in a plurality of scans, can be prevented from being recreated as black images when the partial original images are recreated as a single original image.

Accordingly, when joining a plurality of partial original images into a single image, the original image can be recreated faithfully and with high quality.

In order to attain the foregoing object, a third image processing device according to the present invention has an original image scanning input section, which inputs an original image as a plurality of partial original images by scanning the original image in a plurality of scans; a first scaling section, which performs reduction/enlargement, at a previously set first scaling rate, of the partial original images inputted by the original image scanning input section; a matching determining section, which, on the basis of predetermined edge domains of each partial original image reduced or enlarged by the first scaling section, determines a matching relationship between the respective partial original images; an image recreating section, which recreates a single original image from the partial original images on the basis of the matching relationship between the partial original images determined by the matching determining section; an indicating section, which indicates a size of the original image recreated by the image recreating section; and a second scaling section, which determines a second scaling rate from the image size indicated by the indicating section and the size of the original image recreated by the image recreating section, and performs reduction/enlargement, at the second scaling rate, of the partial original images inputted by the original image scanning input section.

Alternatively, the third image processing device according to the present invention has an original image scanning input section, which inputs an original image as a plurality of partial original images by scanning the original image in a plurality of scans; a first scaling section, which performs reduction/enlargement, at a previously set first scaling rate, of the partial original images inputted by the original image scanning input section; a matching determining section, which, on the basis of predetermined edge domains of each partial original image reduced or enlarged by the first scaling section, determines a matching relationship between the respective partial original images; an image synthesis section, which synthesizes a single synthesized image from the partial original images on the basis of the matching relationship between the partial original images determined by the matching determining section; an image recreating section, which recreates the original image from the synthesized image; an indicating section, which indicates a size of the original image recreated by the image recreating section; and a second scaling section, which performs reduction/enlargement of the synthesized image synthesized by the image synthesizing section at a second scaling rate, such that the synthesized image is reduced or enlarged to the size indicated by the indicating section.

In the foregoing structures, the original images scanned in a plurality of scans (partial original images) undergo joining processing after reduction or enlargement at a predetermined first scaling rate, and the original image resulting from joining processing then undergoes scaling at a second scaling rate so as to be reduced or enlarged to a predetermined size. Consequently, unlike image processing devices provided with complex pattern matching algorithms corresponding to images of all sizes, the present image processing device need only be provided with the minimum simplified algorithms.

Accordingly, instead of providing an image processing device (a digital copy machine, for example) with the expensive functions of algorithms corresponding to images of all sizes, pattern matching algorithms may be installed in the image processing device as an inexpensive single function, thus avoiding increased costs. Further, since complex algorithms are not used, processing time is shortened, and image output speed need not be reduced for this processing.

Moreover, since the joined image can be stored, recreated, and outputted in a size desired by the user, a large original can be copied onto paper of a desired size.

In order to attain the foregoing object, a fourth image processing device according to the present invention has an original image scanning input section, which inputs an original image as a plurality of partial original images by scanning the original image in a plurality of scans; a matching determining section, which, on the basis of predetermined edge domains of the respective partial original images inputted by the original image scanning input section, determines a matching relationship between the respective partial original images; and an image recreating section, which recreates a single original image from the partial original images on the basis of the matching relationship between the partial original images determined by the matching determining section; in which the matching determining section includes an edge domain image extracting section, which extracts images of predetermined edge domains of the partial original images; a matching processing section, which performs matching processing, in a matrix of predetermined size, of each edge domain image extracted by the edge domain image extracting section; and a directing section, which, during matching processing by the matching processing section, directs the matching processing section to divide the matrix into a first number of areas and perform a first matching processing, and then, based on the results of the first matching processing, to divide the matrix into a second number of areas greater than the first number of areas, and perform a second matching processing.

The foregoing structure is provided with a directing section, which, during matching processing by the matching processing section, directs the matching processing section to divide the matrix into a first number of areas and perform a first matching processing, and then, based on the results of the first matching processing, to divide the matrix into a second number of areas and perform a second matching processing. Thus, the matrix of predetermined size, for confirming matching of two partial original images, is divided into the first number of areas to perform rough confirmation, and then into the second number of areas to perform detailed confirmation.

By this means, processing time for pattern matching of a connecting domain where the two partial original images meet can be shortened, and, as a result, image processing time in the image processing device can be greatly shortened.

In order to attain the foregoing object, a fifth image processing device according to the present invention has an original image scanning input section, which inputs an original image as a plurality of partial original images by scanning the original image in a plurality of scans; a matching determining section, which, on the basis of predetermined edge domains of the respective partial original images inputted by the original image scanning input section, determines a matching relationship between the respective partial original images; and an image recreating section, which recreates a single original image from the partial original images on the basis of the matching relationship between the partial original images determined by the matching determining section; in which the matching determining section includes an edge domain image extracting section, which extracts images of predetermined edge domains of each partial original image; a matching processing section, which performs matching processing, in a matrix of predetermined size, of each edge domain image extracted by the edge domain image extracting section; and a control section, which, during matching of the edge domain images by the matching processing section, performs control such that the image recreating section commences recreating part of a partial original image with a predetermined timing.

The foregoing structure is provided with a control section, which, during matching of edge domain images by the matching processing section, performs control so that the image recreating section commences recreating part of the original image with a predetermined timing. Thus, control is performed so that, for example, during matching of two partial original images, recording of one of the partial original images can be commenced with the predetermined timing of confirmation of matching between the two partial original images.

By this means, in comparison with a case in which the two partial original images are joined by successive recording, the time required for joining the two partial original images and outputting them as a single image can be shortened.

In order to attain the foregoing object, a sixth image processing device according to the present invention has an original image scanning input section, which inputs an original image as a plurality of partial original images by scanning the original image in a plurality of scans; a matching determining section, which, on the basis of predetermined edge domains of the respective partial original images inputted by the original image scanning input section, determines a matching relationship between the respective partial original images; and an image recreating section, which recreates a single original image from the partial original images on the basis of the matching relationship between the partial original images determined by the matching determining section; in which the matching determining section includes a joining section, which joins two partial original images using a predetermined edge domain image of one partial original image as a standard, by moving a predetermined edge domain image of the other partial original image in a longitudinal direction of the edge domain; a misalignment quantity detecting section, which detects a quantity of misalignment between the edge domain image determined by the joining section to be the standard, and the other edge domain image; and an original image shifting/recreating section, which, during recreating of the original image by the image recreating section, shifts one partial original image based on the quantity of misalignment detected by the misalignment quantity detecting section, such that the two partial original images align.

With the foregoing structure, one of the partial original images is consecutively recorded, beginning with one end thereof, with a first timing, and when matching of the two partial original images has been confirmed, if the other partial original image is found to be misaligned, image data thereof is shifted in accordance with the quantity of misalignment so as to adjust the position in which the misaligned partial original image is recreated.

By this means, the time required to join the two partial original images and output them as a single original image can be shortened, and there is no need for processing for shifting the entirety of the misaligned partial original image in the memory in accordance with the quantity of misalignment where the two partial original images meet. Thus, joining processing can be completed in a short time.

In order to attain the foregoing object, an image processing method according to the present invention includes the steps of (a) scanning a plurality of images and inputting each image as multivalue digital image data; (b) producing matching data for joining the respective inputted images; (c) binarizing the multivalue digital image data for each inputted image, producing binary data corresponding to the image data for each inputted image; and (d) synthesizing the inputted images into a single image by joining the binary data corresponding to the respective inputted images on the basis of the matching data; in which, in step (b), the matching data is produced on the basis of the multivalue digital image data inputted in step (a).

In the foregoing method, the matching data for joining the images is produced on the basis of the inputted images, and the binarized image data is joined on the basis of this matching data. Thus, the images can be joined in accordance with the data of the inputted images. Accordingly, even with an original, such as a halftone dot image or photographic image, for which binarizing produces large areas of similar images, the matching data is produced on the basis of the multivalue inputted image data prior to binarizing, and thus matching points necessary for joining images can be accurately extracted from the matching data. Consequently, images of whatever type can be joined with high precision.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 1 is a schematic block diagram of an image processing device according to one embodiment of the present invention.

FIG. 11 is an explanatory drawing showing an example of modification of the pattern matching shown in FIGS. 10(a) and 10(b).

FIGS. 22(a) and 22(b) are explanatory drawings showing processing for joining two images of A3 size to recreate an original image of A2 size, FIG. 22(a) showing the flow of processing for scanning a first domain thereof, and FIG. 22(b) the flow of processing for scanning a second domain thereof.

FIGS. 25(a) and 25(b) are explanatory drawings showing processing for joining two images of A3 size to recreate an original image of A2 size, giving consideration to the orientation of paper onto which the joined image is to be printed, FIG. 25(a) showing the flow of processing for scanning a first domain thereof, and FIG. 25(b) the flow of processing for scanning a second domain thereof.

FIGS. 27(a) and 27(b) are explanatory drawings showing processing for scanning an original document placed on the original placement stand in a misaligned state, FIG. 27(a) showing the flow of processing for scanning a first domain thereof, and FIG. 27(b) the flow of processing for scanning a second domain thereof.

DESCRIPTION OF THE EMBODIMENTS

FIRST EMBODIMENT

Figure 2B:
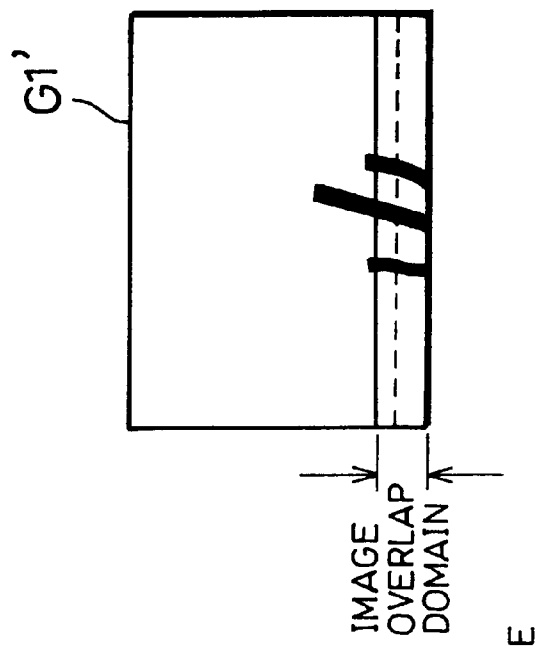
FIGS. 2(a) and 2(b) show reading of an image in the image processing device shown in FIG. 1, FIG. 2(a) being an explanatory drawing showing operations for scanning an original on a scanner, and FIG. 2(b) being an explanatory drawing showing the image scanned by the operations shown in FIG. 2(a).

The following will explain one embodiment of the present invention. The image processing device according to the present invention may be applied to electronic devices such as an image copying device which scans an original and obtains digital image data using a CCD (charge coupled device), A/D (analog to digital) converter, etc., stores the digital image data in a memory, performs predetermined image treatment (image processing), and obtains an image by output through a printer as an output device.

An image processing device according to the present embodiment, as shown in FIG. 1, is made up of a scanner 1 (input means), a pre-processing section 2, a page memory 3 (first memory means), a mid-processing section 4, a matching data producing section 5 (matching data producing means), a matching memory 6 (second memory means), a post-processing section 7 (binarizing means), a synthesizing memory 8 (third memory means), a joining section 9 (joining means), a CPU 10 (joining means), a ROM (Read Only Memory) 11, a RAM (Random Access Memory) 12, an output control section 13, and a printer 14 (output means).

The scanner 1 scans an original image, and sends digitized multivalue image data obtained thereby to the pre-processing section 2.

In the pre-processing section 2, the multivalue image data received from the scanner 1 undergoes pre-processing such as production of white standard data and black standard data, γ correction, and shading correction.

The page memory 3 temporarily stores the multivalue image data pre-processed by the pre-processing section 2.

In the mid-processing section 4, multivalue image data sent from the page memory 3 undergoes mid-processing such as region separation, filtering, and enlargement/reduction.

In the matching data producing section 5, multivalue image data mid-processed by the mid-processing section 4 undergoes matrix processing, in which the data is divided into a plurality of pixel groups using a matrix, and a difference between maximum and minimum values of density or brightness within each pixel group in the matrix is produced as the matching data.

Incidentally, the precision of pattern matching is not influenced by whether matching data is calculated from density or from brightness. However, if brightness is used, a color space conversion device for converting brightness to density is necessary during printing, but such a color space conversion device is unnecessary if density is used.

The matching memory 6 stores matching data produced by the matching data producing section 5.

The post-processing section 7 performs post-processing, such as binarization, of the multivalue image data mid-processed by the mid-processing section 4, and outputs binary image data.

The synthesis memory 8 stores as synthesis data the binary image data obtained by post-processing in the post-processing section 7, and stores joined binary image data on the basis of addresses indicated by the joining section 9.

The joining section 9 performs pattern matching on the basis of the matching data from the matching memory 6, and directs joining of the synthesis data (binary image data) stored in the synthesis memory 8.

The CPU 10 directs the joining section 9 to perform pattern matching, and includes a matching point extracting section 10a, which extracts matching points found for each level (to be discussed below), and an address producing section 10b, which, based on matching point information from the matching point extracting section 10a, indicates to the joining section 9 addresses in the synthesis memory 8 which show the positions of points where binary image data for two images are to be joined.

The joining section 9 and the CPU 10 collectively make up joining means for joining two images.

The ROM 11 stores a main program of the CPU 10, and the RAM 12 is a working memory for the CPU 10, made up of, for example, an SRAM (Static Random Access Memory).

The output control section 13 receives the joined binary image data from the synthesis memory 8, and controls the printer 14, which is output means made up of a laser, output devices, etc.

The printer 14 prints the image data received from the output control section 13 onto an output medium such as copy paper. Incidentally, as output means, a device other than the printer 14, such as a facsimile, etc., may be provided.

An image processing device with the foregoing structure can be applied to copying of originals larger than the maximum size which can be scanned in a single scan by the scanner 1. In other words, the image processing device with the foregoing structure can be switched between an ordinary mode used with originals which fit within the maximum size which can be scanned in a single scan by the scanner 1, and a joining mode used with originals which exceed the maximum size which can be scanned in a single scan by the scanner 1.

In short, in the ordinary mode, image data binarized in the post-processing section 7 shown in FIG. 1 is sent directly to the output control section 13, without passing through the synthesis memory 8.

In the joining mode, however, image data binarized in the post-processing section 7 is sent through the synthesis memory 8 and the joining section 9 for joining processing before being sent to the output control section 13.

The following will explain the joining mode in the present embodiment.

Figure 2A:
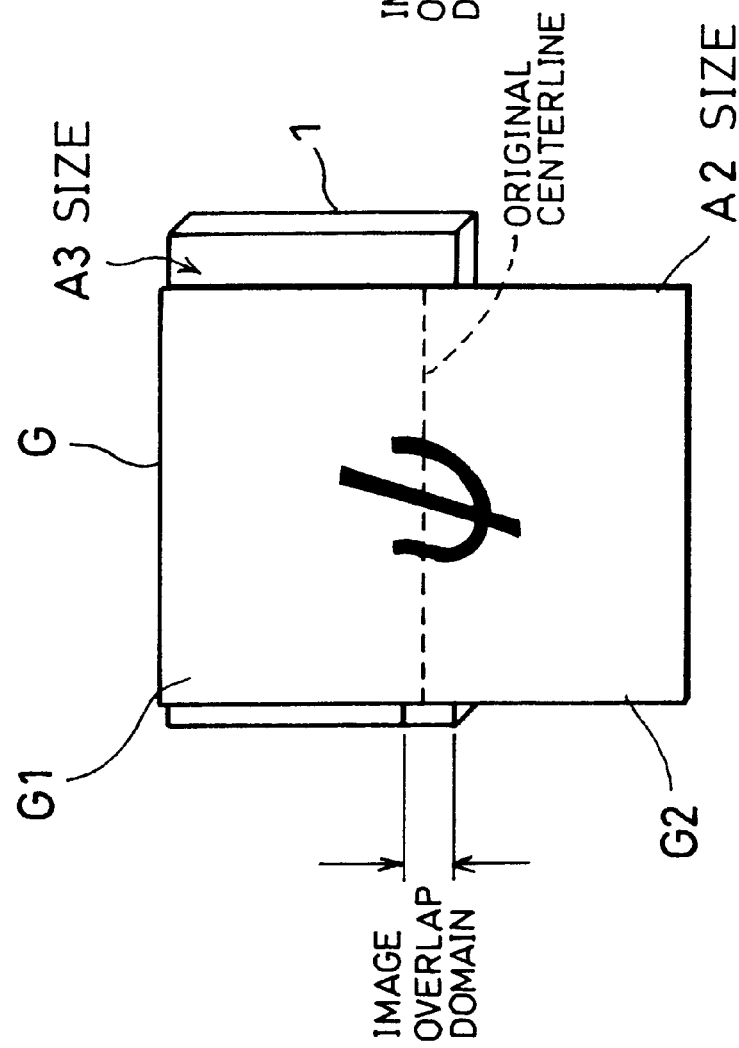

In the joining mode, when, for example, the maximum size which can be scanned in a single scan by the scanner 1 is A3 size, and an original of A2 size is to be scanned, first, as shown in FIG. 2(a), an original G is positioned on the scanner 1 so as to form an image overlap domain which includes the centerline of the original G. The image scanned from the original G at this time corresponds to a first domain G1(shown in FIG. 2(a)) of the original G placed on the scanner 1, and is a first original image G1' (search image;

shown in FIG. 2(b)) which has an image overlap domain including the centerline of the original G.

Figure 3B:
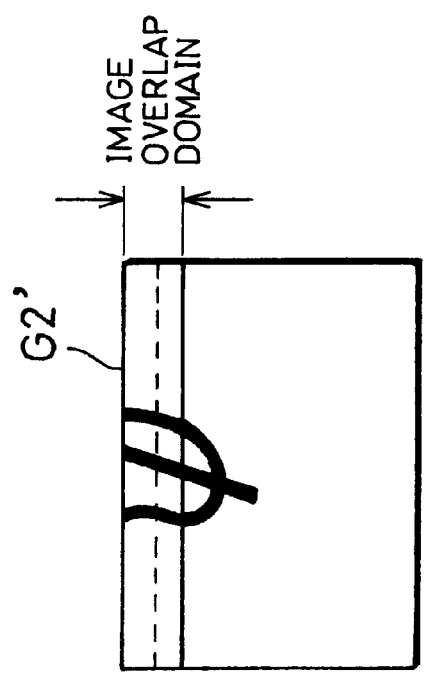
FIGS. 3(a) and 3(b) show reading of an image in the image processing device shown in FIG. 1, FIG. 3(a) being an explanatory drawing showing operations for scanning an original on a scanner, and FIG. 3(b) being an explanatory drawing showing the image scanned by the operations shown in FIG. 3(a).
Figure 3A:
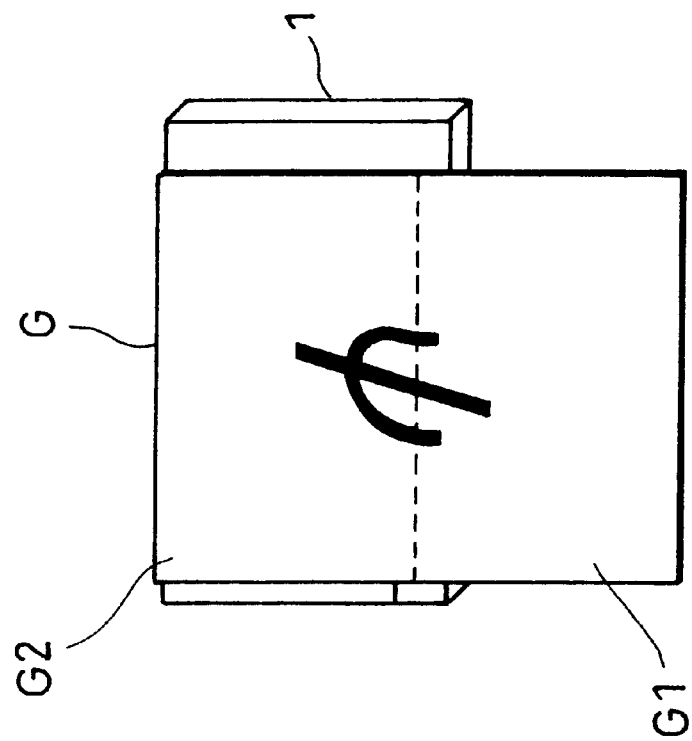

Next, at the time of the second scan, as shown in FIG. 3(a), in order to fix the image overlap domain, the original G is rotated 180° and positioned on the scanner 1. The image scanned from the original G at this time corresponds to the remainder of the original G, i.e., a second domain G2 (shown in FIG. 3(a)) which includes the image overlap domain of the first domain G1 shown in FIG. 2(a), and is a second original image G2' (reference image; shown in FIG. 3(b)).

Figure 4B:
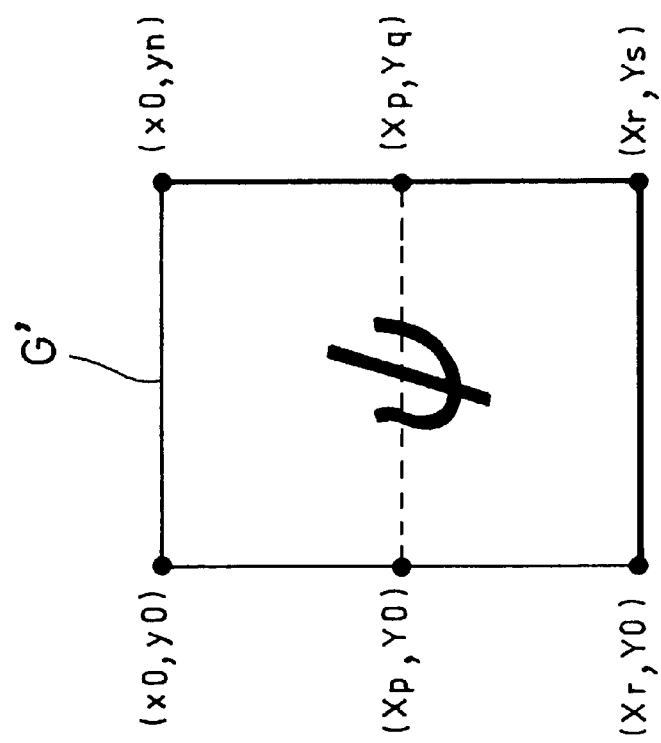
FIGS. 4(a) and 4(b) are explanatory drawings showing processing for joining the images shown in FIGS. 2(b) and 3(b)

In this way, the first and second domains G1 and G2 of the original G are scanned separately as the first and second original images G1' and G2', which are joined to form an original image G' shown in FIG. 4(b).

The foregoing joining processing is performed by linkage between the CPU 10 and the joining section 9. In other words, the CPU 10 also acts as an address indicating section, which indicates to the synthesis memory 8 addresses of locations where the images are to be joined, for joining together the search image data and the reference image data, which are stored in the synthesis memory 8, and sending them to the output control section 13.

Figure 4A:
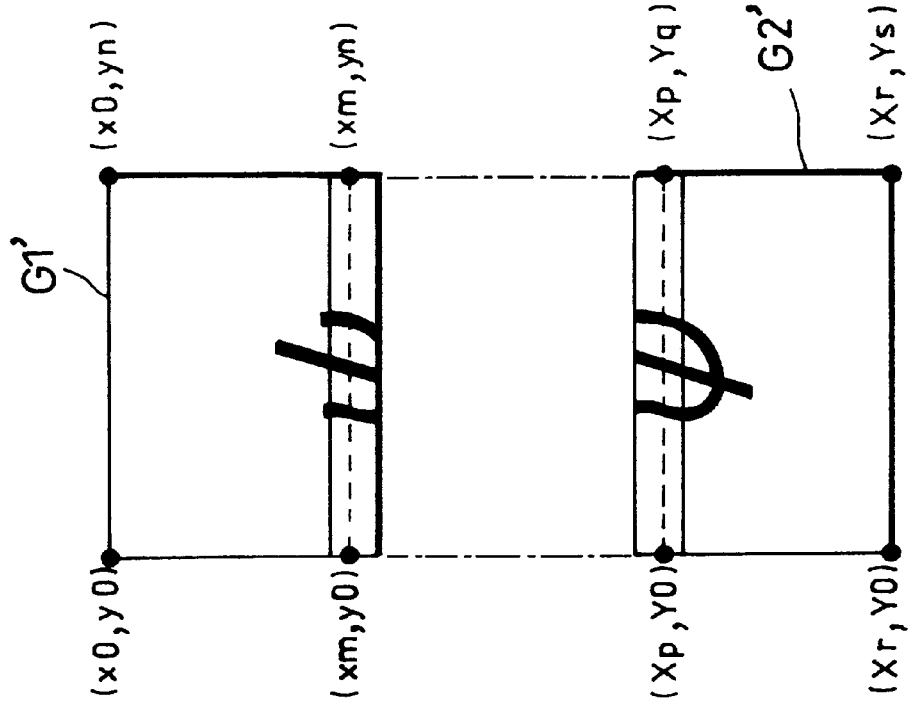

If, for example, as shown in FIG. 4(a), the search image G1' has matching points along the centerline of the original G, and addresses for joining with respective coordinates of (xm,y0) and (xm,yn), and the reference image G2' also has matching points along the centerline of the original G, and addresses for joining with respective coordinates of (Xp,Y0) and (Xp,Yq), the CPU 10 directs conversion of the coordinates such that (Xp,Y0) corresponds to (xm,y0) , and such that (Xp,Yq) corresponds to (xm,yn). As a result, the search image G1' and the reference image G2' are joined, thus forming in the synthesis memory 8 an original image G1' corresponding to the original G.

Figure 5:
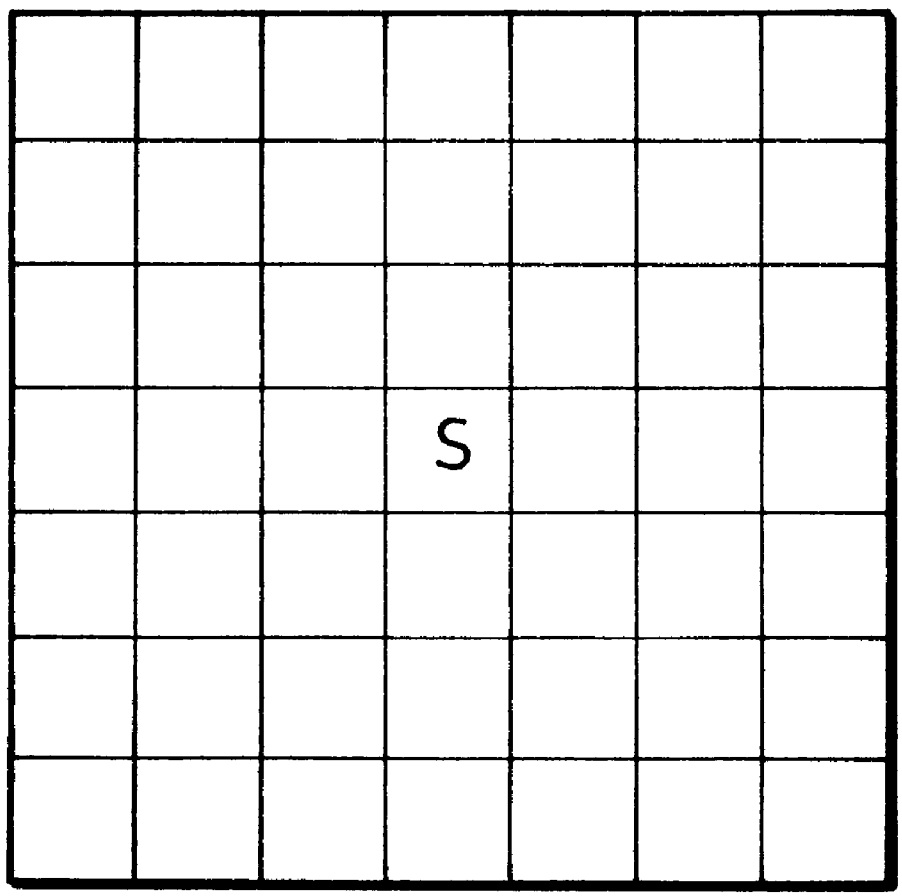
FIG. 5 is an explanatory drawing showing division into matrix form of an image to be processed by the image processing device shown in FIG. 1.

Further, as discussed above, the matching data used in the foregoing matching is produced by the matching data producing section 5, and stored in the matching memory 6. The matching data producing section 5 performs matrix processing of inputted data by dividing it into a plurality of pixel groups using, for example, a matrix of 7×7 pixels centered on a pixel in question (shown as "S" in FIG. 5), and produces matching data for the pixel S by calculating the difference between maximum and minimum values for density or brightness of pixels within that pixel group.

Figure 6:
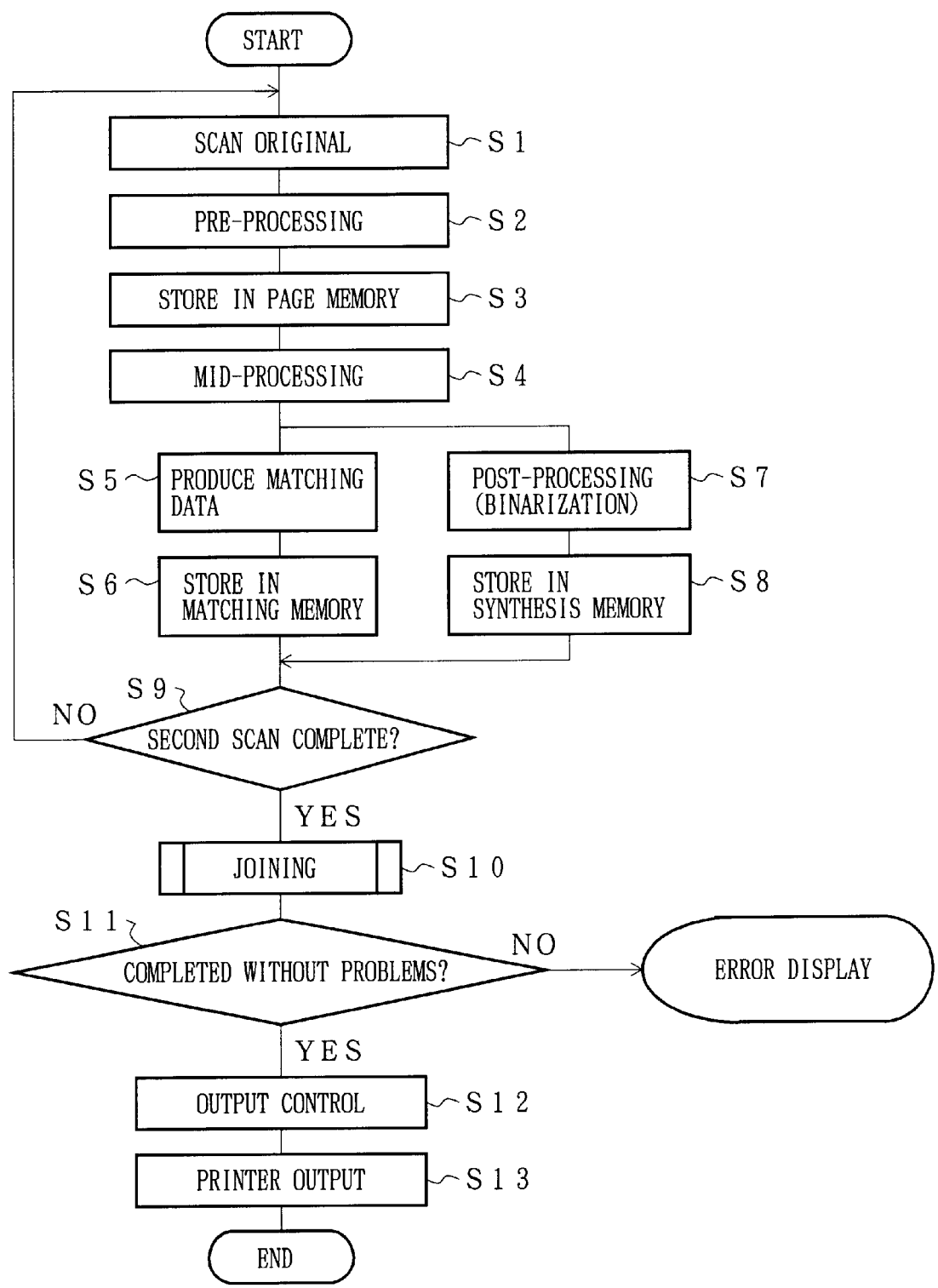
FIG. 6 is a flow-chart showing the flow of image processing in the image processing device shown in FIG. 1.
Figure 7:
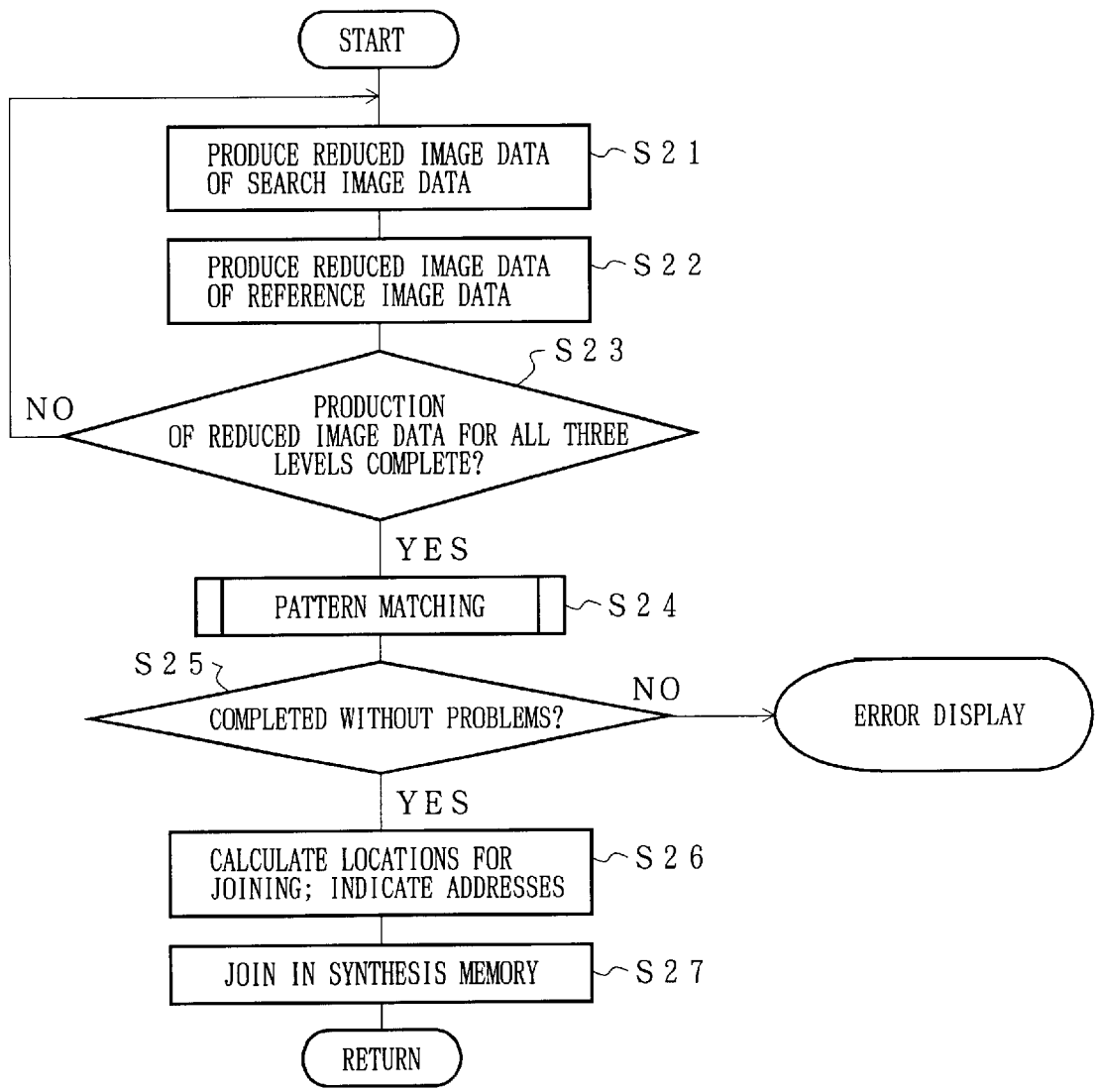
FIG. 7 is a flow-chart showing the flow of processing for joining images in the image processing shown in FIG. 6.
Figure 8:
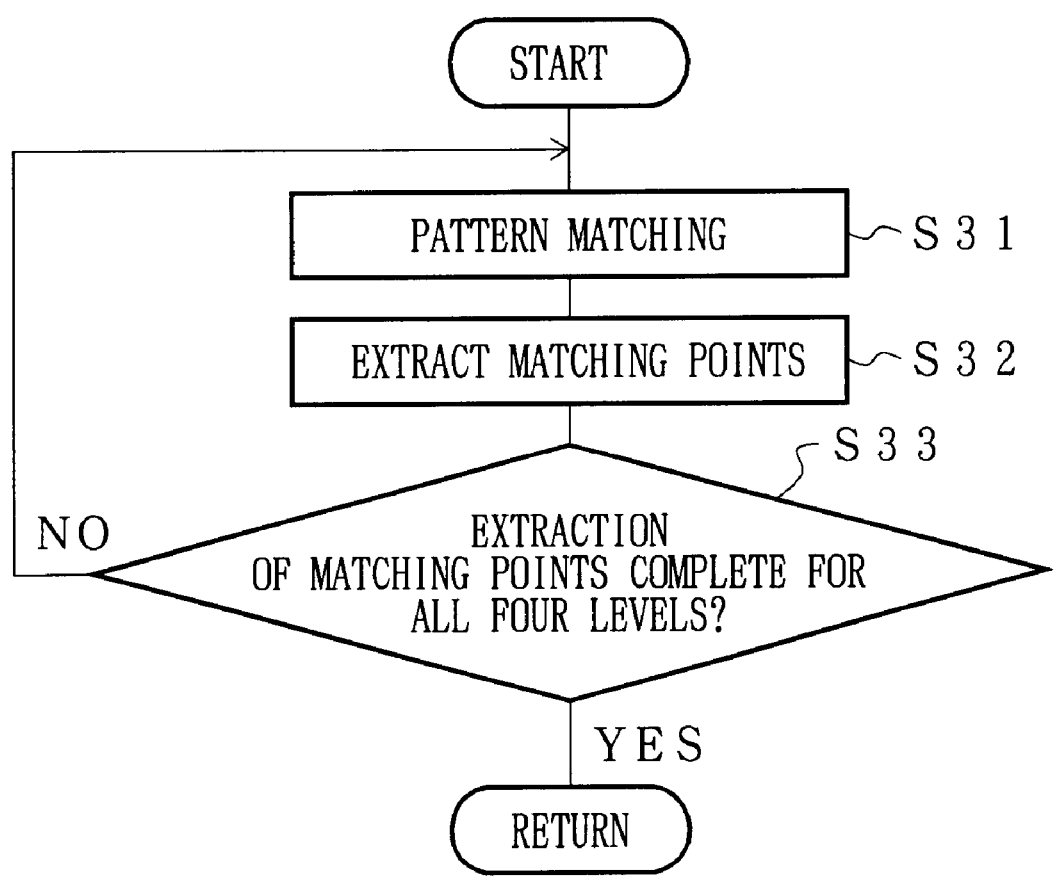
FIG. 8 is a flow-chart showing the flow of pattern matching in the processing for joining images shown in FIG. 7.

The following will explain the details of joining processing with reference to the flow-charts in FIGS. 6 through 8. FIG. 6 is a flow-chart explaining the overall flow of an image processing process according to the present embodiment, and FIGS. 7 and 8 are flow-charts showing the details of the joining processing shown in FIG. 6. Further, in FIG. 6, the CPU 10 performs overall control of processing performed by the respective sections, but in FIGS. 7 and 8, the CPU 10 and the joining section 9 execute processing in linkage with each other.

First, the overall flow of joining processing will be explained with reference to the block diagram in FIG. 1 and the flow-chart in FIG. 6. Here, for ease of explanation, the size of the original will be A2, and the maximum size readable by the scanner 1 will be A3. Accordingly, scanning of the original is carried out in two scans, as shown in FIGS. 2(a) and 2(b). However, the number of scans of an original is determined by the size of the original and the maximum size readable by the scanner 1, and thus is changed as needed for originals of different sizes.

First, the scanner performs a first original scan (S1). In other words, as shown in FIG. 2(a), of the original G, the first domain G1 (hereinafter referred to as the "search image domain") is, by means of operations carried out a first time by the user, scanned by the scanner 1 and converted to digital data (hereinafter referred to as the "search image data").

Next, the search image data of the search image domain, digitized by the scanner 1, is pre-processed by the pre-processing section 2 (S2). In the pre-processing section 2, the digitized search image data undergoes a series of pre-processing, such as $\gamma$ correction and shading correction based on white standard data and black standard data.

Next, the search image data pre-processed by the pre-processing section 2 is temporarily stored in the page memory 3 (S3).

Thereafter, the search image data temporarily stored in the page memory 3 is mid-processed by the mid-processing section 4 (S4). The mid-processing section 4 performs mid-processing of the search image data, such as region separation processing to separate written character regions, photograph regions, and halftone dot regions; filtering of each type of region; and enlargement or reduction in accordance with the output size.

Next, in the matching data producing section 5, matching data is produced from the search image data mid-processed by the mid-processing section 4 (S5). Specifically, the mid-processed search image data is overlaid with a matrix (of, for example, 7×7 pixels), and matching data for a pixel located within a certain pixel group of the matrix is produced by finding the difference between maximum and minimum values for density or brightness of the pixels within that pixel group.

Then, the matching data produced by the matching data producing section 5 is stored in the matching memory 6 (S6).

The mid-processed, multivalue search image data is also binarized by the post-processing section 7 (S7), and this binarized data is stored in the synthesis memory 8 (S8).

Next, it is determined whether a second scan of the original is complete (S9). Here, if it is determined that the second scan is complete, operations proceed to S10. If, however, it is determined that the second scan of the original is not complete, operations proceed to S1, and the second scan of the original is performed.

This second scan is scanning of the remainder of the original G, i.e., of the second domain G2 (shown in FIG. 2(a)). In order to read the (as yet unscanned) second domain G2 (hereinafter referred to as the "reference image domain"), which includes an image overlap domain, the original positioned on the scanner 1 is rotated 180°, and the same steps as for the search image data, i.e., steps S1 through S8, are carried out. However, when the reference image data from the reference image domain is stored in the page memory 3, it is rotated so as to have the same orientation as the search image data, and then stored.

By means of the foregoing processing in steps S1 through S8, matching data necessary to perform pattern matching of the originals is produced for both the search image and the reference image.

In the foregoing processing, in order to shorten processing time and reduce the amount of memory used, it is preferable to produce matching data (matching images) for only the image overlap domain of each image.

Next, in S10, using the matching data for the search image and the matching data for the reference image (both of which are stored in the matching memory 6), the joining section 9 performs pattern matching, in which points of correspondence between the two images are found, and outputs the results obtained to the address indicating section (the CPU 10). The details of joining processing in S10 will be discussed later.

Next, it is determined whether the foregoing joining processing was completed without problems (S11). Here, if it is determined that joining processing was completed without problems, the results of joining processing are sent to the output control section 13 (S12). Then, the output control section 13 outputs image data of the joined image, and the joined image is outputted from the printer 14 (S13).

If, however, it is determined in S11 that there was a problem with joining processing (if, for example, no corresponding matching points could be obtained, or if the address indicating section (CPU 10) determines that the legitimacy of the matching points is questionable), error display is performed. Here, after performing error display, processing may be terminated by reason of error, or, alternatively, a message may be displayed which requests the user to repeat scanning of the reference image, after which S1 through S8 are repeated, and it is determined again in S11 whether joining processing was completed without problems.

The following will explain joining processing in detail. Joining processing uses matching data which, for a pixel in question S (shown in FIG. 5), is the difference between maximum and minimum values of density or brightness within a pixel group of 7×7 pixels which includes the pixel S.

Further, in order to increase the speed and improve the precision of pattern matching, matching is performed on several levels. In the present embodiment, pattern matching is performed using image data reduced at several reduction rates with respect to the original size (reduced image data).

For example, by reducing the initial search image data at reduction rates of 1/2, 1/4, and 1/8 with respect to the X and Y axes thereof, the image size (image area) of the image data reduced at each reduction rate is 1/4, 1/16, and 1/64, respectively, of that of the initial search image data. Then, in the present embodiment, pattern matching is performed using the initial search image data, and also using the reduced image data of 1/4 size, 1/16 size, and 1/64 size. In other words, in the present embodiment, pattern matching is performed on four levels, including 1/1 size.

Figure 9:
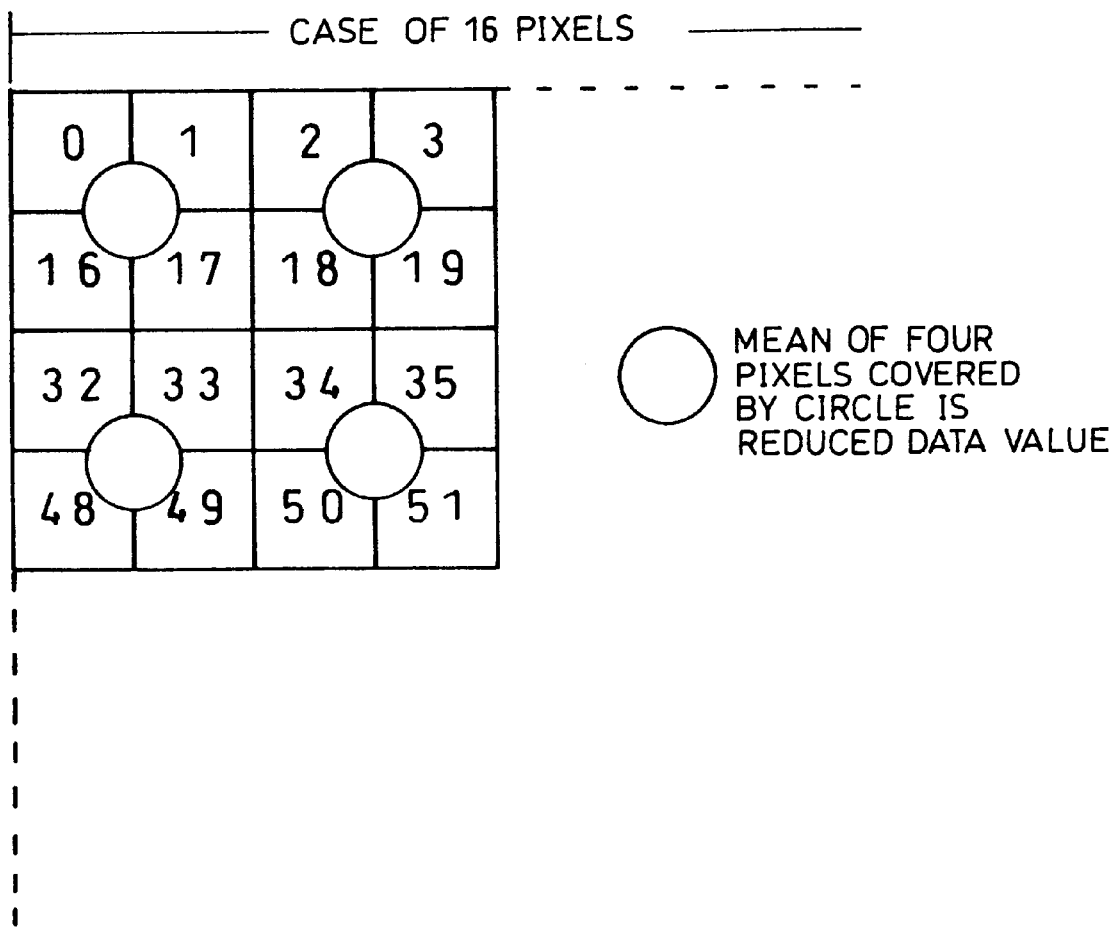
FIG. 9 is an explanatory drawing showing production of reduced matching data in the image processing device shown in FIG. 1.

One example of a method of producing reduced image data is shown in FIG. 9, in which a simple mean of the data of four adjacent pixels is used as reduced image data. Incidentally, FIG. 9 shows an example of image data of 16×16 pixels.

Here, by using a simple mean of the data of every four adjacent pixels as the reduced image data, image data of 8×8 pixels is obtained. Accordingly, image data reduced at a reduction rate of 1/2 of the initial image (image data of 1/4 size) is obtained.

Next, using the foregoing image of 8×8 pixels, if a simple mean of the data of every four adjacent pixels is calculated, image data of 4×4 pixels is obtained. Accordingly, image data reduced at a reduction rate of 1/4 of the initial image (image data of 1/16 size) is obtained.

Finally, using the foregoing image of 4×4 pixels, if a simple mean of the data of every four adjacent pixels is calculated, image data of 2×2 pixels is obtained. Accordingly, image data reduced at a reduction rate of 1/8 of the initial image (image data of 1/64 size) is obtained.

The image data of each reduction rate, obtained as explained above, is stored, matching points are extracted from the image data of each reduction rate, and pattern matching is performed, thus joining the search image and the reference image.

Next, the foregoing joining processing will be explained with reference to the flow-charts in FIGS. 7 and 8. As explained above, pattern matching is performed on four levels, including the image data of 1/1 size (the initial image data).

First, using the foregoing method, the search image data stored in the matching memory 6 is reduced at a predetermined reduction rate, thus producing reduced image data of the search image data (S21). This reduced image data is temporarily stored in the RAM 12 as data for one level.

Next, the reference image data stored in the matching memory 6 is reduced at the predetermined reduction rate, thus producing reduced image data of the reference image data (S22). This reduced image data is temporarily stored in the RAM 12 as data for one level.

Next, it is determined whether production of reduced image data for all three levels is complete (S23) Reduced image data is produced in the order: 1/2 reduction rate, 1/4 reduction rate, 1/8 reduction rate. Here, if production of reduced image data for all three levels is not complete, operations return to S21, and reduced image data is produced at the next reduction rate.

If, on the other hand, it is determined in S23 that production of reduced image data is complete for all three levels, the CPU 10 performs pattern matching on each level (for the image data reduced at reduction rates of 1/1, 1/2, 1/4, and 1/8) (S24). The details of pattern matching will be discussed later.

Then it is determined whether the foregoing pattern matching was completed without problems (S25). Here, a threshold value is set for the pattern matching computation result (matching error), and areas in which the pattern matching computation result is less than or equal to the threshold value are judged to be all black or all white, i.e., lacking in density difference, and the matching points of these areas are not used as matching points. At this time, an upper limit for the pattern matching result is set, and when a pattern matching computation result greater than or equal to this upper limit is obtained, it can be judged that there is no overlapping area. Incidentally, the pattern matching computation result is the sum of the absolute values of the density differences of corresponding pixels of the reference side and the search side.

Incidentally, in pattern matching using an image divided into rectangular areas, if matching points of two rectangular areas are found, the two images can, in theory, be joined by linear approximation (linear interpolation) of these matching points. However, since reliability is greatly impaired in this case, in order to actually join images precisely, it is necessary to set precise judgment standards for each stage in processing.

In view of the foregoing, in S25, when a pattern matching computation result greater than or equal to the upper limit value is obtained, and it is determined that there was a problem with pattern matching, it is determined that the search image and the reference image have no overlapping domains, and error processing like that of S11 shown in FIG. 6 is performed. In this error processing, after performing error display, processing may be terminated by reason of error, or, alternatively, a message may be displayed which requests the user to repeat scanning of the reference image, after which S21 through S24 are repeated, and it is determined again in S25 whether joining processing was completed without problems.

If, on the other hand, it was determined in S25 that pattern matching was completed without problems, the CPU 10, from the results of pattern matching (the matching points), calculates locations for joining the images, and indicates address locations to the joining section 9 (S26).

Then the joining section 9, based on addresses in the synthesis memory 8 as indicated by the CPU 10, joins the search image and the reference image (S27).

The following will explain the flow of pattern matching processing with reference to the flow-chart shown in FIG. 8.

First, the matching point extracting section 10a of the CPU 10 performs pattern matching of the reduced image data of each reduction rate (including 1/1) stored in the RAM 12 (S31).

From the results of the pattern matching, the matching point extracting section 10a extracts matching points (S32).

Then it is determined whether extraction of matching points is complete for all four levels (including the image data of 1/1 size) (S33). Here, if extraction of matching points is not complete for all four levels (including the image data of 1/1 size), operations return to S31, and pattern matching is performed and matching points extracted for the reduced image data of the next reduction rate.

The matching points found for each level are returned to the address producing section 10b of the CPU 10, and the joining section 9 is informed of the matching points and of areas to be pattern matched for the next level.

Finally, pattern matching of the full-size image data is performed in a several-pixel range centered on the matching points resulting from the pattern matching of the 1/4 size image data. In this way, final matching points are calculated.

If, on the other hand, it is determined in S33 that extraction of matching points is complete for all four levels (including the image data of 1/1 size), pattern matching is ended, and operations proceed to S25 shown in FIG. 7.

In other words, in the foregoing pattern matching processing, reduced image data of 1/4, 1/16, and 1/64 size is consecutively produced for the search image data and for the reference image data, and then, beginning with the reduced image data of 1/64 size (that with the greatest reduction rate), matching points are extracted by successively pattern matching each reduced image data, reducing the size of the areas to be pattern matched as the reduction rate decreases. This contributes to increased speed and improved precision in pattern matching.

On the basis of the matching points, the address producing section 10b sends to the joining section 9 synthesis image data addresses in the synthesis memory 8, to be used for joining. The joining section 9 then produces synthesized image data joined in the synthesis memory 8.

As discussed above, with the image processing device having the foregoing structure, since the matching data for joining the images is produced on the basis of the multivalue inputted images, and the binarized image data is joined on the basis of the matching data, joining of images can be performed according to the data of the inputted images.

Accordingly, even with an original, such as a halftone dot image or photographic image, for which binarizing produces large areas of similar images, the matching data is produced on the basis of the multivalue inputted image data prior to binarizing, and thus matching points necessary for joining images can be accurately extracted. Consequently, images of whatever type can be joined with high precision.

Incidentally, in image joining processing according to the present embodiment, pattern matching is performed by moving the reference image data with respect to the search image data. However, when even the quantity of data of the image overlap areas is large, or in cases of rotation of images, etc., pattern matching requires a great amount of time. For this reason, if the data of each of the images to be joined is divided into several rectangles, and pattern matching is performed for each rectangle, flexible pattern matching, which is faster and more precise, can be performed.

Figure 10A:
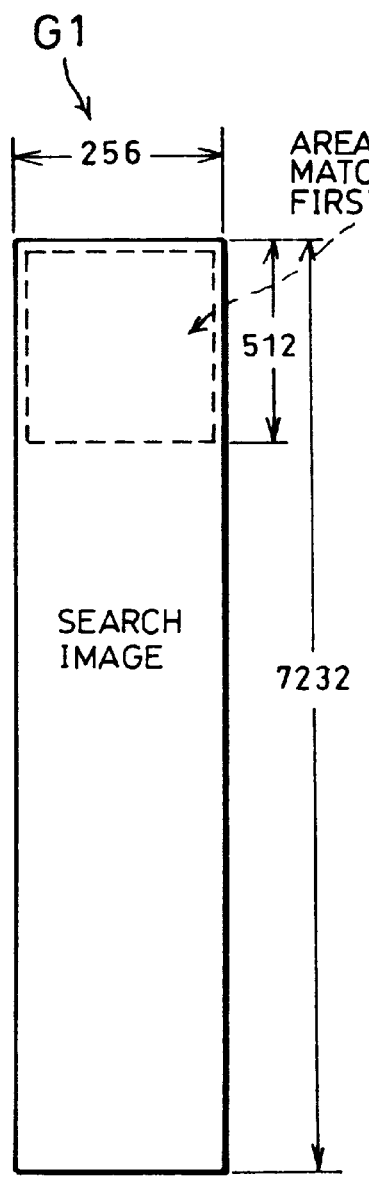
FIGS. 10(a) and 10(b) are explanatory drawings of pattern matching in the image processing device shown in FIG. 1 using rectangular units.
Figure 10B:
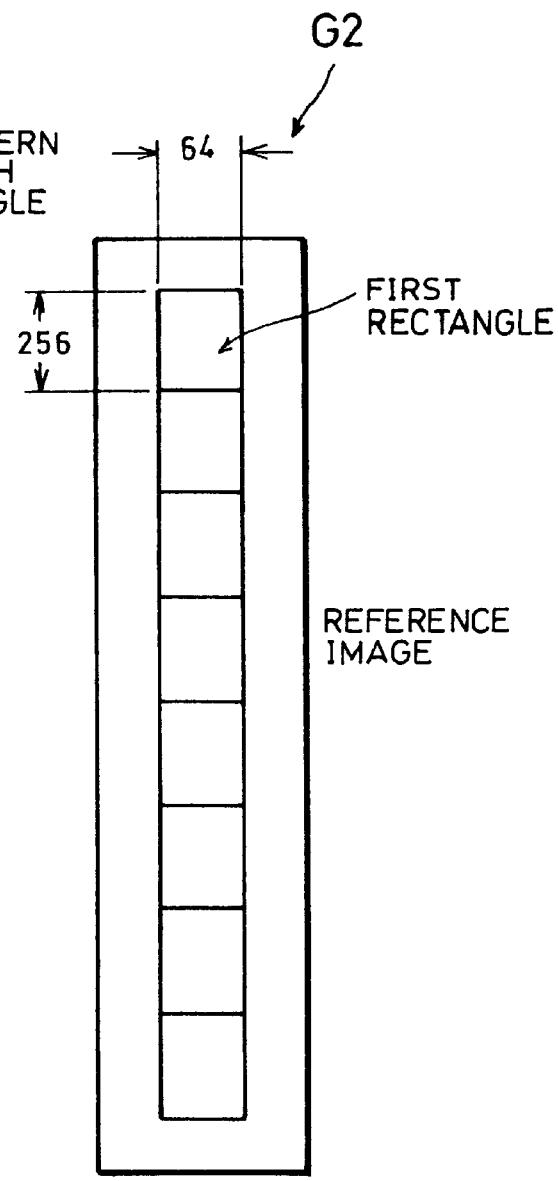

FIGS. 10(a) and 10(b) show one example of this kind of method. FIGS. 10(a) and 10(b) show a representation of the image of the image overlap area shown in FIGS. 2 and 3, rotated 90° counter-clockwise.

In FIGS. 10(a) and 10(b), the image overlap area of the reference image is divided into a plurality of rectangles, and each rectangle is pattern-matched with a corresponding area of the search image.

In this way, in performing pattern matching, when the reference image is divided into several rectangles, the number of matching points found is the same as the number of rectangles. Accordingly, when, as shown in FIG. 11, the original is inclined, the address indicating section (CPU 10) directs the joining section 9 to perform joining such that the rectangles into which the reference image is divided are converted into trapezoids. This can prevent distortion of the image resulting from inclination of the original.

When not reduced, the size of each rectangle on the second domain G2 side, which is the reference image domain of the original, is set, as shown in FIG. 10(b), to a width (X direction) of 64 dots and a height (Y direction) of 256 dots. This first rectangle of the second domain G2 corresponds to a pattern matching area on the first domain G1 side, which is the search image domain of the original, whose size is set, as shown in FIG. 10(a), to a width (x direction) of 256 dots and a height (y direction) of 512 dots. Here, the size of the search image is set to a width of 256 dots and a height of 7,232 dots. Incidentally, when the reduction rate is 1/2, 1/4, or 1/8, the width and height of the foregoing rectangle are each reduced to 1/2, 1/4, and 1/8, respectively.

Figure 12:
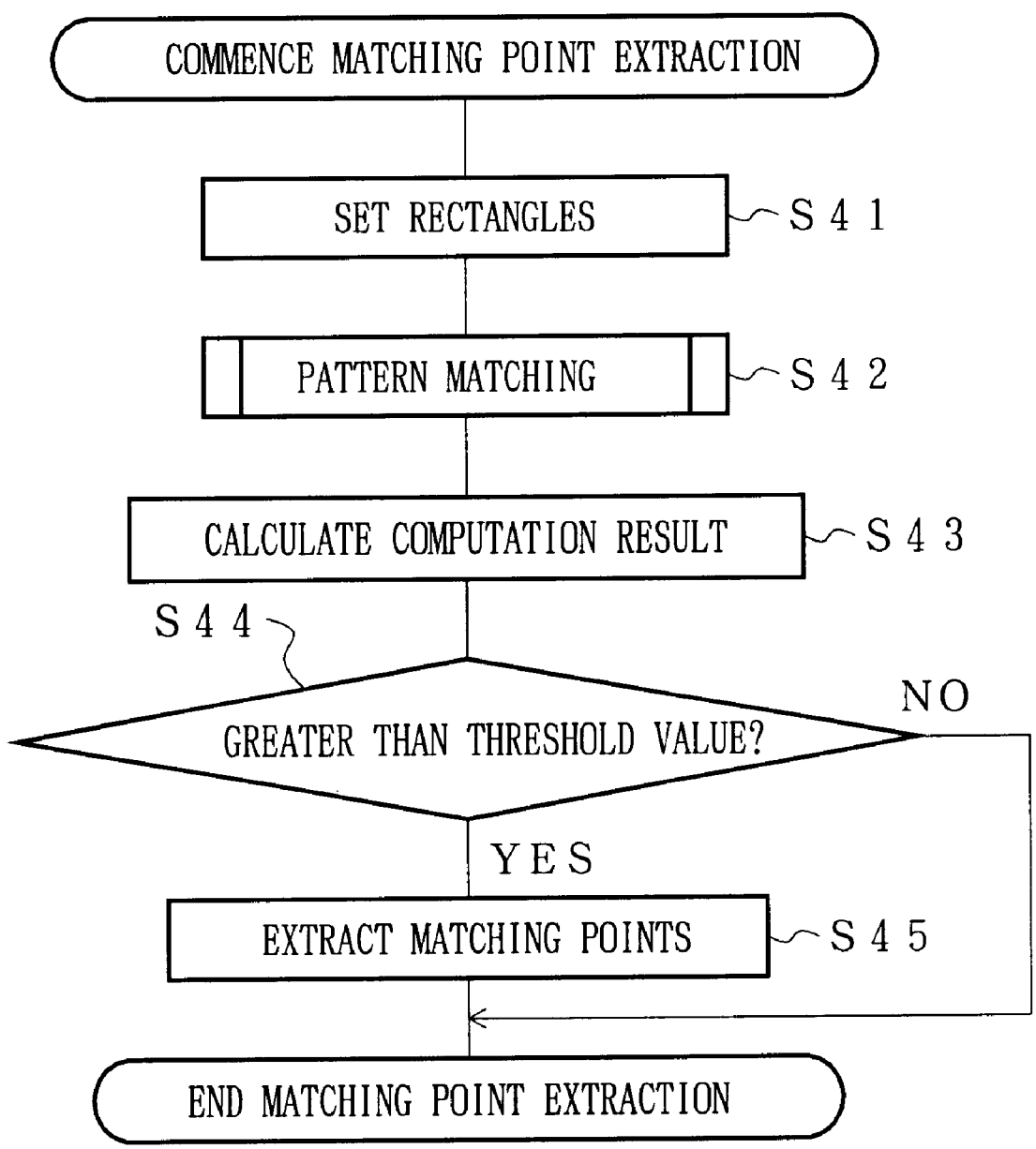
FIG. 12 is a flow-chart showing the flow of processing when performing pattern matching using the rectangular units shown in FIGS. 10(a) and 10(b).
Figure 13:
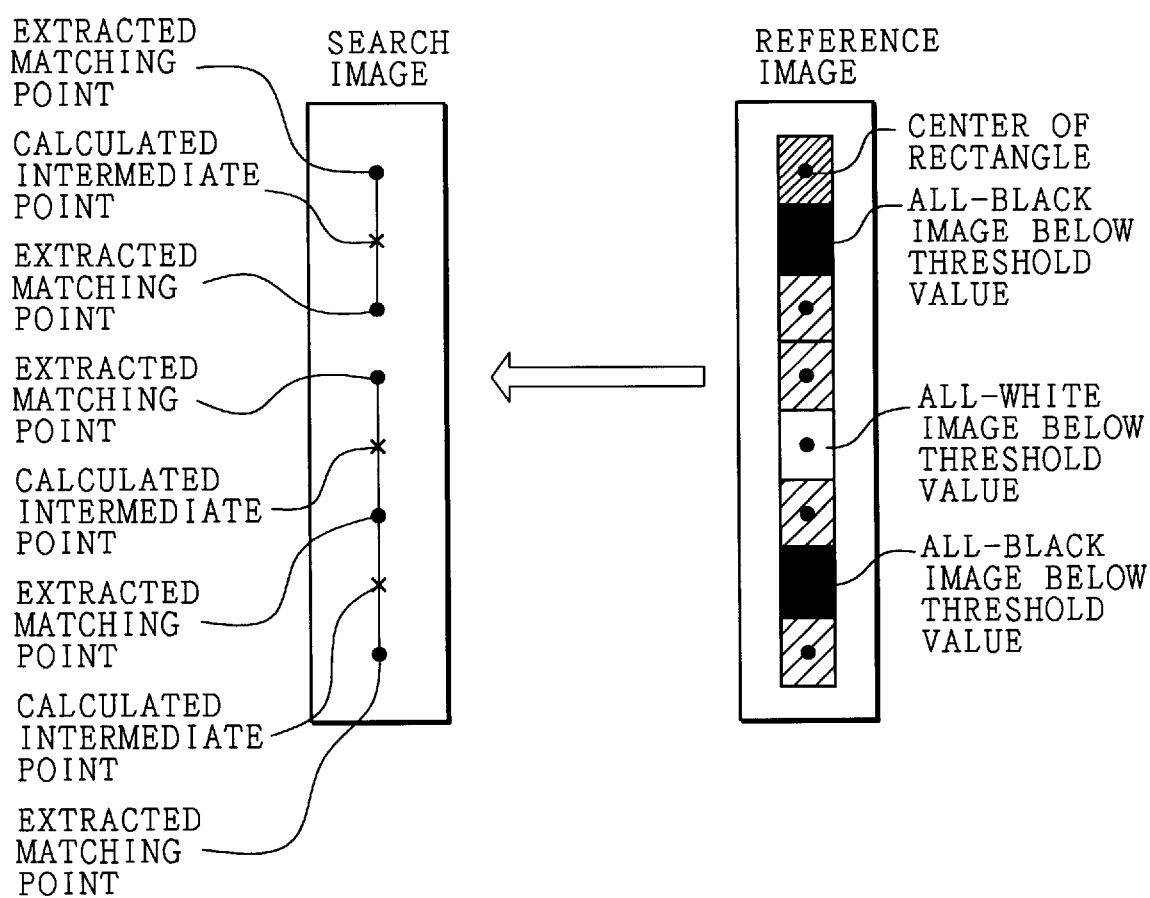
FIG. 13 is an explanatory drawing showing another example of pattern matching in the image processing device shown in FIG. 1 using rectangular units.

The following will explain the flow of processing for extraction of matching points in the foregoing pattern matching with rectangles, with reference to the flow-chart in FIG. 12 and to FIG. 13.

First, the rectangles of the reference image are set (S41). Here, as shown in FIG. 13, the reference image is divided into a plurality of rectangles.

Next, pattern matching is performed for each rectangle into which the reference image is divided (S42). This pattern matching is performed using the same method as that of S31 shown in FIG. 8.

Next, based on the results of pattern matching processing (the matching points), a computation result is calculated (S43). The computation result is the sum of the absolute values of the density differences of corresponding pixels of the reference side and the search side.

Then it is determined whether the computation result from S43, i.e., the sum of the absolute values of the density differences of corresponding pixels of the reference side and the search side, is greater than a previously set threshold value (S44). Here, if the sum of these absolute values is less than or equal to the threshold value, the pixels within the rectangle are judged to be all white or all black, and pattern matching processing is ended. Accordingly, when the computation result obtained by pattern matching processing is less than or equal to the threshold value, the matching point of that rectangle is not used in joining processing.

If, on the other hand, the computation result obtained by pattern matching processing is greater than the threshold value in S44, the matching point of the search image side is extracted (S45), and matching point processing is ended.

FIG. 13 shows an example of matching points extracted as above. In FIG. 13, of the rectangles set in the reference image, pattern matching yields a computation result which is less than or equal to the threshold value in the second, fifth, and seventh rectangles from the top, and thus, for these rectangles, no matching points are extracted from the search image.

In such a case, matching points for the rectangles for which no matching point was extracted from the search image are found using the matching points extracted from the rectangles above and below those rectangles. In other words, linear approximation (linear interpolation) is performed from the matching points of the rectangles above and below those rectangles, thus calculating a point midway between the matching points of the rectangles above and below those rectangles. These intermediate points are used as the matching points for the rectangles for which no matching point was extracted.

As discussed above, the matching data is divided into rectangles, and matching points are obtained by performing pattern matching thereof. A threshold value is set for the computation result of this pattern matching, and if the computation result for a given rectangle is less than or equal to the threshold value, the image within that rectangle is judged to be all white or all black. In this way, when performing matching by levels, that rectangle can be ignored in pattern matching, thus further increasing processing speed.

When a rectangle has little density difference, and the matching point extracted for that rectangle is rejected for use as a matching point, a point midway between the matching points of the rectangles above and below the rectangle in question is linearly approximated and used as the matching point of the rectangle in question, thus enabling suitable joining.

However, when giving consideration to the time required in processing for joining images, image joining can be performed accurately when matching points can be found for a fair number of rectangles, but when linear approximation must be performed as above, the precision of joining is impaired, and processing time is likely to be lengthened.

Accordingly, in joining processing, if a number of matching points greater than or equal to a predetermined number are obtained from pattern matching of the set rectangles, the number of approximated points is decreased, which should contribute to shortening of processing time and improvement of the precision of joining. If, on the other hand, the number of matching points obtained from pattern matching of the set rectangles is less than the predetermined number, the number of approximated points is increased, which will likely increase processing time and impair the precision of joining.

For these reasons, when performing joining processing, it may be determined, according to the number of matching points obtained from pattern matching of the set rectangles, whether to join the images using the matching points obtained, or to simply place the images adjacent to one another.

Specifically, automatic or manual switching control between a joining mode, in which the images are joined using the matching points, and an ordinary mode, in which the images are simply successively placed adjacent to one another without joining, may be performed according to the proportion, with respect to the total number of rectangles, of rectangles rejected for matching point extraction due to the pattern matching computation result. In such a case, even if the joining mode is set, the image processing device may be set to merely place adjacent to one another images obtained, for example, by two scans of an A3 size original formed by opening an A4 size book, if there is a large proportion, with respect to the total number of rectangles, of rectangles rejected for matching point extraction.

The image processing device according to the present embodiment may be switched between a manual joining mode (ordinary mode), in which images are joined by merely placing them adjacent to one another, and an automatic joining mode (joining mode), in which images are joined automatically. Accordingly, when manual joining mode is selected, processing is performed whereby the images are simply placed adjacent to one another, without finding matching points, etc. by computation. When automatic joining mode is selected, on the other hand, matching points are extracted from the foregoing reference image and search image, and joining processing is performed using these matching points.

Figure 14:
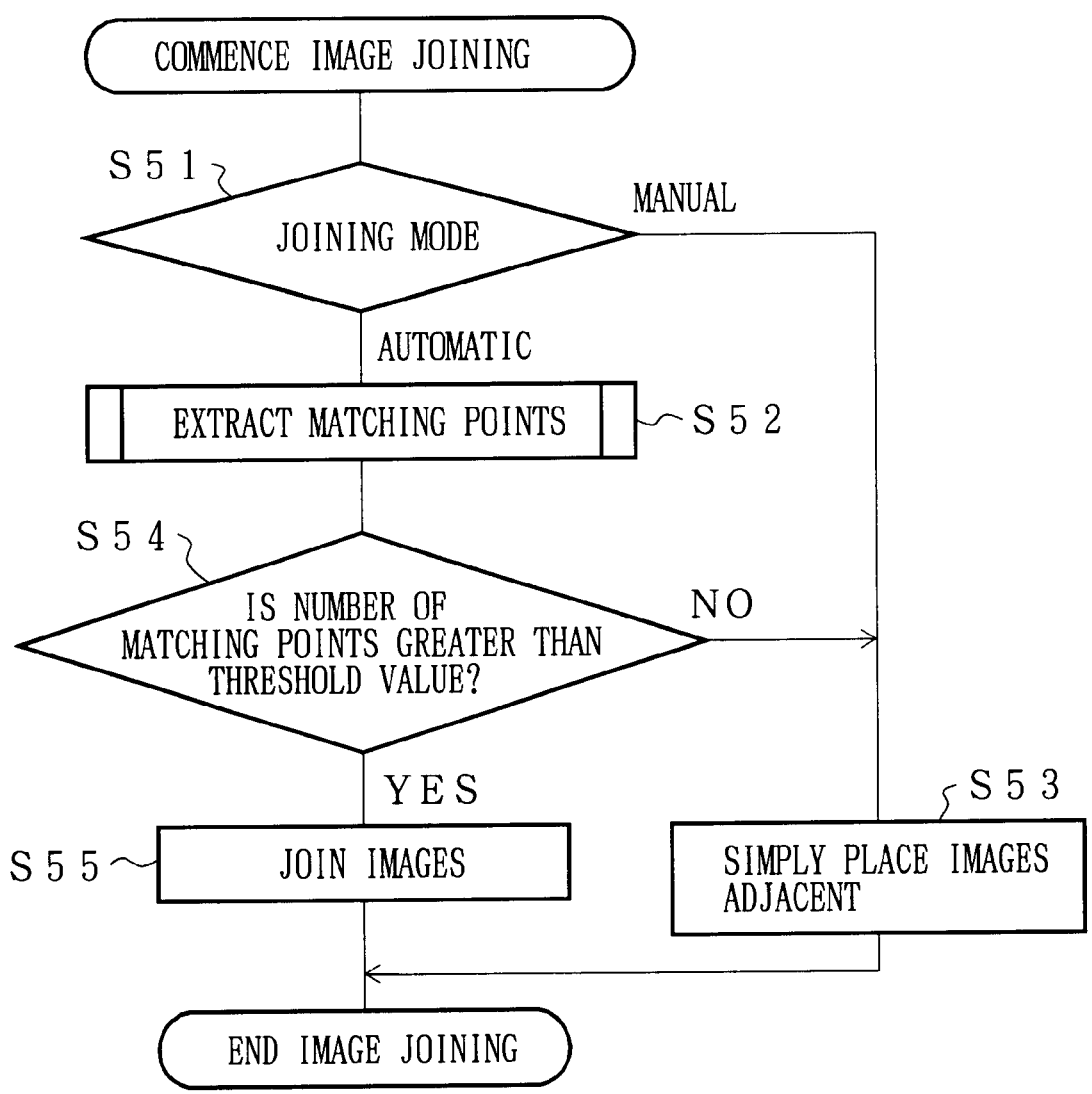
FIG. 14 is a flow-chart showing another example of the flow of processing for joining images in the image processing device shown in FIG. 1.

Here, the flow of joining processing in an image processing device capable of switching the joining mode will be explained, with reference to the flow-chart shown in FIG. 14.

First, after commencement of joining processing, it is determined whether the joining mode selected by the user is the manual or the automatic joining mode (S51). Here, if it is determined that the automatic joining mode was selected, using the reference image and the search image, processing is performed to extract matching points (S52). If, on the other hand, it is determined in S51 that the manual joining mode was selected, the scanned images are joined by simply placing them adjacent to one another (S53).

After extracting matching points in S52, it is determined whether the number of matching points is greater than or equal to the threshold value (S54). Here, if it is determined that the number of matching points is less than the threshold value, operations return to S53, and the images are joined by simply placing them adjacent to each other. If, however, it is determined that the number of matching points is greater than or equal to the threshold value, then the images are joined using the extracted matching points (S55).

Incidentally, in the foregoing joining processing, the reference image was divided into several rectangles, and matching points were found for each rectangle, but equivalent effects may be obtained by dividing the reference image into shapes other than rectangles, i.e., squares, triangles, etc.

SECOND EMBODIMENT

The following will explain another embodiment of the present invention. For ease of explanation, members having the same functions as those of the foregoing embodiment will be given the same reference symbols, and explanation thereof will be omitted here.

Figure 15:
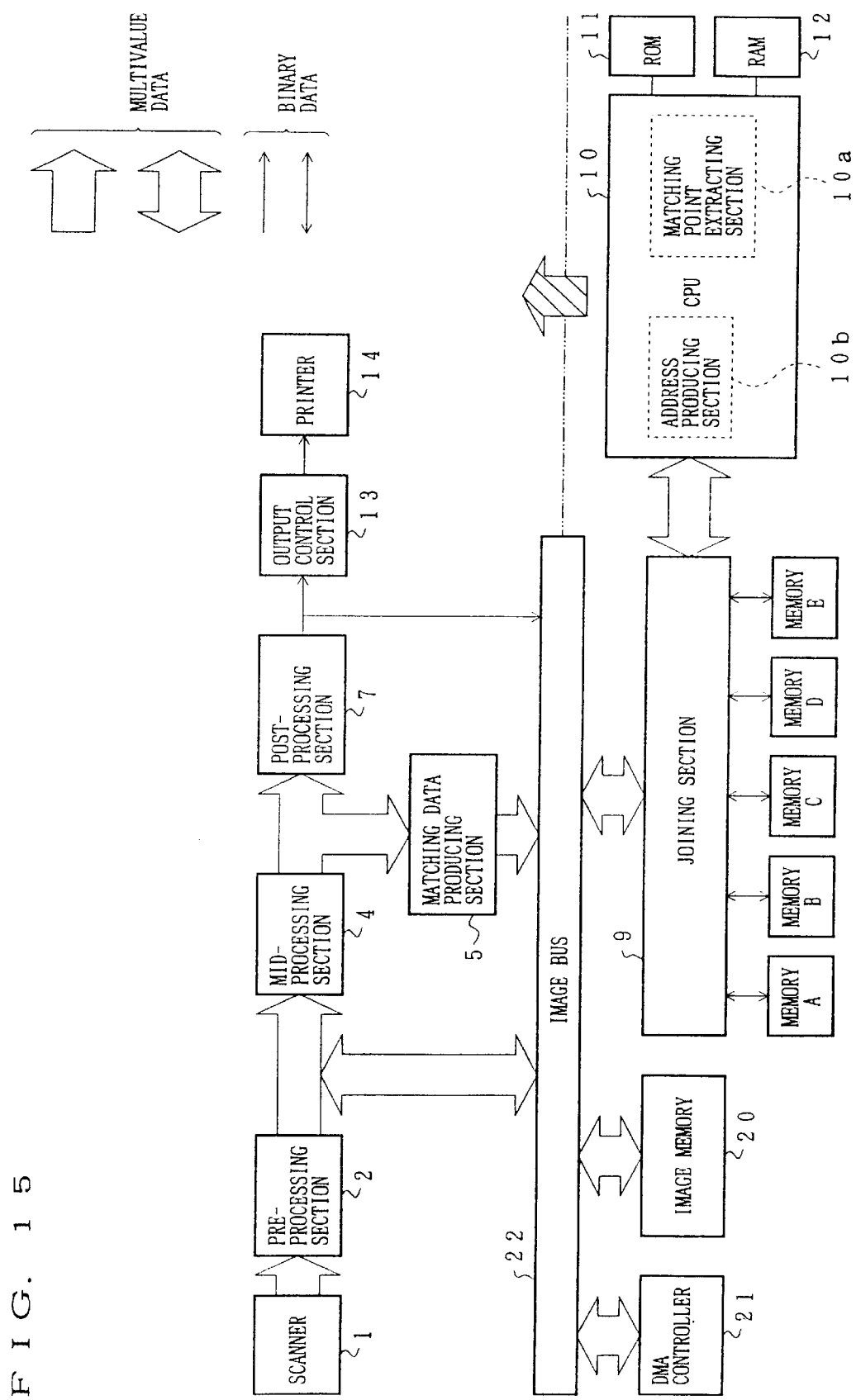
FIG. 15 is a schematic block diagram of an image processing device according to another embodiment of the present invention.

An image processing device according to the present embodiment, as shown in FIG. 15, is provided with an image memory 20 instead of the page memory 3, the matching memory 6, and the synthesis memory 8 of the image processing device shown in the block diagram in FIG. 1 of the first embodiment.

The image memory 20 is connected via an image bus 22 to the pre-processing section 2, the mid-processing section 4, the matching data producing section 5, the post-processing section 7, and the output control section 13, and transfer of image data is performed via the image bus 22.

Further, data is stored in the image memory 20 with the uniform number of bits, for example 32 bits.

The image bus 22 transfers multivalue (here, 32-bit) data among the devices connected to the image bus 22.

Further, the image bus 22 is also connected to a DMA (Direct Memory Access) controller 21, which controls DMA transfer of data among the devices connected to the image bus 22, and to the joining section 9.

To the joining section 9 are connected, in parallel, memories A through E, which are memory means for temporarily storing image data during joining processing.

The memory A is a memory for storing image data of the image overlap domain of the search image data for matching, and stores data as 1-address, 1-pixel (multivalue) data.

The memory B is a memory for storing image data of the image overlap domain of the reference image data for matching, and stores data as 1-address, 1-pixel (multivalue) data.

The memory C is a memory for storing reduced images of each level of the search image for matching, and stores data as 1-address, 1-pixel (multivalue) data.

The memory D is a memory for storing reduced images of each level of the reference image for matching, and stores data as 1-address, 1-pixel (multivalue) data.

The memory E is a memory for storing image data for synthesizing the search image and the reference image, and stores data as 1-address, 1-pixel (1-bit) data.

The following will explain the operations of an image processing device with the foregoing structure.

First, as in the first embodiment, the scanner 1 which uses a CCD sensor, an A/D converter, etc., sends digital image data to the pre-processing section 2. Here, a series of processing, such as γ correction and shading correction based on white standard data and black standard data, is performed, and the image data is transferred to the image memory 20 via the DMA controller 21 such that 8-bit image data for four pixels is stored in a single address.

Next, as in the first embodiment, the 8-bit data for every four pixels from the pre-processing section 2 undergoes, in the mid-processing section 4, a series of mid-processing such as region separation processing to separate written character, photograph, and halftone dot regions; filtering of each type of region; and enlargement or reduction in accordance with the output size. The data mid-processed by the mid-processing section 4 is transferred to the matching data producing section 5.

Then, in the matching data producing section 5, the search image mid-processed by the mid-processing section 4 is overlaid with a matrix (of, for example, 7×7 pixels), and matching data for a pixel located within a certain pixel group of the matrix is produced by finding the difference between maximum and minimum values for density or brightness of the pixels within that pixel group. At this time, the matching data producing section 5 transfers 8-bit image data, which is the matching data, to the image memory 20 via the DMA controller 21, such that 8-bit image data for four pixels is stored in a single address.

The post-processing section 7 binarizes the data mid-processed by the mid-processing section 4, and transfers this binary data, i.e., binarized 1-pixel, 1-bit data, to the image memory 20 via the DMA controller such that binary data for 32 pixels is stored in a single address.

Figure 16:
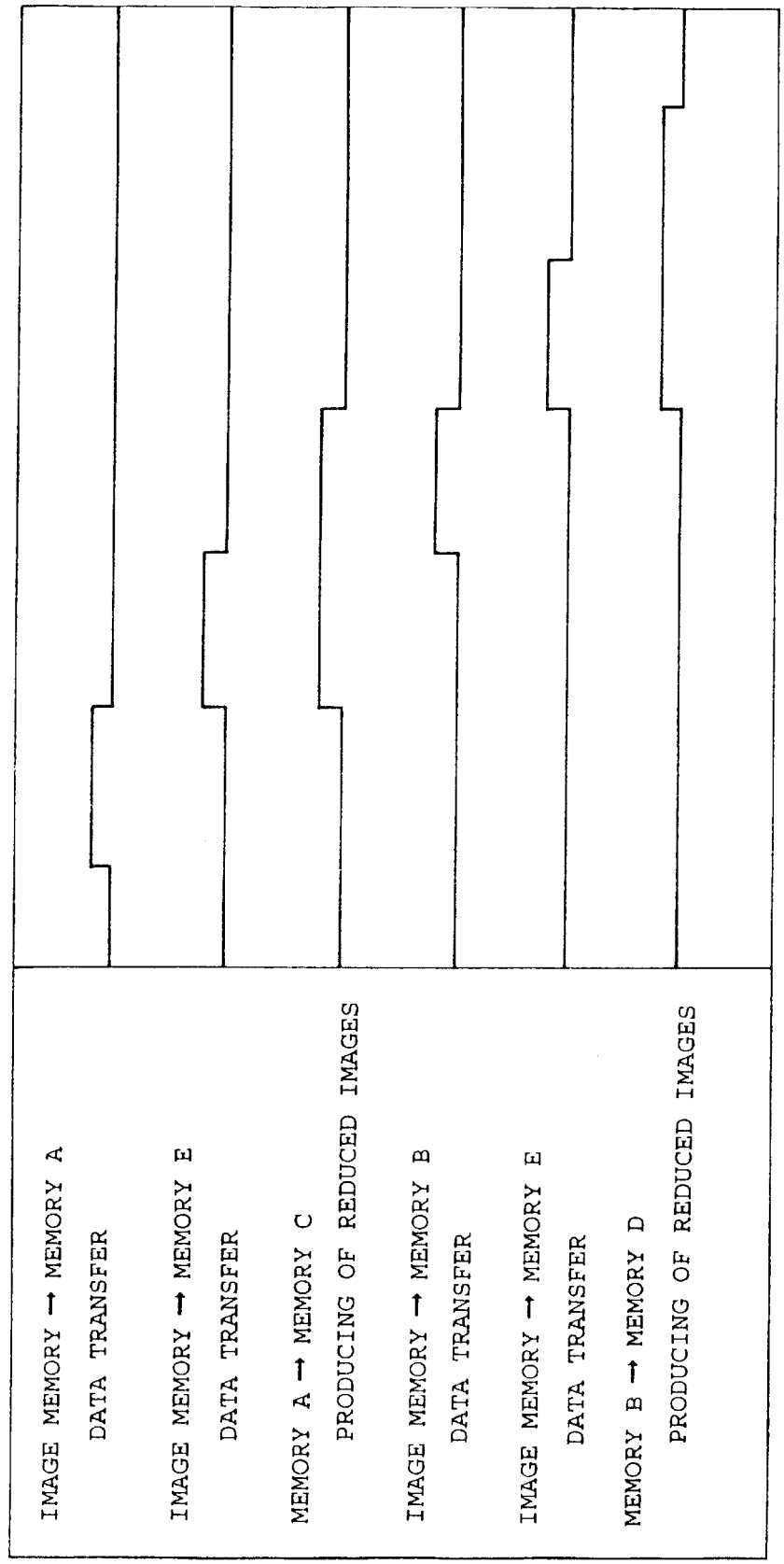
FIG. 16 is a timing chart showing timing of data transfer in a joining section of the image processing device shown in FIG. 15.

The following will explain processing for data storage in the memories A through E, which are connected to the joining section 9. The timing of storage of image data in the memories A through E is based on the timing chart shown in FIG. 16.

First, the search image data for matching and the reference image data for matching, by means of the DMA controller 21, pass from the image memory 20 through the image bus 22, and are inputted into the joining section 9 and parallel/serial converted. Then, image data for matching are stored in the memories A and B, which are connected to the joining section 9. In other words, the search image data for matching is sequentially stored in the memory A, and the reference image data for matching is sequentially stored in the memory B.

Next, the joining section 9 reads out the search image data for matching stored in the memory A, produces reduced data on each level, and then stores in the memory C the reduced image data of each level of the search image data for matching. The joining section 9 also reads out the reference image data for matching stored in the memory B, and produces and stores in the memory D reduced image data of each level of the reference image data for matching.

Image data for synthesis, on the other hand, by means of the DMA controller 21, passes from the image memory 20 through the image bus 22, and is inputted into the joining section 9 and parallel/serial converted. Then the image data for synthesis is sequentially stored in the memory E, which is connected to the joining section 9.

Figure 17:
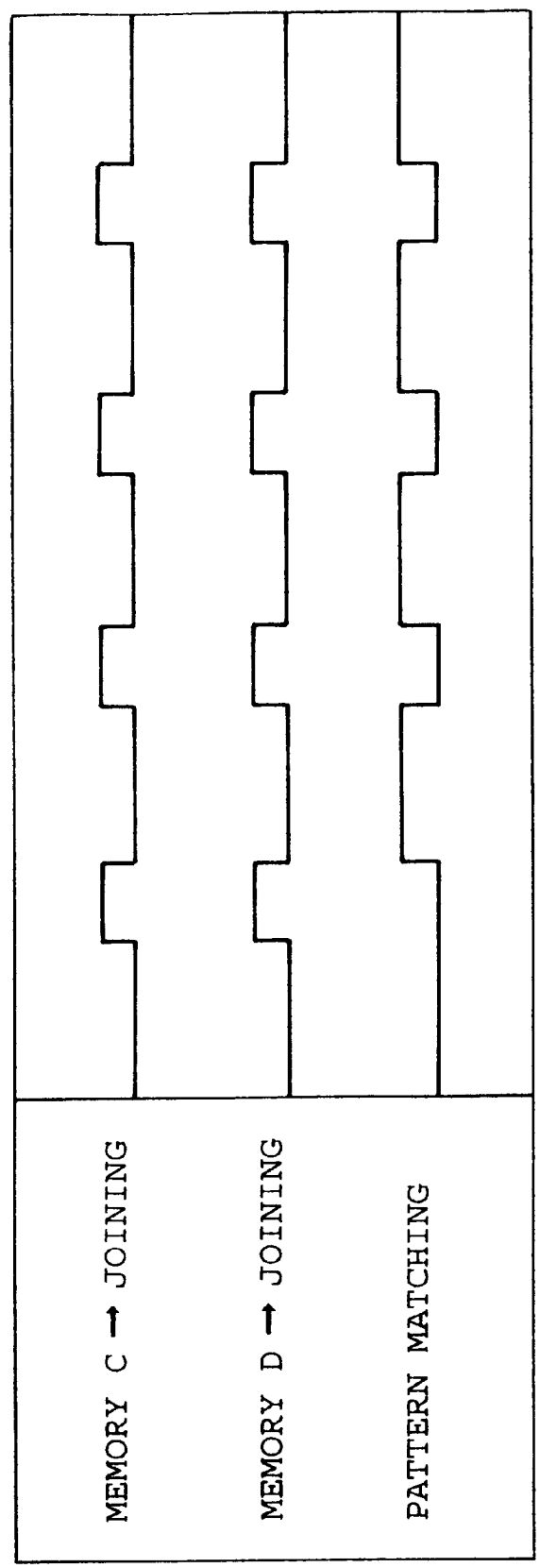
FIG. 17 is a timing chart showing timing of joining processing in the image processing device shown in FIG. 15.
Figure 18:
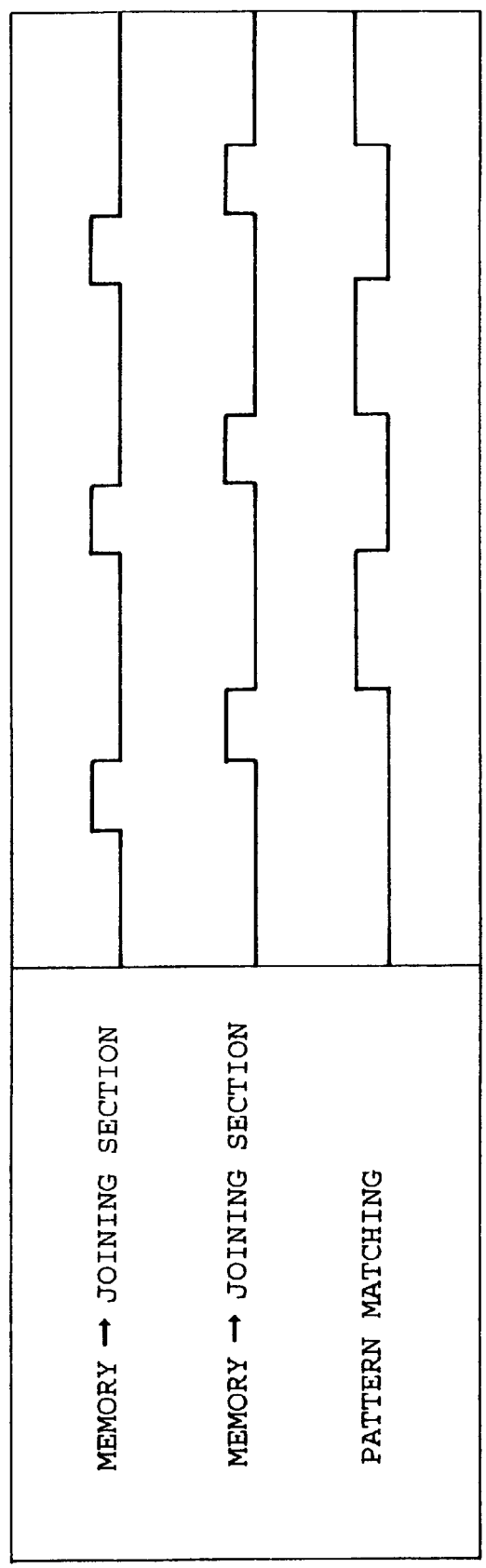
FIG. 18 is a timing chart showing timing of joining processing in the image processing device shown in FIG. 1.

Here, the cycle of pattern matching of the joining section 9 will be explained with reference to FIGS. 17 and 18. FIG. 17 shows the cycle of pattern matching in the present embodiment, and FIG. 18 shows the cycle of pattern matching in the first embodiment.

In the first embodiment, the joining section 9 reads out the search image data and reference image data from the matching memory 6 in time sequence. In other words, in the cycle of pattern matching in the first embodiment, as shown in FIG. 18, the joining section 9 reads out from the matching memory 6, first the search image data, and then the reference image data, and performs matching computation after both search image and reference image data have been read out. For this reason, the time necessary for pattern matching processing is lengthened.

In the present embodiment, in contrast, the memories A through E which store the image data necessary in joining processing (the search image data for matching, reference image data for matching, etc.) are connected to the joining section 9 in parallel, and thus it is possible to read out image data from the memories A through E in parallel.

Accordingly, in the cycle of pattern matching in the present embodiment, as shown in FIG. 17, reduced image data can be read out from the memories C and D in parallel. By this means, the time required for pattern matching processing can be shortened in comparison with the first embodiment, in which the joining section 9 reads out from the matching memory 6 first the search image data, and then the reference image data, and then performs matching computation.

Further, in the present embodiment, the initial (unreduced) images can be read out from the memories A and B in parallel, and thus the memory access time is one-half that of the first embodiment, which helps further increase process speed.

Further, as in the first embodiment, the address producing section 10b of the CPU 10 produces addresses using the matching results. In accordance with these addresses, joining processing is performed in the synthesis data in the memory E, and the joined image data is sent by the DMA controller 21 to the image memory 20, where it is stored as 1-address, 32-bit data.

The joined image data stored in the image memory 20 is sent by the DMA controller 21 to the output control section 13, from which it is outputted to the printer 14, etc.

By using an image bus structure, as the image processing device according to the present embodiment uses the image bus 22, all of the devices connected to the image bus are enabled to read the joined image data. Further, the joined image data can be outputted to other output devices via an SCSI (Small Computer System Interface) bus, and can also be used as input data to be inputted to a PC (Personal Computer), etc. not provided with an input device such as a scanner.

Further, as was mentioned in the first embodiment, the output device (output means) to which the image data is outputted is not limited to any particular device, and may be the printer 14, a facsimile, etc. Further, an image input device, even if provided separately from the output device, will be able to read the joined image data as long as the image input device is connected to the image bus in some manner.

Incidentally, the first embodiment above and the present second embodiment explained processing for joining a first image (search image) and a second image (reference image) in order to obtain an original image, but the present invention is not limited to this.

For example, the image processing device may be provided with an operating section (not shown) for performing joining, which is used to set a number of image scans to be performed by the scanner 1, after which matching data for each of the images obtained by the set number of scans is produced and used to join the plurality of images.

Joining of three or more images is also possible, as long as each image has at least one image overlap domain. Further, the method of the present invention is not limited to monochrome images; and color images may also be joined by giving attention to the parameters of one color or one color space.

THIRD EMBODIMENT

The following will explain a further embodiment of the present invention with reference to FIGS. 19 through 38. The present embodiment will explain a case in which the image processing device according to the present invention is applied to a digital image forming device. Further, the digital image forming device is a combined device having the functions of a copy machine, facsimile, and printer.

The first and second embodiments explained image processing devices which are able to join images with precision, and to perform joining processing at high speed, regardless of whether the images are written characters, halftone dots, or photographs.

The present third embodiment will explain an image processing device which is able to join images with precision, and to perform joining processing at high speed, regardless of whether the images are written characters, halftone dots, or photographs, and, further, which is able to recreate as a single image an original larger in size than an original placement stand, using as little memory capacity as possible and without requiring a long processing time.

Figure 19:
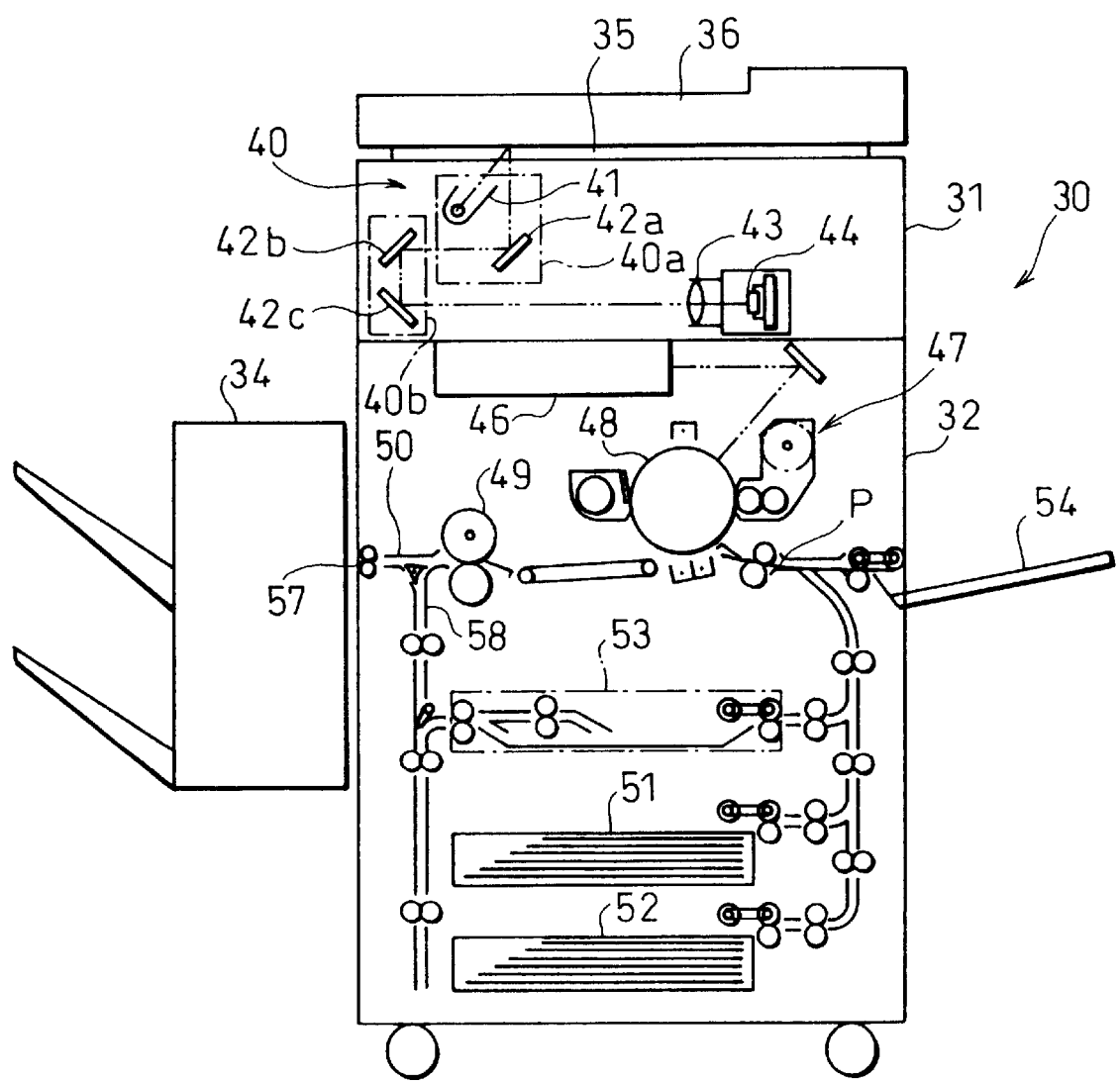
FIG. 19 is a schematic structural drawing of a digital copy machine according to a further embodiment of the present invention.

An image processing device according to the present embodiment, as shown in FIG. 19, includes a digital copy machine main body 30. The digital copy machine main body 30 is broadly divided into a scanner section 31 (original image scanning input means) and a laser recording section 32 (image recreating means).

The scanner section 31 is made up of an original placement stand 35 made of transparent glass; an RADF (Recirculating Automatic Document Feeder) 36 able to handle double-sided original documents, for automatically supplying and transporting an original document to the top of the original placement stand 35; and an original image scanning unit, i.e., a scanner unit 40, for reading an original image by scanning an original document positioned on the original placement stand 35. An original image read by the scanner unit 31 is sent as image data to an image section (a main image processing board 400 and a secondary image processing board 500, both to be discussed below), where the image data undergoes predetermined image processing.

The RADF 36 is a device which automatically supplies to the top of the original placement stand 35 of the scanner section 31 one sheet at a time from a plurality of original documents placed in an original tray (not shown) provided therein. Further, the RADF 36, in order to allow the scanner unit 40 to scan one or both sides of the original according to a selection of the user, is made up of a transport channel for single-sided originals, a transport channel for double-sided originals, transport channel switching means, sensors for grasping the state of originals passing through the foregoing transport channels, a control section for controlling each of the foregoing members, etc. In the past, many patents have been applied for on devices similar to the RADF 36, and many similar devices have been commercially marketed, and accordingly, further explanation of the RADF 36 will be omitted.

The scanner unit 40, included in the scanner section 31 which reads the image of an original on the original placement stand 35, is made up of a first scanning unit 40a, which includes a lamp reflector assembly 41 for exposing the surface of the original, and a first reflector mirror 42a for reflecting light reflected from the original so as to direct the light toward a CCD element 44 (an element for photoelectric conversion of a reflected light image from the original); a second scanning unit 40b, which includes second and third reflector mirrors 42b and 42c for directing the reflected light image from the first reflector mirror 42a toward the CCD element 44; an optical lens 43, which focuses on the CCD element 44 the reflected light image reflected from the original via the reflector mirrors 42a, 42b, and 42c; and the CCD element 44, which converts the reflected light image from the original into electrical image signals.

The scanner section 31 is structured so that the RADF 36 and the scanner unit 40 operate in concert, the RADF 36 successively placing each original document to be scanned on the original placement stand 35, and the scanner unit 40 reading the image of each original so placed by moving along the underside of the original placement stand 35. In particular, the first scanning unit 40a moves at a constant speed V along the underside of the original placement stand 35 from left to right in FIG. 19. Further, the second scanning unit 40b is controlled so as to scan at a speed of V/2 with respect to the speed V of the first scanning unit 40a in the same direction and moving parallel thereto. By this means, the image of an original on the original placement stand 35 can be successively focused on the CCD element 44 one line at a time, thus reading the image.

Image data obtained by reading the original image using the scanner unit 40 is sent to an image processing section (to be discussed below), where it undergoes various image processing, and is then temporarily stored in a memory of the image processing section. In response to an output command, the image data in the memory is read out and sent to the laser recording section 32, which forms an image on a sheet of paper P.

The laser recording section 32 includes a supply and transport system for sheets of paper P, which is the recording material on which images are formed; an LSU (Laser Scanner Unit) 46; and an electrophotographic process section 47 for forming images.

The LSU 46 includes a semiconductor laser light source, which projects laser light in accordance with image data read out from the memory, which was stored in memory after reading by the scanner unit 40, or image data transferred from an external device; a polygon mirror which deflects the laser light with equal angular velocity; and f and φ lenses, which correct the laser light deflected with equal angular velocity so that it is deflected with equal angular velocity onto a photoreceptor drum 48 of the electrophotographic process section 47.

The electrophotographic process section 47 includes a charger, a developer, a transfer device, a sheet separator, a cleaning device, and a charge eliminator, arranged around the circumference of the photoreceptor drum 48, which is a known device.

The supply and transport system for sheets of paper P includes a transport section, which transports the sheets of paper P to the electrophotographic process section 47, specifically to a transfer position thereof, where the transfer device is provided; cassette paper supply devices 51 and 52, which send sheets of paper P into the transport section; a hand-feed paper supply device 54, for supplying to the transport system, as needed, sheets of paper P of necessary sizes; a fixing device 49 for fixing onto a sheet of paper P an image, specifically a toner image, transferred thereto; and a re-supply channel 53, which re-supplies to the electrophotographic process section 47 a sheet of paper P after fixing, so that an image may be formed on the reverse side thereof.

Further, downstream from the fixing device 49 with respect to the transport direction are provided a post-processing device 34, which receives and performs predetermined post-processing of sheets of paper P with images formed thereon; a transport channel 50 and transport rollers 57, which transport sheets of paper P, after fixing, to the post-processing device 34; and a re-transport channel 58, which transports sheets of paper P, after fixing, to the re-supply channel 53.

In the LSU 46 and the electrophotographic process section 47, the LSU 46 scans the surface of the photoreceptor drum 48 with laser light in accordance with image data read out from the image memory, thereby forming on the surface thereof an electrostatic latent image, which toner makes visible as a toner image, which is then electrostatically transferred to and fixed to the surface of a sheet of paper P transported from one of the paper supply sections (the cassette paper supply devices 51 and 52 or the hand feed paper supply device 54) of the multi-cassette paper supply unit.

A sheet of paper P on which an image has been formed in this way is transported from the fixing device 49 into the post-processing device 34 via the transport channel 50 and the transport rollers 57.

Next, a control circuit for controlling the digital copy machine main body 30 having the foregoing structure will be explained with reference to FIG. 20.

Figure 20:
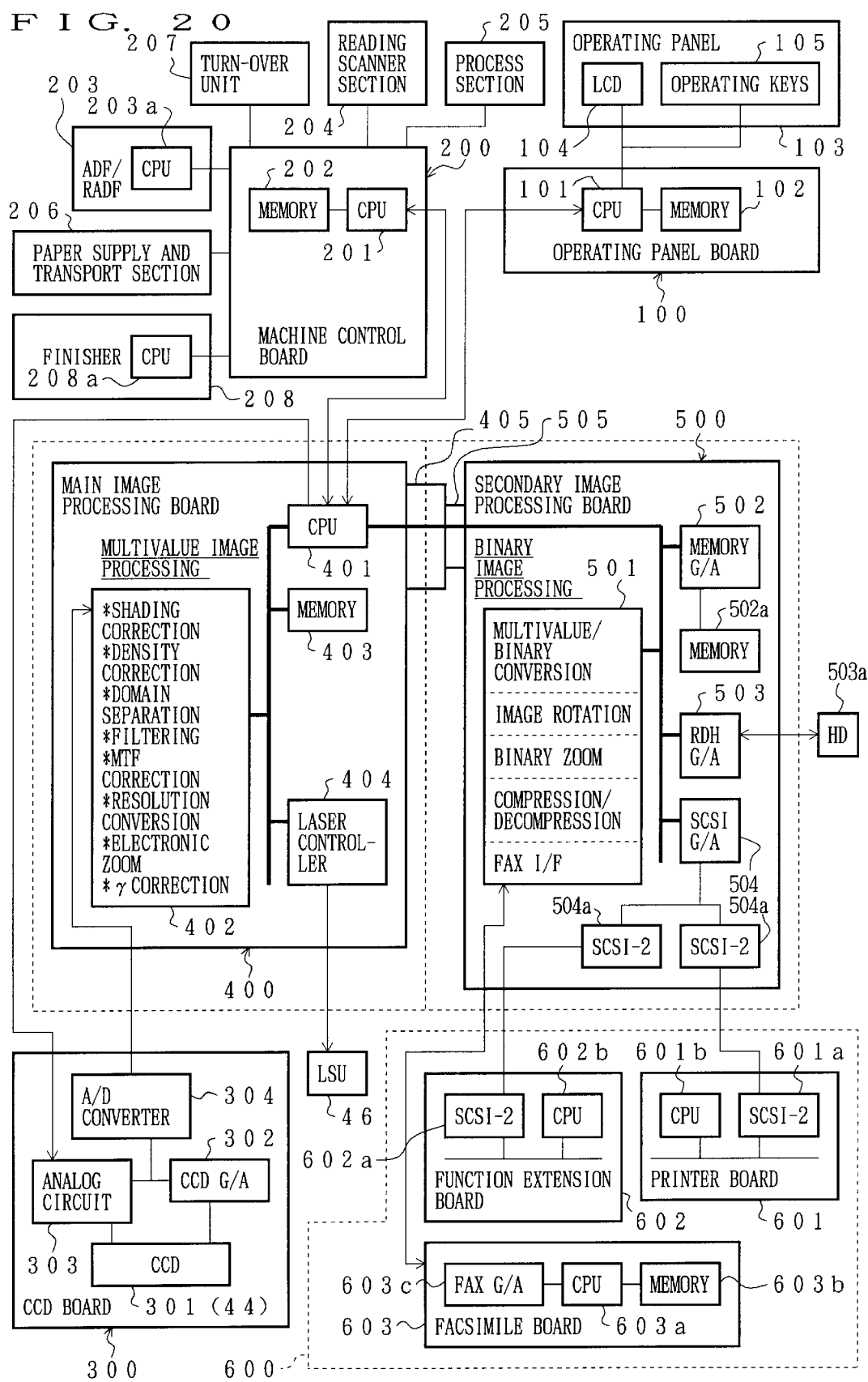
FIG. 20 is a control block diagram of a control circuit provided in the digital copy machine shown in FIG. 19.

FIG. 20 is an overall structural block diagram of the various units, image processing section, etc. which make up the digital copy machine main body 30 shown in FIG. 19, and shows the state of control of operations by a main CPU (Central Processing Unit) 401, shown substantially at the center of the Figure, in cooperation with secondary CPUs provided in the various units.

As can be seen from this block diagram, the present control circuit is made up of an operating panel board 100, which manages and controls an operating panel 103 shown substantially in the upper right corner of the Figure; a machine control board 200, which manages and controls the various units making up the digital copy machine main body 30 shown substantially in the upper left corner of the Figure; a CCD board 300, shown substantially in the lower left corner of the Figure, which electrically reads an original image and converts it into electronic data; a main image processing board 400, shown substantially at the center of the Figure, which performs predetermined image processing of original images converted into electronic data by the CCD board 300; a secondary image processing board 500, which performs further predetermined image processing of image data image-processed by the main image processing board 400; a group of extension boards 600 (a printer board 601, a function expansion board 602, and a facsimile board 603), shown substantially in the lower right corner of the Figure, which are connected to the secondary image processing board 500 via an interface, etc.

The following will explain the management and control exercised by each of the foregoing boards.

The operating panel board 100 is chiefly controlled by a secondary CPU 101, and manages (i) a display screen of an LCD (Liquid Crystal Display) display section 104 provided on the operating panel 103, (ii) operations. input through operating keys 105 used for inputting instructions regarding the various modes, etc.

The operating panel board 100 is also provided with a memory 102 for storing various control information of the operating panel 103, such as data inputted through the operating keys 105 and information displayed on the screen of the LCD display section 104.

In this structure, the secondary CPU 101 performs control data communication with the main CPU 401, and gives operating instructions to the digital copy machine main body 30.

Further, control signals showing the operating status of the digital copy machine main body 30 are sent from the main CPU 401 to the secondary CPU 101. By this means, the LCD display section 104 of the operating panel 103 is enabled to display the operating status in order to inform the user of the current status of the device. In other words, the operating panel 103 functions as processing status display means.

Further, the operating panel 103 also functions as paper size indicating means for indicating the size of paper on which a recreated image is to be recorded.

Incidentally, the main CPU 401 also functions as processing time managing means for measuring and managing the time required in joining processing.

The machine control board 200 is controlled by a secondary CPU 201, and manages devices such as an automatic document feeding device 203 (such as the RADF 36, an ADF, etc.); a reading scanner section 204 (corresponding to the scanner section 31 in FIG. 19) for reading an original image; a process section 205 (corresponding to the laser recording section 32 in FIG. 19) for recreating the image data as an image; a paper supply and transport section 206, which successively supplies paper on which images are to be recorded from a storage section to the process section 205; a turn-over unit 207 which turns over and transports paper with an image formed thereon, so that images can be formed on both sides thereof; a finisher 208 (corresponding to the post-processing device 34 in FIG. 19), which performs post-processing, such as stapling, of paper with images formed thereon, etc.

The automatic document feeding device 203 and the finisher 208 are provided with secondary CPUs 203a and 208a, respectively, which control the respective devices.

Further, the machine control board 200 is provided with a memory 202 for storing various control programs for performing control by the secondary CPU 201.

The CCD board 300 is controlled and managed by the main CPU 401, and is made up of a CCD 301 for electrically reading an original image; a CCD gate array (G/A) 302, which is a circuit for driving the CCD 301; an analog circuit 303, which performs gain adjustment, etc. of analog data outputted from the CCD 301; an A/D converter 304, which converts the analog output of the CCD 301 to digital signals, and outputs it as electronic data, etc. Incidentally, the CCD 301 corresponds to the CCD element 44 shown in FIG. 19.

The main image processing board 400 is controlled by the main CPU 401, and is made up of a multivalue image processing section 402, which, so that gray-scale shading of the image can be expressed as desired, performs processing such as shading correction, density correction, region separation, filtering, MTF (Modulation Transfer Function) correction, resolution conversion, electronic zoom (scaling), and gamma (γ) correction of original image electronic data sent from the CCD board 300 while it is still in the form of multivalue image data; a memory 403 for storing processed image data and/or various control information such as management of the steps of processing; a laser controller 404, which sends data to and controls the LSU 46 in order to recreate an image from processed image data, etc.

The secondary image processing board 500 is connected to the main image processing board 400 via a connector 405 provided on the main image processing board 400 side and a connector 505 provided on the secondary image processing board 500 side. In other words, the secondary image processing board 500 is controlled and managed by the main CPU 401 of the main image processing board 400.

The secondary image processing board 500 is made up of a binary image processing section 501 controlled by the main CPU 401 of the main image processing board 400; a memory 502a which stores and manages image-processed binarized image data and/or control information for processing, and a gate array (memory G/A) 502 for controlling the memory 502a; a hard disk (HD) 503a which stores and manages image data for a plurality of original images, and from which the image data for the plurality of original images is read out a plurality of times in order to produce a desired number of copies, and a gate array (RDH G/A) 503 for controlling the hard disk 503a; SCSIs 504a, which are external interfaces, and a gate array (SCSI G/A) 504 for controlling the SCSIs 504a, etc.

In the present embodiment, the SCSIs 504a used are SCSI-2 standard. However, there is no limitation to this type of SCSI.

Further, the binary image processing section 501 is made up of a multivalue/binary conversion section which converts multivalue image data to binary image data, an image rotation processing section which rotates images, a binary scaling (binary zoom) section which performs scaling of binary images, a compression/expansion section which performs compression and expansion of images, etc., and, to enable sending and receiving of facsimile images through transmission means, is also provided with a facsimile interface (FAX I/F).

The extension boards 600 include a printer board 601, for enabling the laser recording section 32 of the digital copy machine main body 30 to output, in printer mode, data sent from a personal computer, etc.; a function extension board 602, for expanding the editing functions of the digital copy machine main body 30 and enabling effective utilization of the properties of the digital copy machine; a facsimile board, which enables original images read by the reading scanner section 204 (the scanner section 31 in FIG. 19) of the digital copy machine main body 30 to be transmitted as facsimile images, and received facsimile images to be outputted by the laser recording section 32 of the digital copy machine main body 30, etc.

The printer board 601 is provided with an SCSI 601a connected to one of the SCSIs 504a of the secondary image processing board 500, and with a CPU 601b for controlling the SCSI 601a.

The function extension board 602 is provided with an SCSI 602a connected to the other SCSI 504a of the secondary image processing board 500, and with a CPU 602b for controlling the SCSI 602a. In the present embodiment, the function extension board 602 will be explained as an image joining processing board (matching determining means) used in processing for joining inputted images.

Incidentally, in the present embodiment, the standard of the SCSIs 601a and 602a provided in the printer board 601 and the function extension board 602, respectively, is SCSI-2 standard, but is not limited to any standard in particular.

The facsimile board 603 is provided with a facsimile gate array (FAX G/A) 603c, a CPU 603a for controlling the facsimile gate array 603c, and a memory 603b which stores a control program for the CPU 603a, etc.

In what follows, the processing and flow of image data in each of copy, facsimile, and printer modes in a digital image forming device with the foregoing structure will be explained in detail with reference to FIGS. 19 and 20.

First, copy mode will be explained.

Original documents placed in a predetermined location of the RADF 36 of the digital copy machine main body 30 are successively supplied, one sheet at a time, to the top of the original placement stand 35 of the scanner section 31, original images are successively read by means of the structure of the scanner unit 40 explained above, and are sent as 8-bit electronic data, via the CCD board 300, to the main image processing board 400.

The 8-bit electronic data sent to the main image processing board 400 undergoes predetermined processing in the multivalue image processing section 402 as 8-bit electronic image data. The 8-bit electronic image data undergoes processing such as gamma correction, and is sent to the LSU 46 via the laser controller 404.

In this way, the original image read by the scanner section 31 of the digital copy machine main body 30 is outputted from the laser recording section 32 as a copy image having gray-scale shading.

Next, an electronic RDH (Recycle Document Handler) function in copy mode will be discussed.

In the same manner as above, original documents placed in a predetermined location of the RADF 36 of the digital copy machine main body 30 are successively supplied, one sheet at a time, to the top of the original placement stand 35 of the scanner section 31, the original images are successively read by means of the structure of the scanner unit 40 explained above, and are sent as 8-bit electronic data, via the CCD board 300, to the main image processing board 400.

The 8-bit electronic data sent to the main image processing board 400 undergoes predetermined processing in the multivalue image processing section 402 as 8-bit electronic image data.

This 8-bit electronic image data is then sent to the secondary image processing board 500 via the connector 405 on the main image processing board 400 side and the connector 505 on the secondary image processing board 500 side. In the multivalue/binary conversion section of the binary image processing section 501, the 8-bit electronic image data undergoes processing such as error diffusion, and is converted into 1-bit electronic image data.

Processing such as error diffusion is carried out when converting the 8-bit electronic image data to 1-bit electronic image data in order to prevent impairment of image quality, since multivalue/binary conversion alone has problems with regard to image quality.

Again, the 8-bit electronic image data is converted to 1-bit electronic image data in consideration of memory capacity, etc.

Image data for each page of the original document, converted to 1-bit electronic image data in this way, is sent to a disk memory such as the hard disk 503a, where it is temporarily stored.

After all of the original documents placed in the RADF 36 of the digital copy machine main body 30 have been scanned, the 1-bit electronic image data temporarily stored in the hard disk 503a is read out a plurality of times equal to an indicated number of copies. The 1-bit electronic image data read out is sent back through the connectors 505 and 405 to the main image processing board 400, where it undergoes processing such as gamma correction, and is then sent to the LSU 46 via the laser controller 404.

The foregoing explains a case in which the stored image data is read out a plurality of times equal to a desired number of copies after completion of scanning of the images of all of the original documents, but another structure which may be used is one in which image output of the first multi-page copy is begun when a predetermined proportion of the images has been prepared (stored).

In this way, the original images read by the scanner section 31 of the digital copy machine main body 30 are outputted from the laser recording section 32 as copy images having gray-scale shading.

Next, printer mode will be explained.

Images sent from an external device such as a personal computer connected in a network with the present digital image forming device, after being developed as images in pages in the printer board 601, are sent, via the SCSIs 601a and 504a, through the gate array 504 (which is an interface) to the secondary image processing board 500, and are temporarily stored in a memory such as the hard disk 503a.

Here, the images developed as page images by the printer board 601 are sent to the secondary image processing board 500, but the page images do not undergo binary image processing, but are merely stored in the hard disk 503a temporarily.

Further, when the stored page images are read out from the hard disk 503a, binary image processing is not performed thereon.

Then, the image data temporarily stored in the hard disk 503a is read out from the hard disk 503a so as to have a predetermined page order, and is sent to the main image processing board 400, where it undergoes gamma correction. Then, based on the gamma corrected image data, the laser controller 404 controls image writing such that the LSU 46 recreates the images.

Next, facsimile mode will be explained.

Facsimile mode includes transmission of images to another party, and receiving of images from another party.

First, processing for transmitting images to another party will be explained.

In processing for transmitting images, original documents to be transmitted, placed in a predetermined location of the RADF 36 of the digital copy machine main body 30, are successively supplied, one sheet at a time, to the top of the original placement stand 35 of the scanner section 31. Images of the original documents to be transmitted are successively read by means of the structure of the scanner unit 40 explained above, and are sent as 8-bit electronic data to the main image processing board 400.

Next, the 8-bit electronic data sent to the main image processing board 400 undergoes predetermined processing in the multivalue image processing section 402 as 8-bit electronic image data.

This 8-bit electronic image data is then sent to the secondary image processing board 500 via the connector 405 on the main image processing board 400 side and the connector 505 on the secondary image processing board 500 side. In the multivalue/binary conversion section of the binary image processing section 501, the 8-bit electronic image data undergoes processing such as error diffusion, and is converted into 1-bit electronic image data.

Processing such as error diffusion is carried out when converting the 8-bit electronic image data to 1-bit electronic image data in order to prevent impairment of image quality, since multivalue/binary conversion alone has problems with regard to image quality.

The original images to be transmitted, converted into binary images in this way, are compressed in a predetermined form and stored in the memory 502a.

Then, by performing transmission procedures with the other party, a state in which transmission is possible is secured. Thereafter, the original images to be transmitted, compressed in a predetermined form and read out from the memory 502a, are sent to the facsimile board 603, where necessary processing, such as change of the form of compression, is performed. The original images to be transmitted are then successively transmitted to the other party through transmission lines.

Next, processing for receiving images from another party will be explained.

When original images are transmitted from another party through transmission lines, the facsimile board 603 performs transmission procedures and receives the original images transmitted by the other party. The received original images, compressed in a predetermined form, are sent to the binary image processing section 501 of the secondary image processing board 500 via the facsimile interface provided in the binary image processing section 501, and the received original images are then reconstituted as page images by the compression/expansion section, etc.

The received original images reconstituted as images in pages are then sent to the main image processing board 400, where they undergo gamma correction. Then, based on the gamma corrected image data, the laser controller 404 controls image writing such that the LSU 46 recreates the images.

As can be seen from the foregoing discussion, the image processing section for performing predetermined processing of image data is provided in a divided structure of the main image processing board 400 and the secondary image processing board 500. Here, the main image processing board 400 processes, as multivalue image data, original images read and inputted chiefly by the scanner section 31; the secondary image processing board 500 performs predetermined processing, such as binarization, of original image data after processing as multivalue image data by the main image processing section 400, or performs predetermined processing of image data sent from an external device through an external interface before sending this image data to the multivalue image processing section 402 of the main image processing board 400.

Further, the main image processing board 400 includes the laser controller 404, which controls writing of image data by the LSU 46 in order to recreate an image on the photoreceptor drum 48 (which uses the electrophotographic process).

With this structure, an original image read and inputted by the scanner section 31 can be recreated as a copy image by the laser recording section 32 without losing the image features the original possesses as a multivalue image. In addition, by using the secondary image processing board 500, the hard disk 503*a*, etc., a large quantity of original image s can be outputted at high speed by means of the electronic RDH function, etc.

Further, the present structure is capable of performing suitable image data processing which is in keeping with the characteristic digital functions of the digital copy machine main body 30, such as processing and output of image data from external devices such as facsimile and printer, and, with regard to facsimile, binarizing of an image to be transmitted which has been multivalue image-processed (which preserves the features of the original image).

Further, separating the image processing section into two parts makes it possible to create a lineup of different variations of the digital copy machine main body 30, and thus to provide digital copy machines which meet the needs of different users. In addition, separating the image processing section into two parts makes it easy to use system development to tailor a digital copy machine to the needs of a particular user after purchase.

In the foregoing structure, the CPU 401 provided on the main image processing board 400 also manages and controls the secondary image processing board 500. In this way, the entire flow of image data, successively processed in the various processing sections, can be managed, and the flow of data and of processing goes smoothly. Accordingly, there is no loss of image data.

The following will explain image joining processing, which is capable of improving the functions of the digital copy machine main body 30 as an extended function provided as one of the extension boards 600.

First, image joining mode will be explained.

Figure 21A:
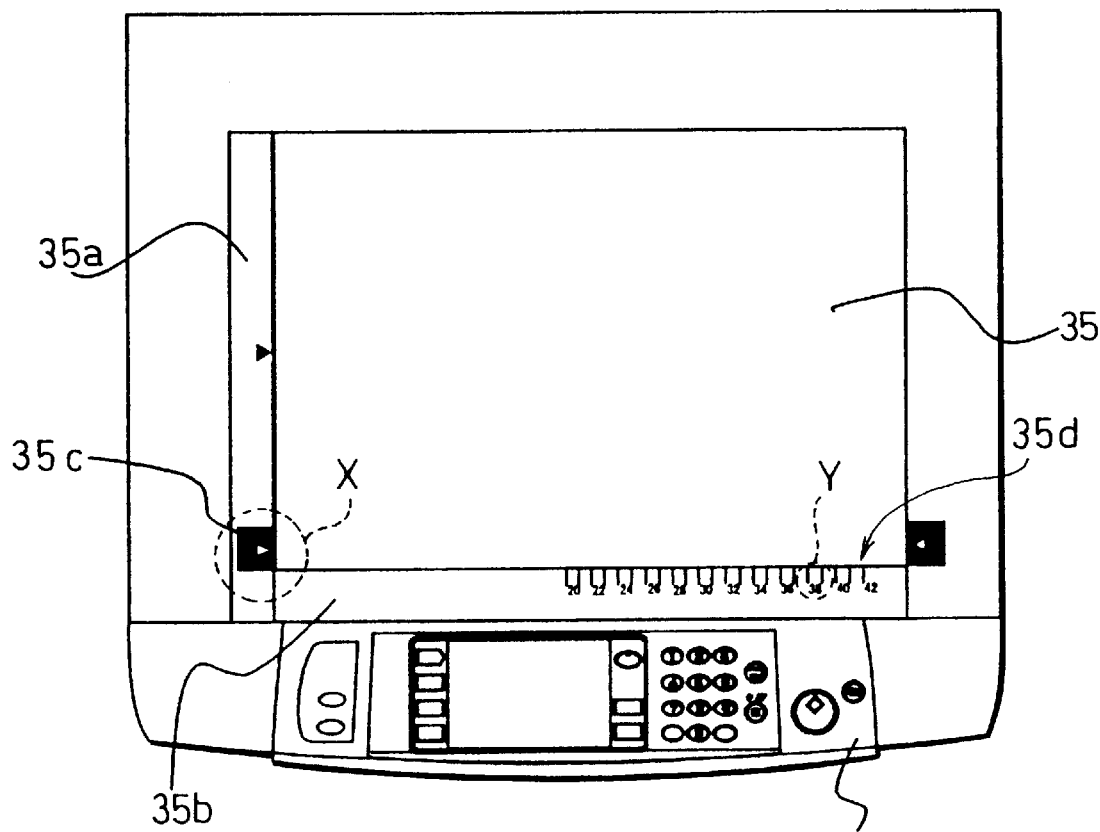
FIGS. 21(a) through 21(c) show an original placement stand and the vicinity thereof in the digital copy machine shown in FIG. 19, FIG. 21(a) being a plan view of the original placement stand, FIG. 21(b) an enlarged view of an area X of the original placement stand shown in FIG. 21(a), and FIG. 21(c) an enlarged view of an area Y of the original placement stand shown in FIG. 21(a).
Figure 21B:
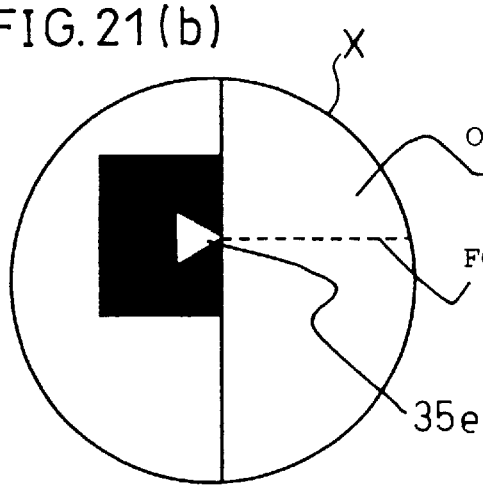
Figure 21C:
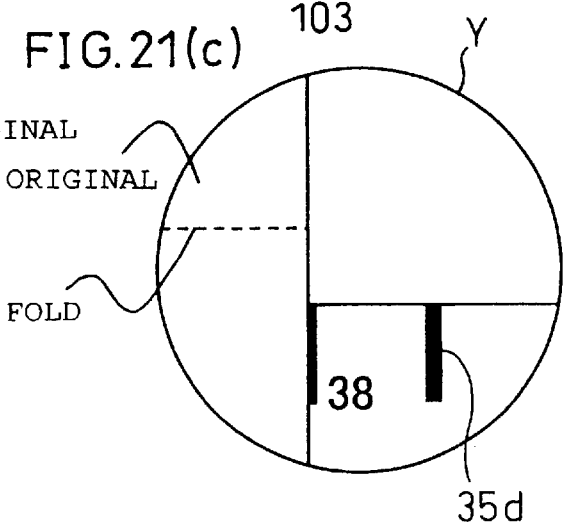

FIGS. 21(*a*) through 21(*c*) are drawings showing the original placement stand 35 where original documents are placed, made of, for example, transparent glass, provided on the upper surface of the digital copy machine main body 30, and the vicinity thereof.

The left side of the original placement stand 35 shown in FIG. 21(*a*) is the side of a standard scanning commencement position of the scanner unit 40 of the scanner section 31; the scanner unit 40 is driven so as to scan to the right parallel with the lower surface of the original placement stand 35 maintaining a fixed interval therewith.

At the left edge of the original placement stand 35 shown in FIG. 21(*a*) is provided an original standard position plate 35*a* for positioning one edge of an original document to be scanned, and at the edge of the original placement stand 35 toward an operating panel 103 is provided an original width measuring plate 35*b* extending in the scanning direction.

Further, at the end of the original standard position plate 35*a* toward the operating panel 103 is provided a marked area 35*c* which indicates a domain of the original used in joining processing in image joining mode. Further, on the original width measuring plate 35*b* are provided scale markings 35*d*, increasing in the scanning direction, for easy measurement of the width of an original placed on the original placement stand 35. The marked area 35*c* and the scale markings 35*d* are provided in such a manner as to be easily understandable.

First, as shown in FIG. 21(*b*), the marked area 35*c* marked on the original standard position plate 35*a* is provided so as to clearly show the extent of an image domain to be used in joining processing. In addition, at the center of the marked area 35*c* is provided a centerline mark 35*e*, which indicates the centerline of the image domain.

Further, as shown in FIG. 21(*c*), on the original width measuring plate 35*b*, the value of each scale marking 35*d* is shown to the right of the corresponding scale marking 35*d*.

The purpose and effect of each of the foregoing members will become clear from the operating method for scanning originals, to be explained later, and thus will not be explained further here.

Next, using the control block diagram shown in FIG. 20, which shows control of the entirety of the digital copy machine main body 30, the flow of image processing in image joining mode will be briefly explained.

A plurality of original images scanned and inputted by the scanner section 31 undergo typical multivalue image processing in the main image processing board 400, and are then sent to the secondary image processing board 500.

Then the original images are converted from multivalue image data to binary image data, and are temporarily withdrawn into the memory 502*a* or the hard disk 503*a*, into which images can be temporarily withdrawn.

Next, matching domain images are extracted from the respective original images. Then the extracted matching domain images only are sent to an image joining processing board added on as the function extension board 602. Next, matching of the matching domain images is performed, thus determining a connecting image which will connect the two original images. In other words, the image joining processing board functions as matching determining means.

Thereafter, using the connecting image determined from the matching domain images, the original images temporarily withdrawn into the memory 502*a* or the hard disk 503*a* are joined in the image joining processing board and outputted by the laser recording section 32 as a single image.

Extraction, matching, and joining of images in image joining mode will be made clear by the image processing steps to be explained below.

The following will explain the method of placing an original document on the original placement stand 35 of the scanner section 31 for scanning, processing steps for joining inputted original images, etc. in image joining mode.

FIGS. 22(a) and 22(b) explain the placing of a large original document G on the original placement stand 35 of the scanner unit 31 of the digital copy machine main body 30, and image joining processing up to storing and management of the respective read original images. Here, processing for copying an original image of A2 size onto A3 size paper will be explained.

FIGS. 22(a) and 22(b) show the flow of processing for reading, as separate images for joining, a first domain G1 and a second domain G2, respectively, of the original document G, and for preparing for joining processing of the respective images for joining. The first domain G1 is the upper half of the original document G, and the second domain G2 is the lower half of the original document G.

First, the first domain G1 of the original document G is scanned by the scanner section 31 of the digital copy machine main body 30.

As explained above, the original standard position plate 35a on the standard side of the original placement stand 35 is provided, at the end thereof nearest the operating panel 103, with a marked area 35c which indicates a matching domain for joining processing. The user places the original document G so that an area where the first domain G1 will be joined to the second domain G2 falls within the marked area 35c.

The image of the first domain G1 read by the scanner section 31 then undergoes predetermined processing as multivalue image data in the main image processing board 400. The image read is processed into multivalue image data G1', which is reduced to 70% of the size of the first domain G1, so that the original document G of A2 size can later be recreated as a single image of A3 size.

Then, multivalue image data G1', which corresponds to the first domain G1 reduced to 70% of its initial size, undergoes multivalue/binary conversion in the secondary image processing board 500, and is divided into a first image for joining Ga1 and a first matching image Ga2. Next, the first image for joining Ga1 undergoes rotation processing of 90°, and the first matching image Ga2 undergoes rotation processing of 180°.

At this point, the first image for joining Ga1 and the first matching image Ga2, now ready for joining processing, are temporarily withdrawn into the memory 502a of the secondary image processing board 500, which is capable of storing images.

Next, as shown in FIG. 22(b), the user rotates the original document G 180° (inverts top and bottom) in order to allow the scanner section 31 of the digital copy machine main body 30 to scan the second domain G2.

Here again, as with scanning of the first domain G1 of the original document G, the user places the original document G so that an area where the second domain G2 will be joined with the first domain G1 falls within the marked area 35c, which indicates a matching domain for joining processing, provided at the operating panel 103 end of the original standard position plate 35a on the standard side of the original placement stand 35.

The image of the second domain G2 read by the scanner section 31 then undergoes predetermined processing as multivalue image data in the main image processing board 400. The image read is processed into multivalue image data G2' reduced to 70% of the size of the second domain G2, so that the original document G of A2 size can later be recreated as a single image of A3 size.

Then, multivalue image data G2', which corresponds to the first domain G2 reduced to 70% of its initial size, undergoes multivalue/binary conversion in the secondary image processing board 500, and is divided into a second image for joining Gb1 and a second matching image Gb2. Further, the second image for joining Gb1 undergoes rotation processing of 270°.

At this point, the second image for joining Gb1 and the second matching image Gb2, now ready for joining processing, are temporarily withdrawn into the memory 502a of the secondary image processing board 500, which is capable of storing images.

After rotating the original document G 180° (inverting top and bottom), it is very difficult for the user to re-set the original document G so that the area thereof falling within the matching area indicated by the marked area 35c during scanning of the second domain G2 (the lower half of the original document G) coincides with the area which fell within the marked area 35c during scanning of the first domain G1.

This difficulty may be solved if the user folds the original document in half, or marks the ends of the centerline between the two halves of the original document G, and aligns the fold or the marks with the centerline mark 35e of the marked area 35c provided at the operating panel 103 end of the original standard position plate 35a. This enables the upper and lower halves of the original document G to be positioned accurately for scanning, which contributes to accuracy of image joining by improving the precision of matching, and to increase of processing speed in joining processing.

The following will explain, with reference to FIGS. 23(a) through 23(d), processing for pattern matching of the first and second matching images Ga2 and Gb2, and for using these pattern matched images to join the first and second images for joining Ga1 and Gb1.

First, the first and second matching images Ga2 and Gb2, prepared in the secondary image processing board 500 and temporarily stored in the memory 502a, are sent to the image joining processing board 602.

Figure 23A:
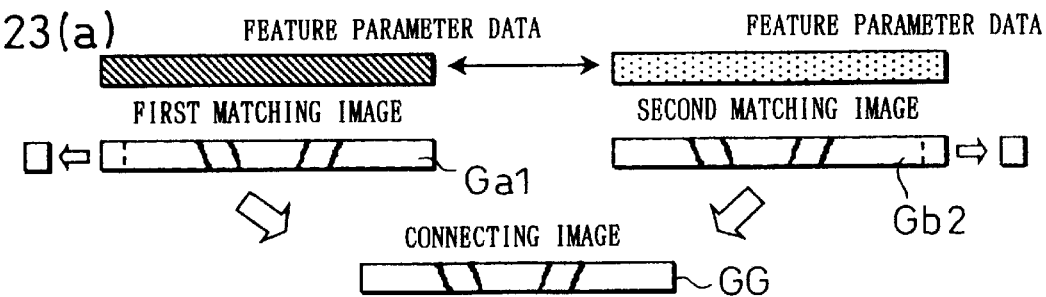
FIGS. 23(a) through 23(d) are explanatory drawings showing processing for joining two images of A3 size to recreate an original image of A2 size, using image data obtained by means of the processing shown in FIGS. 22(a) and 22(b).

Then, in the image joining processing board 602, as shown in FIG. 23(a), unnecessary areas at the ends of the first and second matching images Ga2 and Gb2 (areas beyond the end of the original document G when it was set on the original placement stand 35 for scanning of the first and second domains G1 and G2, respectively) are eliminated. Thereafter, pattern matching is performed based on predetermined algorithms, thus matching the first and second matching images Ga2 and Gb2 to produce a connecting image GG corresponding to a central area of the original document G (where the two halves thereof meet).

Figure 23B:
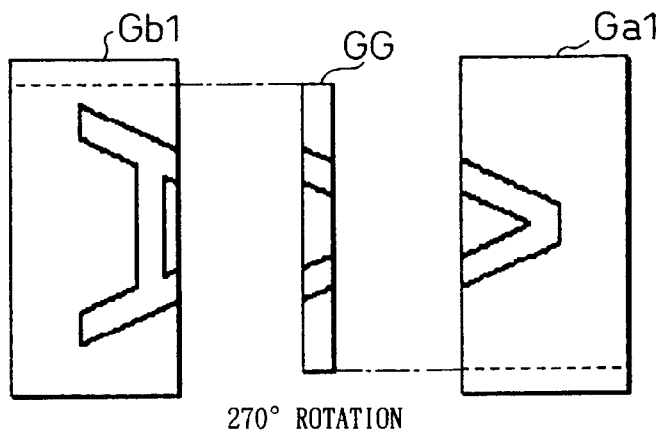

The connecting image GG produced here is sent back to the secondary image processing board 500, and, as shown in FIG. 23(b), is rotated 270° so as to conform with the orientation of the first and second images for joining Ga1 and Gb1, and temporarily stored in the memory 502a.

Figure 23C:
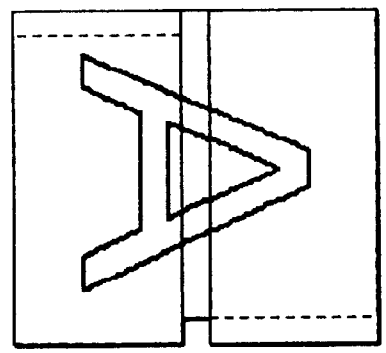
Figure 23D:
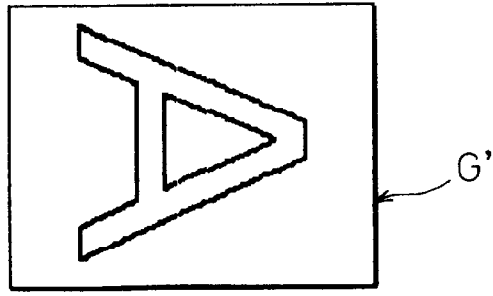

Then, the first image for joining Ga1, the connecting image GG, and the second image for joining Gb1 are read out, in that order, from the memory 502a where they were stored, and are sent to the main image processing board 400. These images are gamma corrected, and then, as shown in FIG. 23(c), recorded by the LSU 46, via the laser controller 404, as a single image on the photoreceptor drum 48 of the electrophotographic process. In this way, as shown in FIG. 23(d), the three images read out are recreated as a single joined image G' (original image) of A3 size.

Incidentally, it is also possible to first complete the final image G' from the first image for joining Ga1, the connecting image GG, and the second image for joining Gb1 stored in the memory 502a, store this final image G' in the memory 502a, and then, at the image output stage, to read out the final image G' from the memory 502a in sequence, send the final image G' to the main image processing board 400 and perform gamma correction thereof, and then, using the LSU 46 via the laser controller 404, record the final image G' as an image on the photoreceptor drum 48 of the electrophotographic process, thus recreating a single joined image of A3 size.

The foregoing explained image joining mode, in which an original document is read as a plurality of images in a plurality of scans, and the images are recreated as a single image of reduced size.

The following will explain a structure for further improving operability and functions in the image joining mode.

In general, original documents are of regular or irregular size.

Figure 24:
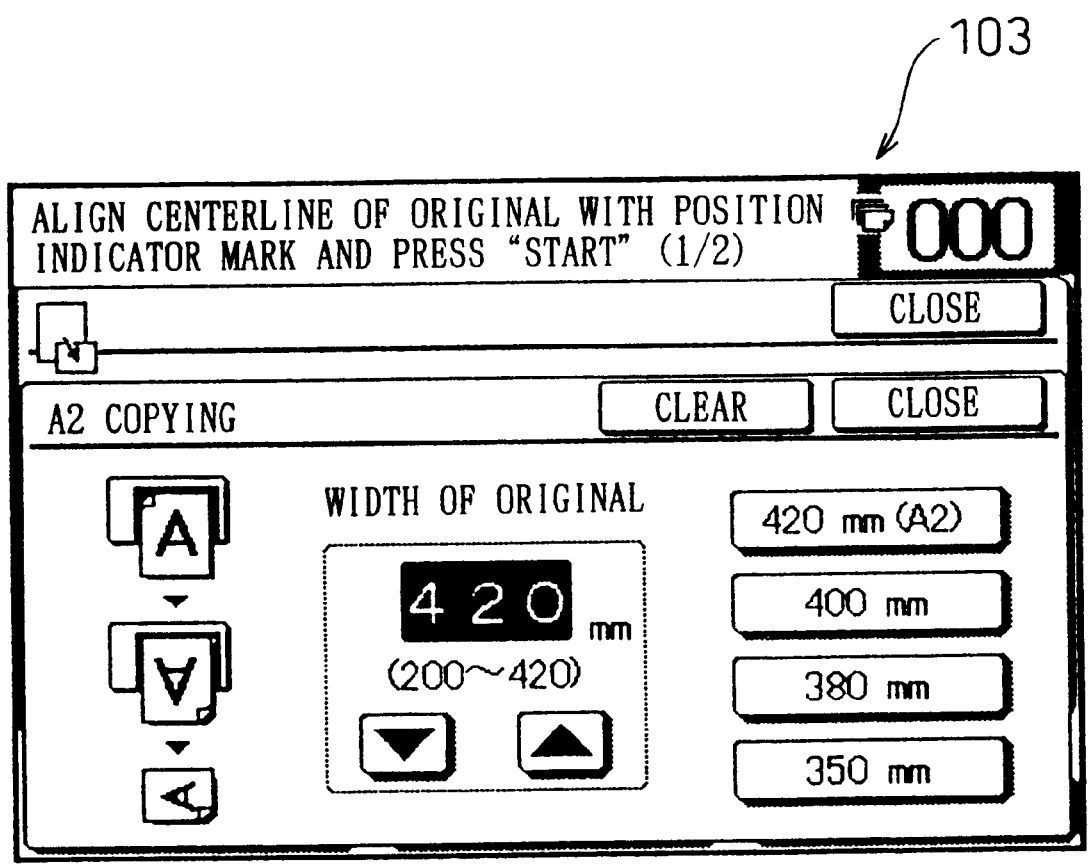
FIG. 24 is an explanatory drawing showing a display screen of an operating panel provided on the digital copy machine shown in FIG. 19, the display screen being used for setting width of an original document positioned on the original placement stand in joining processing.
Figure 26A:
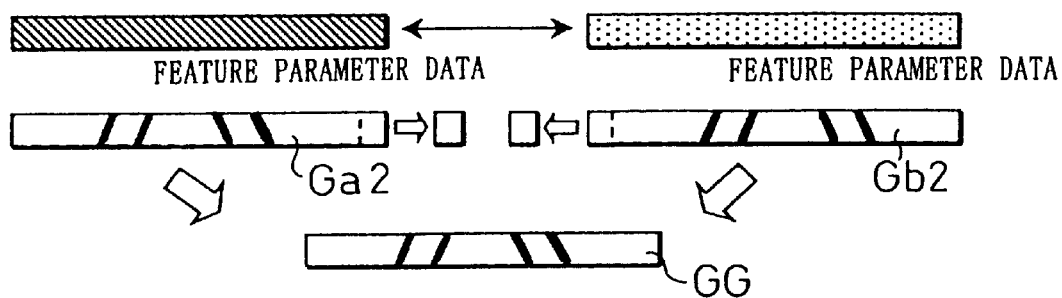
FIGS. 26(a) through 26(d) are explanatory drawings showing processing for joining two images of A3 size to recreate an original image of A2 size, using image data obtained by means of the processing shown in FIGS. 25(a) and 25(b).
Figure 26B:
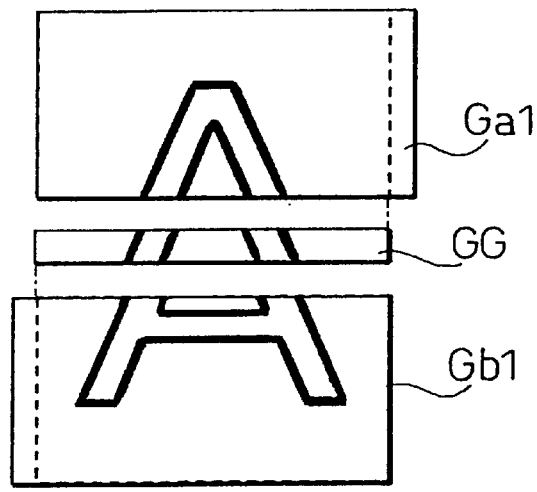
Figure 26C:
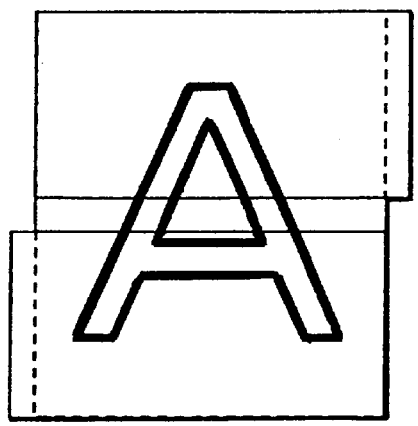
Figure 26D:
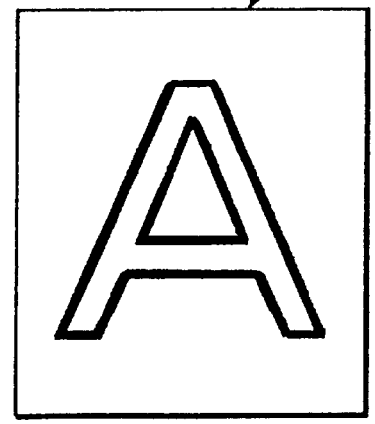

For this reason, when image joining mode is selected, a display image, shown in FIG. 24, is displayed on a liquid crystal display section of the operating panel 103, and the width of an original may be inputted.

On the display screen of the liquid crystal display section, a transparent touch panel is provided so as to cover the display screen. By this means, when the user, consulting the display screen, touches an area thereof where a desired key is displayed, the operating panel 103 recognizes that an input command is made and accepts the input.

With this structure, the original document width presently set is numerically displayed substantially in the center of the display screen. The original document width setting can be increased or decreased in predetermined increments using an up key and a down key displayed below the numerical display.

Further, on the right side of the display screen is displayed a row of four preset width keys, which may be preset to often-used predetermined original document widths, and which enable direct input of original document widths by touch operation.

After setting the width of the original document using the foregoing keys, the upper half of the original document is read by pressing a print key provided on the operating panel 103, and then the lower half of the original document is read by inverting the top and bottom of the original document and pressing the print key again.

At this time, based on the inputted original document width information, the scanner unit 40 of the scanner section 31 of the digital copy machine main body 30 determines the extent of scanning to read the original document, and it is also possible to determine and extract matching images to be used in processing for joining the images read. Consequently, the speed of matching processing in the image joining processing board 602 is increased. Accordingly, matching processing can be completed in a short time.

In addition, even if an original document whose width is not known is placed on the original placement plate 35, in order to allow the width of the original document to be measured, the original width measuring plate 35b is provided with scale markings 35d, and the numerical value of each scale marking 35d is shown to the right thereof, in a location where it is not hidden by an original document placed on the original placement stand 35.

By checking the scale markings 35d and the numerical values thereof, and inputting by operating the touch panel from the display screen shown in FIG. 24, the user can easily determine and input the width of the original document.

As an alternate method of setting the original document width, an original document placed on the original placement stand 35 may be pre-scanned by the scanner unit 40, and the width automatically determined and set by detecting the end of the original document from the original image data read by the pre-scan. A further method of setting the original document width is to automatically determine the width in the longitudinal direction of a matching domain from original image data read by the scanner section 31 in image joining mode.

Incidentally, a method of extracting the end of the original document is to find, from image data of the entire original placement surface read by the scanner unit 40, a difference in density, for example, between the original document and the surface of the original pressure cover, thus extracting data regarding the edge of the original document, and thereby determining the width of the original document in the longitudinal direction of a matching domain.

By using original document width information obtained in one of the foregoing ways to exclude unnecessary image data from the first and second matching images Ga2 and Gb2 determined from the original image data read by the scanner unit 40, the first and second matching images Ga2 and Gb2 of the upper and lower halves, respectively, of the original document G can be processed accurately and in a short time.

The following example will explain a rotation control method for changing the respective orientations of the first and second images for joining Ga1 and Gb1 in accordance with the size and orientation of the paper onto which the joined image is to be recorded.

The foregoing explained a case in which an original image of A2 size is inputted through the scanner section 31, and outputted through the laser recording section 32 by recording onto paper of A3 size. However, the digital image forming device is capable of output as long as paper of a size able to pass through the digital copy machine main body 30 is set in the paper supply section thereof. For this reason, the present digital image forming device must be able to reduce or enlarge a joined image in accordance with a specified paper size before output thereof.

In addition to A3 size, paper sizes able to pass through the digital copy machine main body 30 include, specifically, B4, A4,B5, etc., and with A4 and B5, consideration must also be given to cases in which the paper is rotated 90°, i.e., to A4 R and B5 R sizes.

In image joining processing in the present invention, since A3 is the largest size able to be placed on the original placement stand 35 and read in a single scan, the largest original size able to be processed using image joining processing is necessarily A2 size. Again, since A3 is the largest paper size able to be transported by the digital copy machine main body 30, as a first stage, image joining processing is performed at a first scaling rate of 70%, which is used when copying an A2 size original onto A3 size paper.

Then, in order to fit the single joined image of A3 size onto paper of a specified size, the image is further scaled at a second scaling rate and outputted by recording onto paper of the specified size.

In other words, according to the specified paper size, the joined image of A3 size is further scaled (reduced) at a second scaling rate of 86% when B4 size paper is specified, 70% when A4 size paper is specified, or 61% when B5 paper is specified.

Accordingly, in the present example, the multivalue image processing section 402 of the main image processing board 400 functions as first scaling means, which reduce/enlarge, at a previously set first scaling rate, partial original images inputted by the scanner section 31, and as second scaling means, which determine a second scaling rate from the size of the image to be recreated by the LSU 46, and reduce/enlarge, at the second scaling rate, the partial original images reduced or enlarged by the first scaling means.

Then, the image joining processing board (functioning as matching determining means), based on predetermined edge domains of each partial original image scaled by the first scaling means, determines a matching relationship between the respective partial original images.

The matching relationship determined by the image joining processing board (functioning as matching determining means) is, specifically, a quantity of movement of a predetermined edge domain of one of the partial original images in the longitudinal direction thereof necessary to match the edge domain with the standard of a predetermined edge domain of the other partial original image.

Further, the laser recording section 32 (functioning as image recreating means), on the basis of the matching relationship determined by the matching determining means, recreates a single original image from the partial original images.

Further, the operating panel 103 also functions as indicating means for indicating the size of the original image to be recreated by the image recreating means.

In the foregoing structure, the image recreating means recreate the partial original images as a single original image of the size indicated by the indicating means.

Further, as mentioned above, the joined image must be recreated giving consideration to the size and orientation of the paper onto which the image is to be recorded.

If the paper size indicated for output is A3, then, after processing according to the process explained above using FIGS. 22(*a*), 22(*b*), and 23(*a*) through 23(*d*), the joined image of A3 size can be recreated as it is (full size). Again, if the paper size indicated for output is B4, A4 R, or B5R, then, after processing according to the process explained above using FIGS. 22(*a*), 22(*b*), and 23(*a*) through 23(*d*), the joined image of A3 size may be reduced at the corresponding scaling rate (86%, 70%, and 61%, respectively).

However, if the paper size to be outputted is A4 or B5, then, as shown in FIGS. 25(*a*), 25(*b*), and 26(*a*) through 26(*d*), after rotation processing of, as necessary, the first and second images for joining Ga1 and Gb1 and/or the first and second matching images Ga2 and Gb2, pattern matching is performed to recreate a joined image of A3 size, and the joined image of A3 size is reduced to an image of A4 or B5 size.

FIGS. 25(*a*), 25(*b*), and 26(*a*) through 26(*d*) show an example in which the first image for joining Ga1 and the first matching image Ga2 are rotated 0° (i.e., they are not rotation processed), and the second image for joining Gb1 and the second matching image Gb2 are rotated 180°.

Alternatively, an image of A3 size recreated by matching processing according to FIGS. 22(*a*), 22(*b*), and 23(*a*) through 23(*d*) may be rotated 90° at the same time it is scaled to A4 R or B5 R size, and then outputted by recording onto paper of the appropriate size.

The foregoing completes processing for joining images, but consideration must also be given to correction of misalignment of the positions of the respective images, which may arise depending on the placement of the original on the original placement stand 35.

This issue will be discussed with reference to FIGS. 27(*a*), 27(*b*), and 28(*a*) through 28(*d*).

For example, there are cases in which, during scanning of the upper half of the original, as shown in FIG. 27(*a*), the original document G of A2 size is placed suitably with respect to the original placement stand 35, and the original image is read and inputted in a suitable state, but during scanning of the lower half, as shown in FIG. 27(*b*), the original document G of A2 size is read and inputted in a state of misalignment with respect to the original standard position plate 35*a*.

An original image read and inputted in this state is naturally stored in the image memory in a misaligned state, and the matching image for pattern matching is also naturally determined in a misaligned state.

Figure 28:
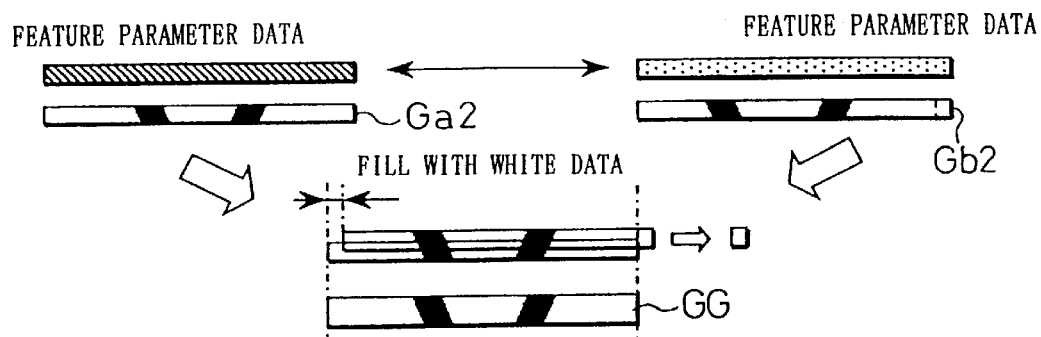
FIGS. 28(a) through 28(d) are explanatory drawings showing processing for joining two images of A3 size to recreate an original image of A2 size, using image data obtained by means of the processing shown in FIGS. 27(a) and 27(b).
Figure 28:
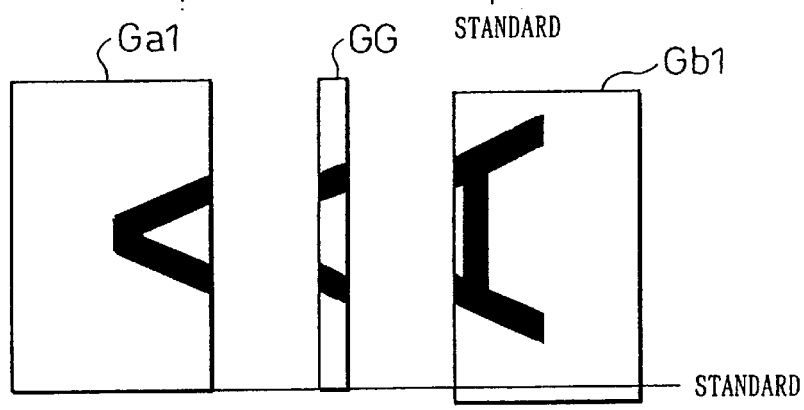
Figure 28:
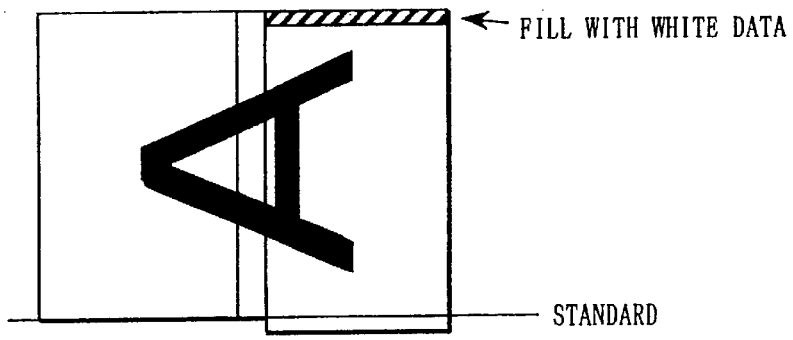
Figure 28:
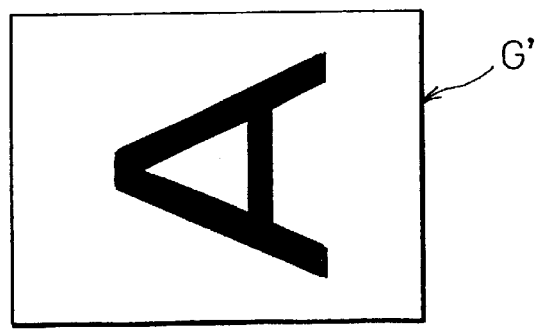
Figure 29A:
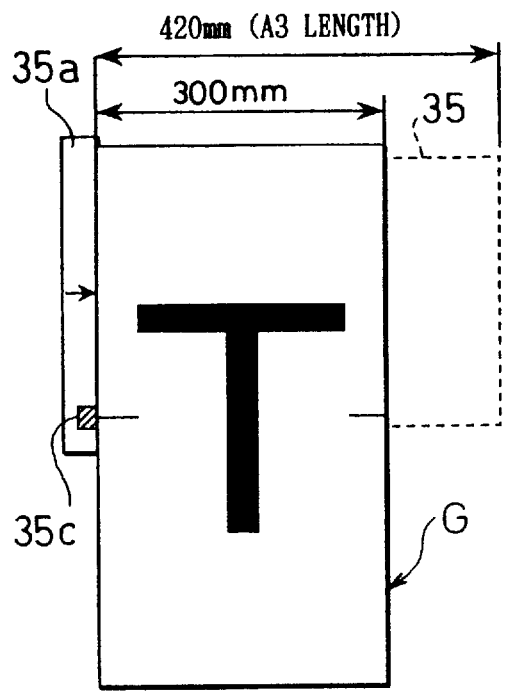
FIGS. 29(a) through 29(e) are explanatory drawings showing the flow of processing for scanning an original document of irregular size.
Figure 29B:
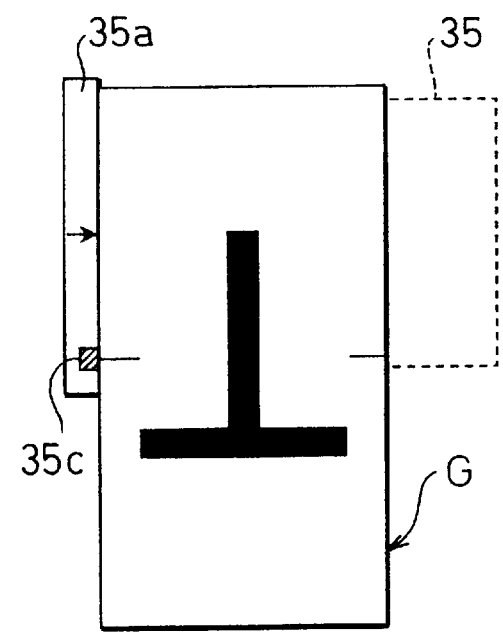
Figure 29C:
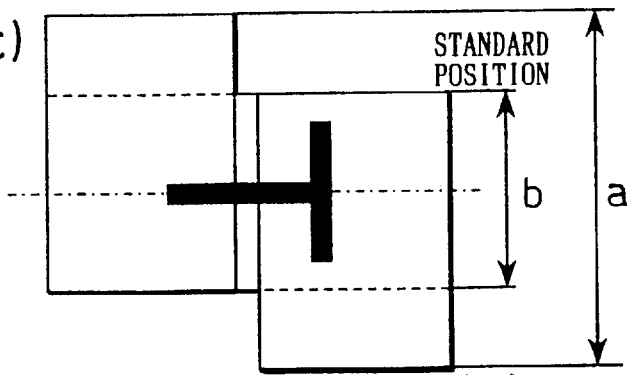
Figure 29D:
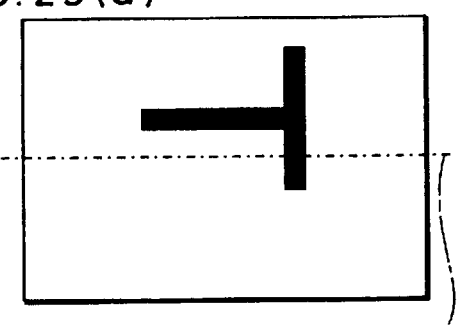
Figure 29E:
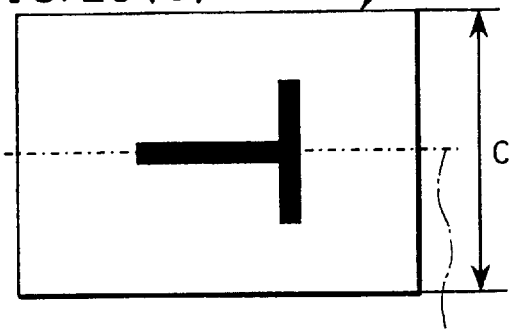

Then, using matching images for pattern matching determined from the respective original images, if one matching image is matched against the standard of the other, the two matching images are matched in a state in which their edges do not align, as shown in FIG. 28(*a*).

In this state, the respective partial original images cannot be joined using the standard matching image and the other matching image. For this reason, a blank area created by movement of the other matching image necessary to match it with the standard matching image is filled with white image data, thus creating a rectangular joined image.

Further, data regarding the quantity of misalignment obtained from pattern matching at this time is stored and managed as misalignment quantity data. This quantity of misalignment is detected by the CPU 602*b* of the image joining processing board 602. In other words, the CPU 602*b* functions as misalignment quantity detecting means.

Then, as shown in FIG. 28(*b*), first the partial original image on the side used as a standard, and then, from the standard side, the matched image GG are successively read, with a predetermined timing, from the image memory as line images. In this way, as shown in FIG. 28(*c*), the partial original image on the side used as a standard and the connecting image GG are first recreated as a single image.

Next, after using the misalignment quantity data previously stored in memory to determine a timing for reading the remaining partial original image, it is read, with the determined timing, from the image memory as a line image. In this way, as shown in FIG. 28(*d*), a joined original image G' is finally recreated from the second partial original image and the image recreated from the first partial original image and the connecting image GG.

Further, the size of the original document is not limited to regular sizes, but may also be an irregular size.

Next, joining processing for an original document of irregular size will be explained with reference to FIG. 29.

If, for example, an original document G of irregular size, shown in FIGS. 29(*a*) and 29(*b*), is processed in image joining mode, the original image recreated as a single image is outputted on paper of a size indicated by the user off-center with respect to the centerline of the paper, as shown in FIG. 29(*d*).

For this reason, as shown in FIG. 29(*c*), the centerline of the original image recreated as a single image is found from either the original document greatest width a or the reduced original image width b, and, based on a relationship to the width c (shown in FIG. 29(*d*)) of the paper onto which the recreated image is to be recorded, the timing for reading out the respective partial original images is controlled such that the single recreated original image is formed substantially in the center of the paper. In this way, the recreated original image G' is completed, as shown in FIG. 29 (e).

The image joining processing shown in FIGS. 29(a) through 29(e) uses algorithms provided for cases in which an original image is read and inputted with the original document placed on the original document placement stand 35 in a misaligned state. However, when, for example, matching processing requires an inordinate length of time, the user must wait. For this reason, as shown in the flow-chart in FIG. 30, when the time required for processing is greater than or equal to a predetermined length of time, the user is informed of this, and prompted to re-scan the original document in an optimum orientation.

In other words, the present image processing device is provided with processing status display means which display the state of progress of matching determining processing, and processing time managing means which manage the time required to determine a matching relationship between respective partial original images using predetermined edge domains of the respective partial original images. When the processing time managing means confirm that the time required for processing is greater than or equal to the predetermined length of time, joining processing is suspended, and the processing status display means inform the user to that effect.

Figure 30:
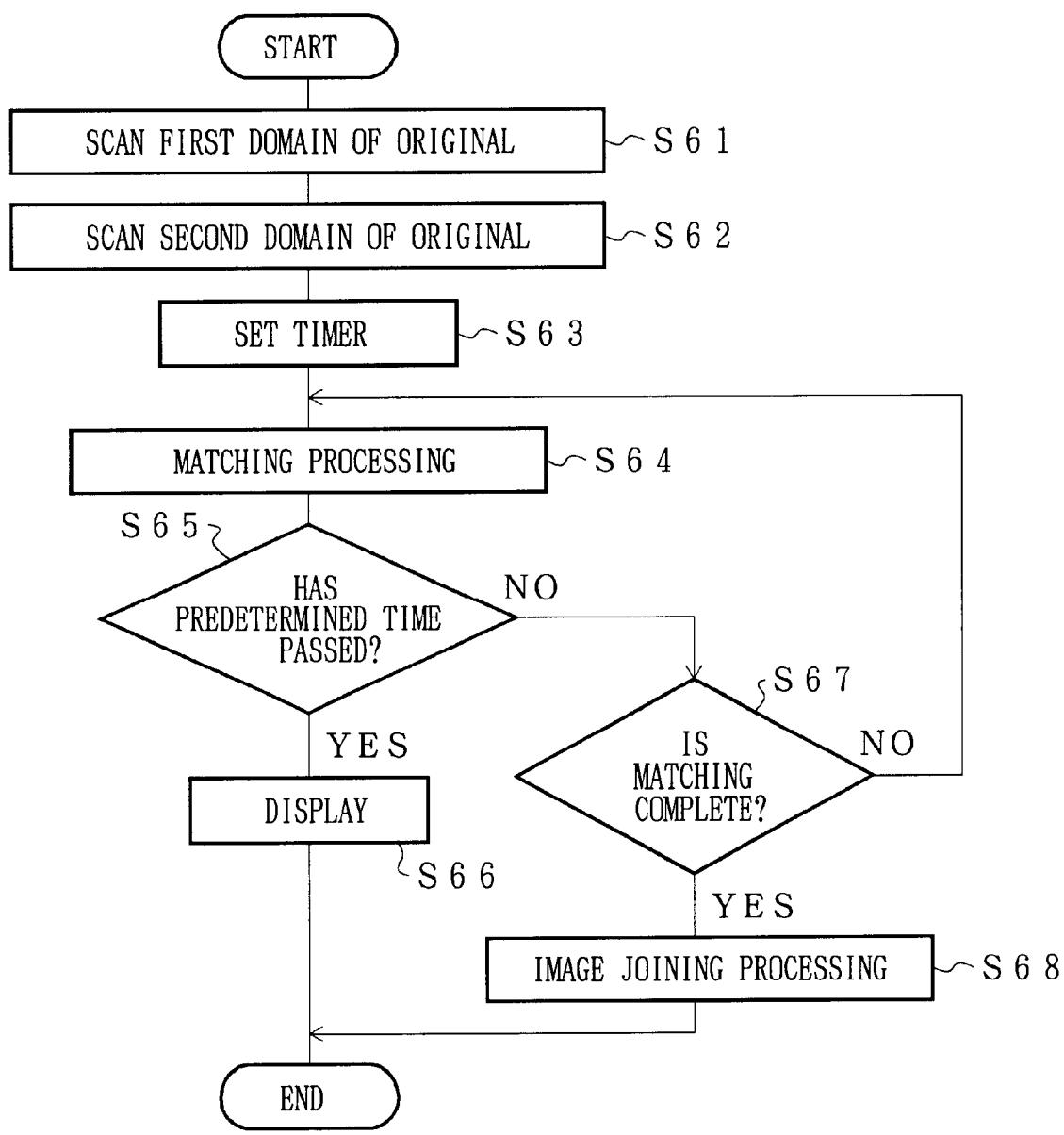
FIG. 30 is a flow-chart showing the flow of processing in an image joining mode executed by the digital copy machine shown in FIG. 19.

In concrete terms, as shown in the flow-chart shown in FIG. 30, first, the first domain of the original document is read (S61). Then, the second domain of the original document is read (S62).

Next, a timer, provided in the image processing device as processing time managing means, is set (S63), and matching processing shown in FIGS. 29(a) through 29(e) is performed (S64).

Next, the timer determines whether the predetermined length of time has passed (S65). Here, if the predetermined length of time has passed, this fact is displayed on a display screen, provided as processing status display means, of the operating panel 103 (S66).

In this way, the user is always able to re-scan original documents in a state which is optimum for matching processing.

If, on the other hand, it is determined in S65 that the predetermined length of time has not yet passed, it is determined whether matching processing is complete (S67). Here, if matching processing is not yet complete, processing returns to S64, and matching processing is continued. If matching processing is complete, however, image joining processing is performed (S68).

With the foregoing processing, the user need not wait even if matching processing takes an inordinate length of time.

Next, the following example will explain, with reference to FIGS. 31 through 37, a further method of shortening processing time when using connecting areas of two partial original images to join the respective partial originals; images to recreate a single original image. The following will explain an example of an original image of A2 size, reduced and recorded on paper of A3 size.

In the present method, the image joining processing board 602, which is the matching determining means, also functions as edge domain image extracting means for extracting images of predetermined edge domains from each partial original image; as matching processing means for performing matching processing, in a matrix of predetermined size, of each predetermined edge domain image extracted by the edge domain extracting means; and as directing means, which, during matching processing by the matching processing means, direct the matching processing means to divide the matrix into a first number of areas and perform a first matching processing, and then, based on the results of the first matching processing, to divide the matrix into a second number of areas greater than the first number of areas, and perform a second matching processing.

Further, the image joining processing board 602 includes a CPU 602b, which functions as control means, which, during matching of edge domain images by the matching processing section, performs control such that the image recreating section commences recreating part of the original image with a predetermined timing.

Figure 31:
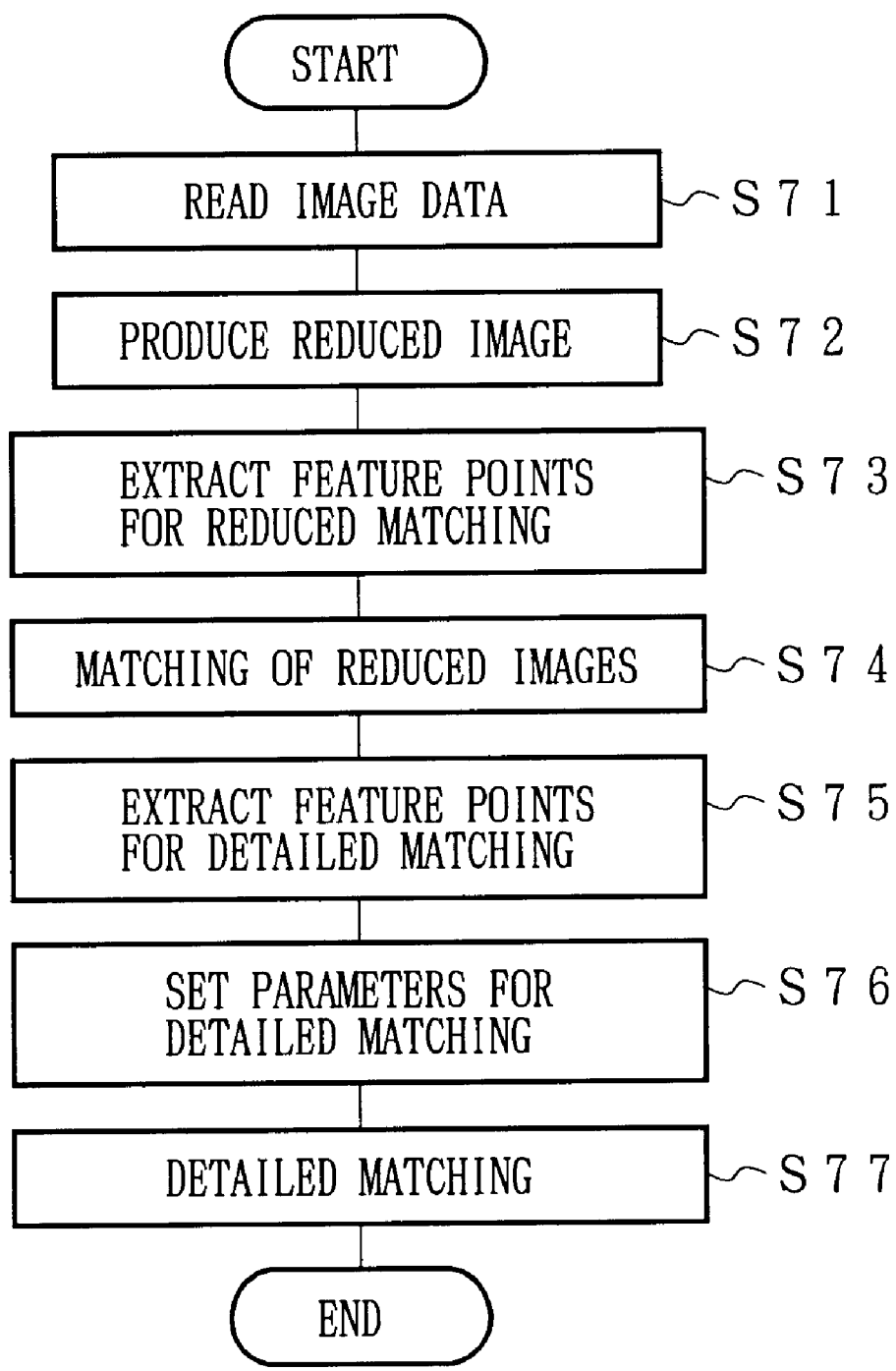
FIG. 31 is a flow-chart showing the flow of processing in another image joining mode executed by the digital copy machine shown in FIG. 19.

FIG. 31 is a flow-chart showing the flow of joining processing in the image joining processing board 602.

Figure 32A:
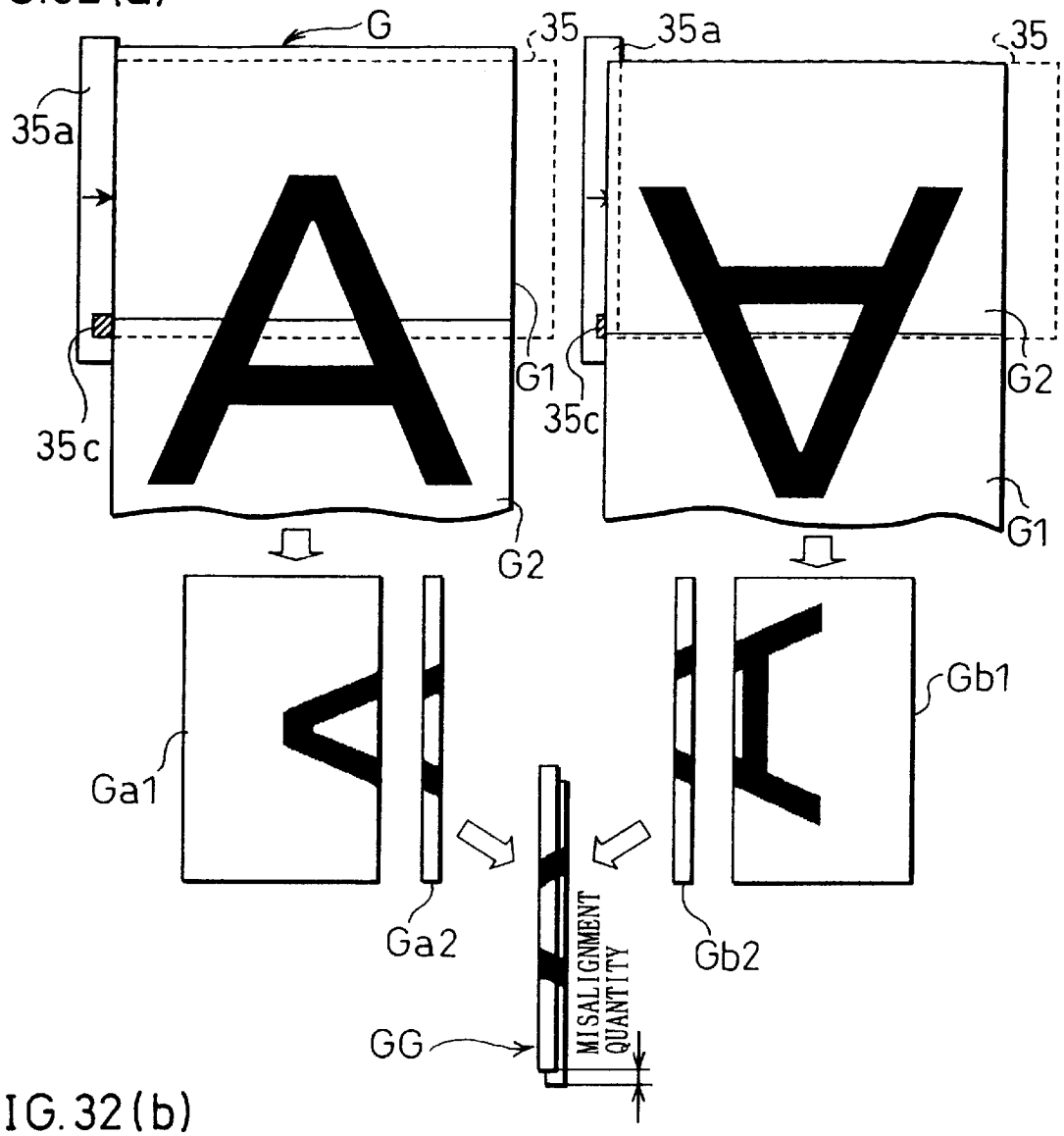
FIGS. 32(a) and 32(b) are explanatory drawings showing the flow of processing for scanning in two scans an original document larger than the original placement stand.
Figure 32B:
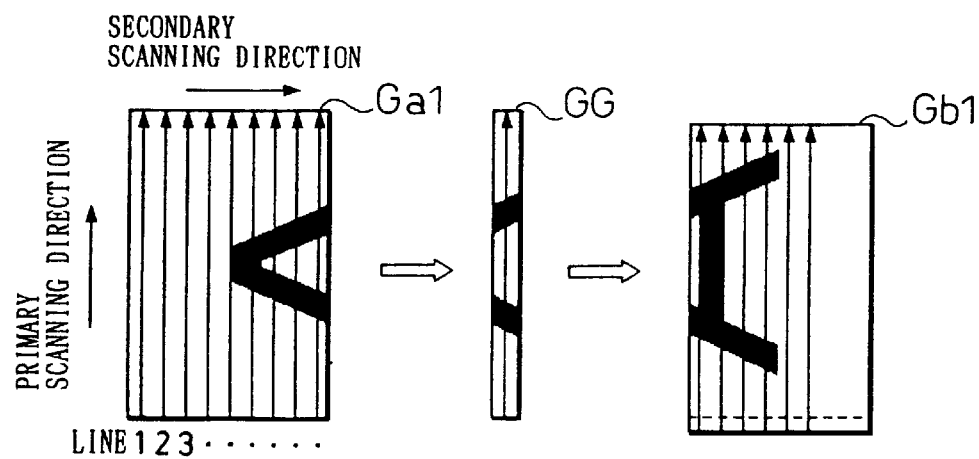

FIGS. 32(a) and 32(b) explain the positioning of a large original document on the original placement stand 35 of the scanner section 31 of the digital copy machine main body 30, and explain processing from reading of respective partial original images through storage and management of the respective partial original images as images for joining.

FIG. 32(a) shows reading of, on the left, the first domain G1, and, on the right, the second domain G2 of the original document G as respective images for joining, and preparation for joining processing of the respective images for joining.

As shown in FIG. 32(b), each line of the original document G placed on the original placement stand 35 is scanned in a primary scanning direction, and the series of lines is scanned in a secondary scanning direction. In other words, when scanning the first domain G1, scanning begins at the top of the original placement stand 35 and moves downward, and when scanning the second domain G2, scanning begins at the bottom of the original placement stand and moves upward. Thus the original document G can be scanned from top to bottom, in this order.

Here, the flow of image joining processing will be explained with reference to the flow-chart in FIG. 31. In the present image joining processing, a matrix of predetermined size, used for confirming matching of the two images, is divided into a first number of areas and rough confirmation (first matching processing) is performed, and then, using the results of the first matching processing, is divided into a second number of areas and fine confirmation (second matching processing) is performed. The present discussion explains reading of an image from an original document of A2 size, and recording of this image onto paper of A3 size.

First, image data is read from the original document (S71). Here, the first and second domains G1 and G2 of the original document G are read and stored as multivalue image data G1' and G2'.

Specifically, as shown in FIG. 32(a), the scanner section 31 of the digital copy machine main body 30 reads the first domain G1 of the original G placed on the original placement stand 35.

As discussed above, a marked area 35c, which indicates a matching domain for joining processing, is provided at the operating panel 103 end of the original standard position plate 35a on the standard side of the original placement stand 35. The user places the original document G on the original placement stand 35 such that an area where the two partial original images will be joined (the first matching image Ga2) falls within the area marked by the marked area 35c.

Then the partial original image obtained by scanning of the first domain C1 of the original document G undergoes predetermined processing in the main image processing board 400 as multivalue image data. This processing is performed such that multivalue image data G' which corresponds to the first domain G1, is reduced to 70% of the size of the first domain G1, so that the original document G of A2 size can later be recorded onto paper of A3 size.

Then the multivalue image data G1', reduced to 70% of the size of the first domain G1, undergoes multivalue/binary conversion in the secondary image processing board 500, and, as shown in FIG. 32(*a*), is divided into a first image for joining Ga1 and a first matching image Ga2. Further, the first image for joining Ga1 and the first matching image Ga2 undergo rotation processing of 90°.

Next, the user, by rotating the original document G 180° (inverting top and bottom) on the original document placement stand 35, allows the scanner section 31 of the digital copy machine main body 30 to scan the second domain G2, which is the lower half of the original document G.

Here again, as with scanning of the upper half of the original document G, the user places the original document G so that an area where the second domain G2 will be joined with the first domain G1 falls within the marked area 35*c*, which indicates a matching domain for joining processing, provided at the operating panel 103 end of the original standard position plate 35*a* on the standard side of the original placement stand 35.

Then the partial original image obtained by scanning of the second domain G2 undergoes predetermined processing in the main image processing board 400 as multivalue image data. This processing is performed such that multivalue image data G2', which corresponds to the second domain G2, is reduced to 70% of the size of the second domain G2, so that the original document G of A2 size can later be recorded onto paper of A3 size.

Then the multivalue image data G2', reduced to 70% of the size of the second domain G2, undergoes multivalue/binary conversion in the secondary image processing board 500, and, as shown in FIG. 32(*a*), is divided into a second image for joining Gb1 and a second matching image Gb2. Further, the second image for joining Gb1 and the second matching image Gb2 undergo rotation processing of 270°.

Figure 33:
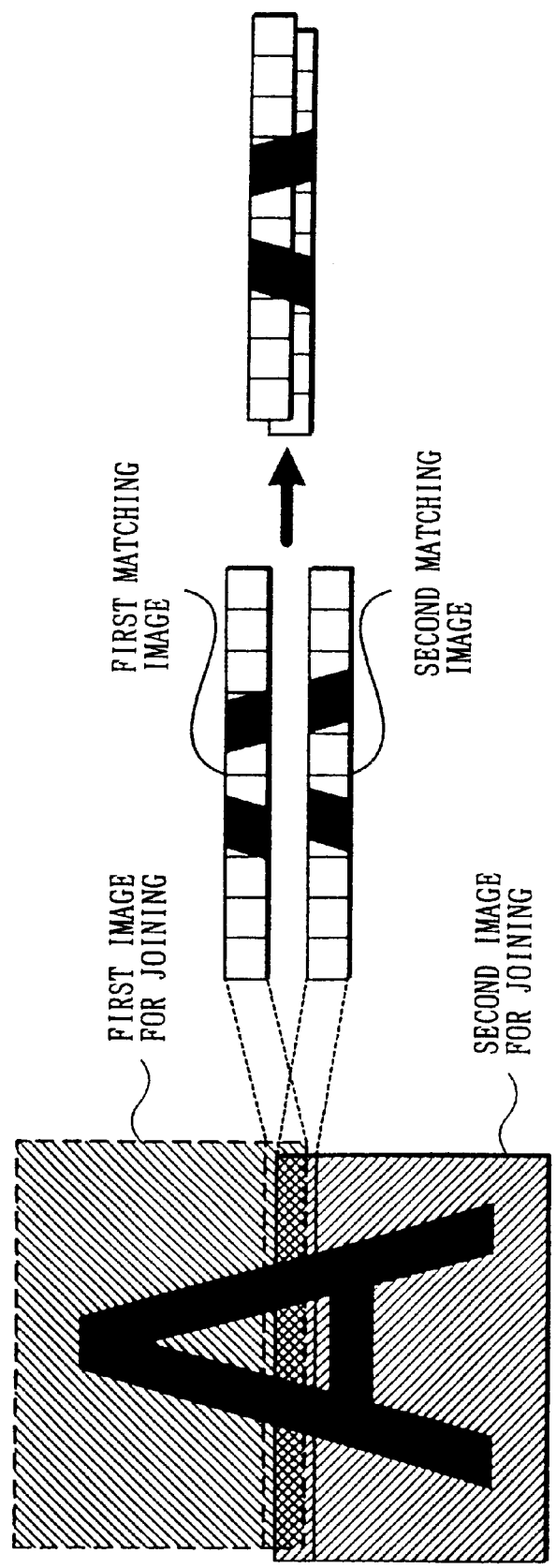
FIG. 33 is an explanatory drawing showing division of a matching image into a matrix of a predetermined number of areas, applied in the flow of processing shown in FIGS. 32(a) and 32(b).

Next the first and second matching images Ga2 and Gb2 are divided into matrices, as shown in FIG. 33. Then, feature points in each area of the matrices are extracted, and matching is performed using these feature points.

Here, the first matching processing will be explained.

Based on the image data read in S71 (the multivalue image data G1' and G2'), reduced images are produced (S72), and feature points for matching are extracted from the reduced images (S73). Then the reduced images are matched based on the feature points obtained (S74). Specifically, feature points for reduced matching are extracted from the foregoing reduced images of the multivalue image data G1' and G2'.

Figure 34:
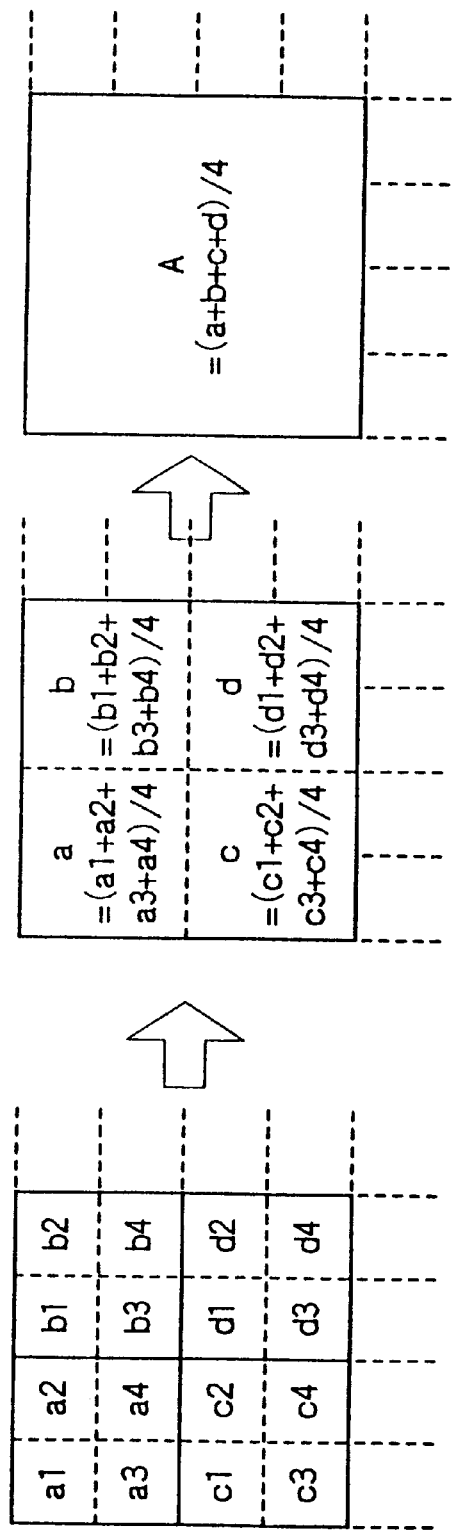
FIG. 34 is an explanatory drawing showing the process of producing a reduced image of the matching image shown in FIG. 33.
Figure 35:
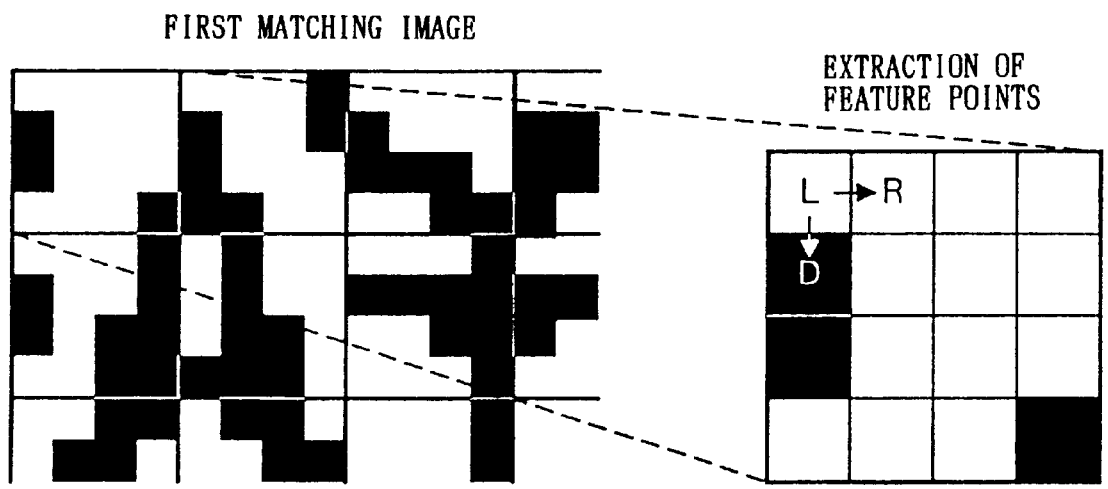
FIG. 35 is an explanatory drawing showing extraction of feature points of the reduced image, produced in FIG. 34, of a first matching image.

In other words, for the first and second matching images Ga2 and Gb2 stored in memory, as shown in FIG. 34, a simple mean of the densities of four adjacent pixels (for example, a1, a2, a3, and a4) is calculated, and the value obtained is used as the density of a pixel of the reduced image (for example, a). This processing is repeated for the entirety of the first and second matching images Ga2 and Gb2, yielding reduced images 1/4 the size of the initial images.

By performing equivalent processing of the reduced images of 1/4 size, reduced images 1/16 the size of the initial images are obtained, and these are stored in memory.

The first matching processing, of rough precision, is performed using these reduced images of 1/16 size. In other words, matching of the reduced images is performed.

Here, extraction of feature points in reduced image matching will be explained.

First, the first matching image Ga2 is divided into a matrix of N areas (pixel groups).

In each area of the matrix, a difference in density between a pixel (R) adjacent to and on the right of a given pixel (L) and a pixel (D) adjacent to and below the given pixel (L) is calculated. Then, if the calculated density difference is greater than or equal to a specified threshold value, that pixel is extracted as a feature point, and the coordinates thereof are stored in memory.

The foregoing processing is repeated for each pixel in that area of the matrix. However, when the number of feature points detected within one area of the matrix reaches a predetermined number, extraction of feature points is ended for that area.

The foregoing feature point extraction processing is repeated for each area of the matrix.

Figure 36:
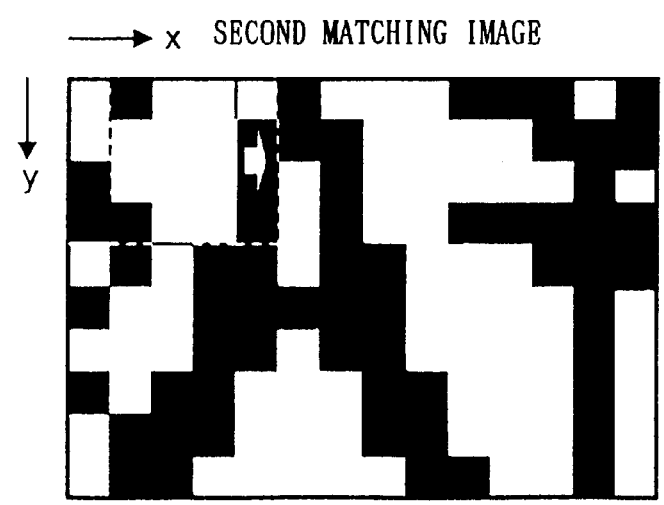
FIG. 36 is an explanatory drawing showing performance of matching processing of a first matching image and a second matching image, using the feature points, extracted in FIG. 35, of the first matching image.
Figure 37:
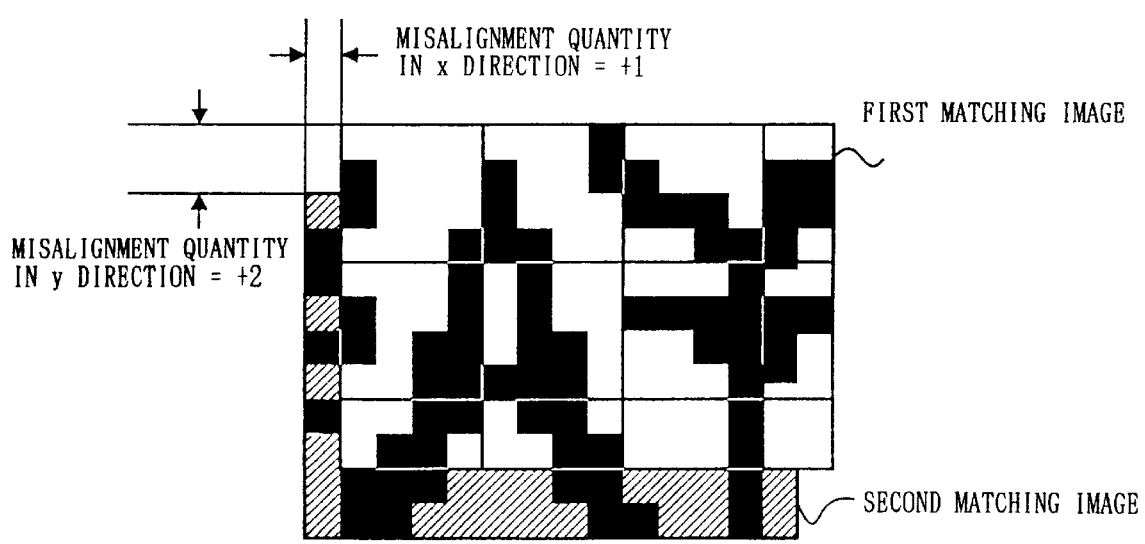
FIG. 37 is an explanatory drawing showing quantity of misalignment after matching processing of the first and second matching images.

Next, as shown in FIG. 36, each of the areas, in the matrix of the first matching image Ga2, having at least a predetermined number of feature points obtained by the foregoing operations is superimposed on and moved over the second matching image Gb2 one pixel at a time, beginning in the upper left corner and moving in the x direction shown in the Figure. For each area of the first matching image Ga2 moved, each time the area is moved, a density difference is calculated between a pixel of the second matching image Gb2 adjacent to and on the right of the feature point and a pixel of the second matching image Gb2 adjacent to and below the feature point.

When that area of the matrix reaches the right edge of the second matching image Gb2, it is returned to the left edge thereof, moved one pixel in the y direction, and searching is re-commenced moving one pixel at a time in the x direction. Searching is repeated in this way until the area reaches the last pixel of the second matching image Gb2.

The foregoing searching is repeated using each area of the matrix of the first matching image Ga2.

Here, searching moves first in the x direction and then in the y direction, but searching may also be commenced in the y direction.

If the results of calculation are less than or equal to a certain threshold value, the position of the area at that time is stored in memory as a candidate area.

Further, if an area is found where the values obtained by calculation are less than or equal to a predetermined value, the position of the area at that time is determined as a determined area.

Again, if a predetermined number of candidate areas cannot be found within a predetermined length of time, the threshold value which is the standard for feature point extraction is reduced.

This predetermined length of time is changed according to the size of the original document, and is longer for larger originals, and shorter for smaller originals.

Narrowing the focus to determined areas and candidate areas obtained as above, more detailed second matching processing of each determined area and candidate area is carried out using the unreduced original images.

Next, the second matching processing will be explained.

First, feature points for detailed matching (second matching processing) are extracted (S75) from the determined areas and candidate areas of the first and second matching images Ga2 and Gb2 obtained by the matching of reduced images (first matching processing) in S74. Next, based on these feature points, parameters for detailed matching are set (S76). Then detailed matching (second matching processing) is carried out based on the set parameters (S77).

The steps of the second matching processing are the same as those of the foregoing matching of reduced images (first matching processing), and accordingly will not be discussed here.

Using areas for which the results of calculation are the smallest of those obtained in S71 through S77 above, a quantity of misalignment between the first and second matching images Ga2 and Gb2 (see FIG. 32(a)) is found and stored in memory.

In other words, when the two matching images Ga2 and Gb2 are matched, the quantity of misalignment of the second matching image Gb2 with respect to the first matching image Ga2 (in the example shown in FIG. 37, +1 in the x direction and +2 in the y direction) is stored in memory.

Further, if the foregoing operations are unable to determine a single determined area, then, by means of processing like that in the flow-chart shown in FIG. 30, the user is informed of that fact and encouraged to re-scan the original document in an optimum position.

The following will explain an output method for outputting the two partial original images (of the first and second domains G1 and G2) as a single original image, based on the matching results. As mentioned above, the following will explain reduction and recording of an original image of A2 size onto paper of A3 size.

In the present method, recording of one of the images is commenced with the predetermined timing of joining processing.

When, as in this example, an A2 size original image is reduced and recorded onto A3 size paper, by supplying the paper to the recording section in a longitudinal orientation, recording of one of the partial original images can be commenced while joining processing is being performed.

The timing of commencing recording is determined from the size of the original document, and joining processing is completed before completion of recording of one partial original image, beginning with the end thereof opposite the end being joined to the other partial original image.

Next, a connecting image obtained using the foregoing joining processing and the remaining partial original image are outputted in succession, yielding a single joined image.

The larger the size of the original document, the longer is the time required for joining processing. For this reason, with large original documents such as A2 size, the timing of commencement of recording is made later, and with smaller original documents such as A4 size, the timing of commencement is made earlier.

By this means, operations do not wait until joining processing is fully completed, and the time needed to join two partial original images and output them as a single original image can be shortened.

Further, it is also possible to change the timing of commencement of recording according to the number of feature points obtained during pattern matching processing.

In other words, when there is a large number of feature points, joining processing may not be completed by the time of completion of recording of the first partial original image. For this reason, recording of one partial original image, beginning with the end thereof opposite the end being joined to the other partial original image, is commenced prior to completion of joining processing only when there are not more than a predetermined number of feature points.

Further, depending on the size of the original document, the quantity of matching image data to be compared during second matching processing changes, and the candidate areas also change, and thus the time required to complete detailed matching varies. Further, the time required to prepare for recording is longer for large original documents, and shorter for smaller original documents. For these reasons, it is preferable that the predetermined number of feature points necessary to commence recording be changed according to the size of the original document.

By this means, problems such as stoppage of recording of the image can be eliminated.

The following will explain a recording method for outputting the two partial original images as a single image with certainty.

As discussed above, in joining processing, white image data corresponding to the misalignment quantity is added to the left or right side of one of the partial original images in memory, and thus processing is complicated. For this reason, forming in memory the image for output requires a long time, and consumes a large amount of memory.

Figure 38:
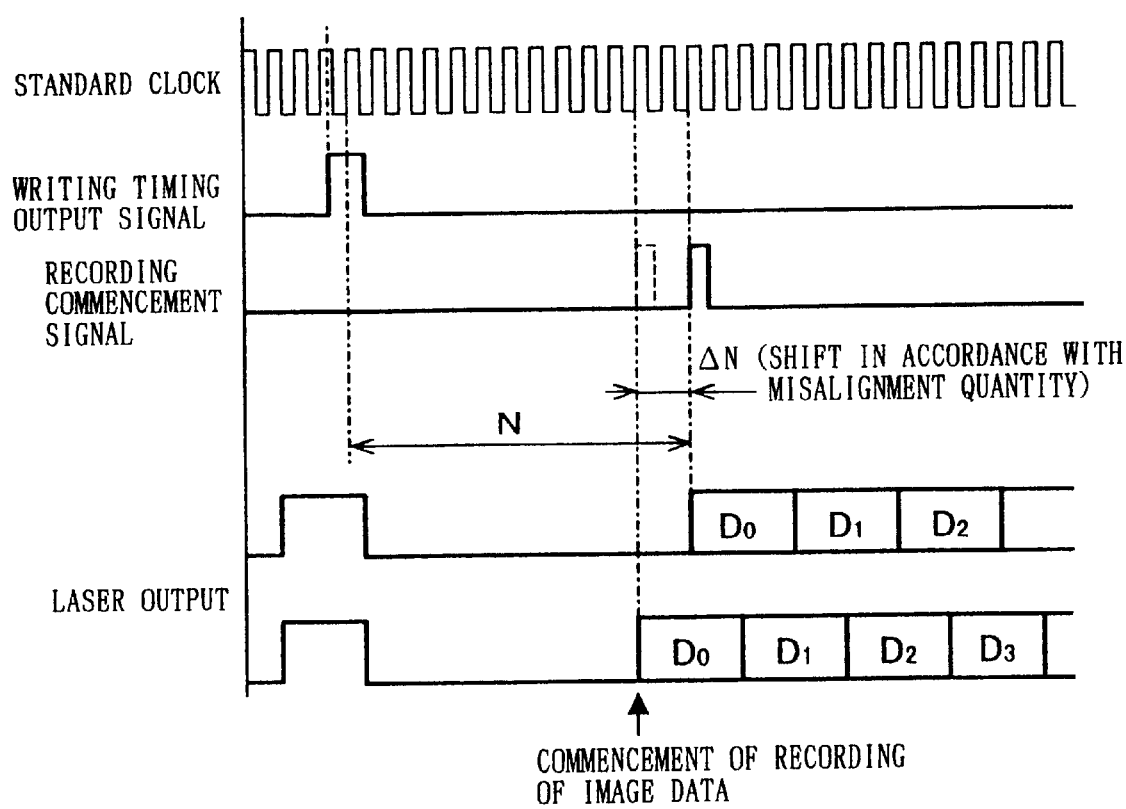
FIG. 38 is a timing chart showing a timing of commencement of image data recording which gives consideration to quantity of misalignment after matching processing.

Accordingly, in the present method, instead of outputting an image for output completely formed in memory, the CPU 401 connected to the multivalue image processing section 402, functioning as original image shifting/recreating means, are used, as shown in FIG. 38, to convert the misalignment quantity into a quantity of time, and to shift the timing of commencement of recording by that quantity of time. Thus the two partial original images can be recorded as a single joined image.

First, the main CPU 401 reads out the image data from the memory 403 with a timing synchronized with a writing timing output signal outputted by the writing device (such as the LSU 46 shown in FIG. 20).

The image data read out from the memory 403 still includes the misalignment quantity. In other words, the misalignment quantity is detected by the image joining processing board 602, functioning as misalignment quantity detecting means, as discussed above.

As a way of correcting the misalignment, the misalignment quantity obtained through joining processing is, with one pixel treated as equal to a predetermined number of clocks, converted to a quantity of time, and the recording commencement signal is changed by that quantity of time. Thus the two partial original images can be joined and recorded as a single joined image. In other words, as shown in FIG. 38, the recording commencement signal is shifted in accordance with the misalignment quantity ΔN obtained through joining processing, thus changing the time of commencement of recording of the image data (D0, D1, D2, D3, . . . ).

In this way, when recording the first partial original image and then joining the second partial original image thereto, by shifting the timing of recording of the second partial original image in accordance with the detected misalignment quantity, processing can be simplified, thus contributing to shortening of recording time, and the amount of memory used can also be reduced.

As discussed above, one image processing device according to the present invention is made up of input means, which read a plurality of images and input each image as multivalue digital image data; matching data producing means, which produce matching data for joining the inputted images; binarizing means, which binarize the multivalue digital image data inputted by the input means, thus obtaining binary data corresponding to image data of each inputted image; joining means, which, on the basis of the matching data produced by the matching data producing means, synthesize the inputted images into a single image by joining the binary data corresponding to image data of the inputted images; and output means, which output the single image synthesized by the joining means; in which the matching data producing means produce the matching data on the basis of the multivalue digital image data inputted by the input means (hereinafter referred to as "structure (1)").

Further, as discussed above, another image processing device according to the present invention is made up of, in addition to structure (1), first memory means for storing the multivalue digital image data inputted by the input means; second memory means for storing the matching data produced by the matching data producing means; and third memory means, for storing, as image data for synthesis, the binary data for each inputted image, obtained by the binarizing means; in which the matching data producing means produce the matching data on the basis of the multivalue digital image data stored in the first memory means, and the joining means join the binary data for the inputted images, stored in the third memory means, on the basis of the matching data stored in the second memory means (hereinafter referred to as "structure (2)").

Consequently, even with an original, such as a halftone dot image or photographic image, for which binarizing produces large areas of similar images, the matching data is produced on the basis of the multivalue inputted image data prior to binarizing, and thus matching points necessary for joining images can be accurately extracted. Thus, an effect of this structure is that images of whatever type can be joined with high precision.

As discussed above, a further image processing device according to the present invention is equivalent to structure (1) or (2), in which, further, the matching data producing means perform matrix processing of the image data inputted by the input means, in which a matrix is used to divide the image data into a plurality of groups of pixels, and produce the matching data on the basis of the data of each group of pixels within the matrix (hereinafter referred to as "structure (3)").

Consequently, by performing matrix processing of the image data inputted by the input means, and producing the matching data on the basis of the pixel data within the matrix, pattern matching of the pixel data is performed using pixel data within the matrix (multivalue data) Thus, an effect of structure (3), in addition to those of structure (1) or (2), is that matching points can be determined with greater precision than when matching using binary data, and thus a plurality of images can be joined precisely.

As discussed above, a further image processing device according to the present invention is equivalent to structure (3), in which, further, the matching data is a difference between maximum and minimum brightness values of each group of pixels within the matrix (hereinafter referred to as "structure (4)").

Consequently, since pattern matching is performed using matching data which are differences between maximum and minimum brightness values of each group of pixels within the matrix, an effect of structure (4), in addition to those of structure (3), is that highly precise matching points, which are not influenced by the type of original image (written characters, photograph, or halftone dot image) can be determined for use in joining a plurality of images.

As discussed above, a further image processing device according to the present invention is equivalent to structure (3), in which, further, the matching data is a difference between maximum and minimum density values of each group of pixels within the matrix (hereinafter referred to as "structure (5)").

Consequently, since pattern matching is performed using matching data which is a difference between maximum and minimum density values of each group of pixels within the matrix, an effect of structure (5), in addition to those of structure (3), is that highly precise matching points, which are not influenced by the type of original image (written characters, photograph, or halftone dot image) can be determined for use in joining a plurality of images.

As discussed above, a further image processing device according to the present invention is equivalent to any one of structures (1) through (5), in which, further, the joining means include matching point extracting means, which extract matching points necessary for joining from the matching data produced by the matching data producing means, and address producing means which, based on the matching points, produce addresses in the memory means for joining the inputted images, in which the address producing means divide into a plurality of reference areas the image data of one of the two inputted images to be joined, and produce addresses which set in the image data of the other image pattern matching areas corresponding to the reference areas (hereinafter referred to as "structure (6)").

Consequently, the address producing means divide the image data of one of the images (reference image) into a plurality of areas, and set corresponding pattern matching areas of the image data of the other image (search image), and thus a plurality of matching points can be found. Accordingly, an effect of structure (6), in addition to those of any one of structures (1) through (5), is to contribute to improvement of matching precision.

Moreover, when several reduced images are produced and used for matching in levels, by dividing the reference image into several areas, and performing pattern matching in corresponding areas of the search image, the scale of the joining processing circuit can be reduced to 1/n, where n is the number of areas. As a result, a further effect is to contribute to reduction of cost.

As discussed above, a further image processing device according to the present invention is equivalent to structure (6), in which, further, the areas are rectangular in shape (hereinafter referred to as "structure (7)"). By making the areas of division rectangular in this way, the images can be quickly divided into a plurality of areas. As a result, pattern matching can be carried out accurately and quickly.

As discussed above, in a further image processing device according to the present invention, the joining means include matching point extracting means, which extract matching points necessary for joining from the matching data stored in the second memory means; and address producing means, which, based on the matching points, produce addresses in the second and third memory means for joining the inputted images, such that the addresses in the second and third memory means correspond to each other by pixel; in which binary data corresponding to image data of the two inputted images, stored in the third memory means, is joined in accordance with the addresses in the second and third memory means obtained by the address producing means (hereinafter referred to as "structure (8)").

Consequently, since the addresses in the second memory means (which store multivalue matching data) and the third memory means (which store binary synthesis data) correspond with each other by pixel, and thus the binary synthesis data can be joined smoothly using the matching points by pattern matching using the multivalue matching data. Accordingly, an effect of the present structure (8) is to help increase the speed of image joining processing.

As discussed above, a further image processing device according to the present invention is equivalent to structure (8), in which, further, the matching point extracting means extract matching points by matching in levels, in which a predetermined quantity of matching data stored in the second memory means is reduced at several different reduction rates, the matching data reduced at each reduction rate is pattern-matched in order of decreasing reduction rate, reducing the size of the area to be pattern matched for each decrease in reduction rate, and the matching points resulting from matching at each reduction rate are used as the addresses (hereinafter referred to as "structure (9)").

Consequently, since the matching point extracting means extract matching points by means of matching in levels, in which a predetermined quantity of matching data stored in the second memory means is reduced at several different reduction rates, the matching data reduced at each reduction rate is pattern-matched in order of decreasing reduction rate, reducing the size of the area to be pattern matched for each decrease in reduction rate, and the matching points resulting from pattern matching on each level are used as the addresses, an effect of the present structure (9), in addition to those of structure (8), is that pattern matching can be performed precisely and at high speed.

In other words, with the foregoing structure, since reduced images are produced, and the area pattern-matched is reduced in size as the rate of reduction decreases, the precision of pattern matching is greatly improved, and the number of joining processing calculations greatly reduced to, for example, approximately 1/3000 over pattern matching performed using a predetermined quantity of search image data at full size. As a result, the speed of pattern matching processing can be greatly increased.

Further, when performing matching in levels, it is preferable to divide the reference image into several areas, and to perform pattern matching in corresponding areas of the search image. By this means, the scale of the joining processing circuit can be reduced to 1/n, where n is the number of areas, in comparison with a joining processing circuit which performs pattern matching of the matching data at full size without reduction thereof. As a result, a further effect is to contribute to reduction of cost.

As discussed above, a further image processing device according to the present invention is equivalent to structure (8), in which, further, the matching point extracting means divide into a plurality of areas the matching data stored in the second memory means, perform pattern matching thereof, and, for matching points obtained thereby, set a threshold value for the result of pattern matching calculations, and, if a given matching point is less than or equal to the threshold value, judge that area to be all white or all black, and do not output the given matching point to the address producing means (hereinafter referred to as "structure (10)").

Consequently, by dividing the matching data into a plurality of areas, and, for matching points obtained by pattern matching thereof, setting a threshold value for the result of pattern matching calculations, and when the result is less than or equal to the threshold value, judging that area to be all white or all black, that area can be omitted from pattern matching when matching in levels. Thus, in addition to the effects of structure (8), an effect of the present structure (10) is to further increase processing speed.

As discussed above, a further image processing device according to the present invention is equivalent to structure (8), in which, further, when an area is judged to be all white or all black, the matching point extracting means use linear approximation to find a middle point between areas above and below the all-white or all-black area, and output the found point to the address producing means as the matching point of the area judged all white or all black (hereinafter referred to as "structure (11)").

Consequently, in addition to the effects of structure (8), an effect of the present structure (11) is that, when an area has low density difference and is not used as a matching point, a matching point can be found for that area by linearly approximating a middle point between the matching points of areas above and below that area, and using the found point as the matching point of that area, and suitable joining can be performed.

As discussed above, a further image processing device according to the present invention is equivalent to any one of structures (8) through (11), in which, further, when joining the synthesis data, the address producing means produce addresses, for the matching points obtained by the matching point extracting means by pattern matching the matching data divided into a plurality of areas, which correct inclination of an inputted image which inclined at the time of input by the input means (hereinafter referred to as "structure (12)").

Generally, a user does not necessarily position an original document exactly vertically or horizontally with respect to the scanner (input means). However, correcting inclination of an original image by detecting inclination and rotating the entire image greatly increases processing time and circuit scale, thus increasing cost.

With the present structure (12), however, when joining the synthesis data by producing addresses for the matching points obtained by dividing the matching data into a plurality of areas and pattern matching thereof, the address producing means produce addresses which correct inclination of an image which was inclined at the time of input by the input means, i.e., the image us divided into rectangles, a matching point is calculated for each rectangle, the address producing means (CPU) calculate the inclination of the rectangles alone, and the joining processing section produces addresses in the synthesis memory. Accordingly, in addition to the effects of any one of structures (8) through (11), inclination of the original image can be corrected when the images are joined.

Consequently, even if an original document is inclined, since the inclined image is read and inclination of the read image corrected, there is no need for image inclination detecting means, and circuit scale can be reduced.

As discussed above, a further image processing device according to the present invention is equivalent to any one of structures (10) through (12), in which, further, the areas are rectangular in shape (hereinafter referred to as "structure (13)").

With the foregoing structure, by making the areas for division rectangular, the images can be quickly divided into a plurality of areas. As a result, pattern matching can be carried out accurately and quickly.

As discussed above, a further image processing device according to the present invention is equivalent to structure (10), in which the matching point extracting means are provided with control means, which control whether to output the matching points obtained for each area to the address producing means according to the proportion, with respect to the total number of areas, of areas judged to be all white or all black; in which the control means perform image processing to join the inputted images using the matching points corresponding to the respective areas when the proportion is less than a predetermined value, and to place the inputted images adjacent to one another, without joining, when the proportion is greater than or equal to the predetermined value (hereinafter referred to as "structure (14)").

Consequently, by enabling automatic or manual control of whether the original images are joined or merely placed adjacent to one another based on the proportion, with respect to the total number of rectangles, of rectangles rejected for use as matching points, an effect of the present structure (14) is to enable, for example, two original images of A4 size, formed by opening a book of A4 size, to be placed adjacent to one another and recorded on A3 size paper, even if joining mode is set.

As discussed above, a further image processing device according to the present invention is equivalent to structure (14), in which, further, the areas are rectangular in shape (hereinafter referred to as "structure (15)").

Consequently, in addition to the effects of structure (14), by making the areas for division rectangular, the images can be quickly divided into a plurality of areas. As a result, pattern matching can be carried out accurately and quickly.

As discussed above, a further image processing device according to the present invention is equivalent to any one of structures (1) through (15), in which, further, the output means are a printing device.

Consequently, since an original image larger than the scanner size can be read in a plurality of scans and output by printing an image joined (recreated) in a desired size, there is no longer any need to prepare unprofessional printed matter by cutting and pasting by hand.

As discussed above, a further image processing device according to the present invention is made up of original image scanning input means, which input an original image as a plurality of partial original images by scanning the original image in a plurality of scans; matching determining means, which, on the basis of predetermined edge domains of the respective partial original images inputted by the original image scanning input means, determine a matching relationship between the respective partial original images; and image recreating means, which recreate a single original image from the partial original images on the basis of the matching relationship between the partial original images determined by the matching determining means; in which the matching determining means match the two partial original images using a predetermined edge domain image of one partial original image as a standard, by moving a predetermined edge domain image of the other partial original image in a longitudinal direction of the edge domain, and then, in an area of misalignment created by the movement, add white image data to the matching relationship between the two partial original images (hereinafter referred to as "structure (17)").

Consequently, the joining processed image, recreated as a single original image by the image recreating means, can be faithfully recreated from the large original document onto paper of a desired size, and thus shadows of the original document, black images outside the edges of the original document, etc., arising at the time of scanning the original document in a plurality of scans due to misalignment with the original setting position, can be prevented from being recreated as black images when the partial original images are recreated as a single original image.

Accordingly, an effect of the present structure (17) is that a plurality of partial original images can be recreated as a single image faithfully and with high quality.

As discussed above, a further image processing device according to the present invention is equivalent to structure (17), in which, further, a quantity of movement in a longitudinal direction of the predetermined edge domain of one partial original image required to match it with the standard of the predetermined edge domain of the other partial original image is managed by the matching determining means as the matching relationship between the partial original images (hereinafter referred to as "structure (18)").

With the foregoing structure, in addition to the effects of structure (17), since a quantity of movement in a longitudinal direction of the predetermined edge domain of one of the partial original image required to match it with the standard of the predetermined edge domain of the other partial original image is managed by the matching determining means as the matching relationship between the partial images. For this reason, the image recreating means join the second partial original image to the partial original image used as a standard based on the quantity of movement.

By this means, when joining the two partial original images to form a single image, recreating of the original image can be adjusted in accordance with quantity of movement necessary to join the two partial original images, so that the second partial original image joins with the partial original image used as a standard.

Accordingly, an effect of the present structure (18) is to enable join one partial original image to the other with certainty, thus recreating them as a single original image.

By, for example, regulating the timing of reading out from the image memory of the second partial original image in accordance with the quantity of misalignment between matching images obtained by matching, the second partial original image can be joined, through a connecting image obtained by joining processing (matching), to the partial original image used as a standard, thus forming a single image. In this case, processing time from reading of the original images through output can be shortened in comparison with a method in which the partial original images are first recreated as a single image in memory and then outputted.

As discussed above, a further image processing device according to the present invention is equivalent to either structure (17) or (18), further including paper size indicating means for indicating the size of paper on which the original image is to be recreated, in which the image recreating means recreate and record the original image in the center of paper of the size indicated by the paper size indicating means (hereinafter referred to as "structure (19)").

Consequently, in addition to the effects of structure (17) or (18), the original image is recreated and recorded on paper of the size indicated by the paper size indicating means, and, when recreating a single original image from the two partial original images based on a matching relationship therebetween determined by the matching determining means, the original image is recreated in the center of the paper of the size indicated by the paper size indicating means. For this reason, the position of the image is controlled so that the center of the joined image and the center of the paper on which the image is to be recorded substantially coincide.

By this means, an effect of the present structure (19) is that, regardless of the positioning of the original document on the original placement stand, the original image recreated as a single image is formed substantially in the center of paper of a desired size, and thus off-center images can be eliminated from the outputted copies.

As discussed above, a further image processing device according to the present invention is equivalent to any one of structures (17) through (19), further including processing status display means, which display the progress of processing in the matching determining means for determining the matching relationship between the partial original images; processing time managing means, which manage the determining processing time required for processing in the matching determining means for determining the matching relationship between the partial original images; and control means, which, when the processing time managing means confirm that a predetermined length of time has passed, suspend processing by the matching determining means, and display on the processing status display means the fact that the processing has been suspended (hereinafter referred to as "structure (20)").

Consequently, in addition to the effects of any one of structures (17) through (19), when the processing time managing means confirm that the predetermined length of time has passed, the control means suspend joining processing by the matching determining means, and display on the processing status display means the fact that joining processing has been suspended. Accordingly, an effect of the present structure (20) is that, when the conditions of scanning at the time of input are not appropriate, and processing requires an inordinately long time, the user can be encouraged to re-scan the original document under more suitable conditions, and thus the user is not made to wait to no purpose.

As discussed above, a further image processing device according to the present invention is made up of original image scanning input means, which input an original image as a plurality of partial original images by scanning the original image in a plurality of scans; first scaling means, which perform reduction/enlargement, at a previously set first scaling rate, of the partial original images inputted by the original image scanning input means; matching determining means, which, on the basis of predetermined edge domains of each partial original image reduced or enlarged by the first scaling means, determine a matching relationship between the respective partial original images; image recreating means, which recreate a single original image from the partial original images on the basis of the matching relationship between the partial original images determined by the matching determining means; indicating means, which indicate a size for the original image recreated by the image recreating means; and second scaling means, which determine a second scaling rate from the image size indicated by the indicating means and the size of the original image recreated by the image recreating means, and perform reduction/enlargement, at the second scaling rate, of the partial original images inputted by the original image scanning input means (hereinafter referred to as "structure (21)").

Consequently, instead of providing a digital copy machine with the expensive functions of algorithms corresponding to images of all sizes, pattern matching algorithms may be installed as an inexpensive single function, thus avoiding increased costs.

Further, since complex algorithms are not used, processing time is shortened, and image output speed need not be reduced for this processing.

Moreover, since the joined image can be stored, recreated, and outputted in the paper size desired by the user, a large original can be copied onto paper of a desired size.

As discussed above, a further image processing device according to the present invention is equivalent to structure (21), in which, further, the first scaling rate used in reduction/enlargement by the first scaling means is set based on a relationship between an original document size able to be inputted by the original scanning input means in each scan and the maximum image size able to be recreated by the image recreating means (hereinafter referred to as "structure (22)").

Consequently, in addition to the effects of structure (21), the first scaling rate, i.e., the scaling rate used in joining processing of the partial images read in N scans, is set from a relationship between a size of N times the maximum original placement stand size and the maximum paper size onto which images can be recorded.

By this means, since read and inputted original images are always reduced, the data quantity of the original images can be reduced, and as a result, less memory capacity is necessary, and data transfer goes smoothly.

Further, since less processing time is required to determine a matching relationship between the partial original images based on predetermined edge domains of each partial original image inputted by the original scanning input means, i.e., since pattern matching requires less time, another effect of the present structure (22) is that the time from reading through output can be shortened.

As discussed above, a further image processing device according to the present invention is made up of original image scanning input means, which input an original image as a plurality of partial original images by scanning the original image in a plurality of scans; matching determining means, which, on the basis of predetermined edge domains of the respective partial original images inputted by the original image scanning input means, determine a matching relationship between the respective partial original images; and image recreating means, which recreate a single original image from the partial original images on the basis of the matching relationship between the partial original images determined by the matching determining means; in which the matching determining means include edge domain image extracting means, which extract images of predetermined edge domains of the partial original images; matching processing means, which perform matching processing, in a matrix of predetermined size, of each edge domain image extracted by the edge domain image extracting means; and directing means, which, during matching processing by the matching processing means, direct the matching processing means to divide the matrix into a first number of areas and perform a first matching processing, and then, based on the results of the first matching processing, to divide the matrix into a second number of areas greater than the first number of areas, and perform a second matching processing (hereinafter referred to as "structure (23)").

Consequently, processing time for pattern matching of a connecting domain where the two partial original images meet can be shortened, and, as a result, image processing time in the image processing device can be greatly shortened.

As discussed above, a further image processing device according to the present invention is equivalent to structure (23), in which, further, the matching processing means, after performing the foregoing matching processing, perform matching of areas of the matrix of predetermined size in which a predetermined change in density is found.

Consequently, in addition to the effects of structure (23), since a more detailed matching processing is performed for those areas of the matrix of predetermined size for which a predetermined change in density is found, an effect of the foregoing structure is to shorten the processing time for pattern matching of the connecting domain where the two partial original images meet.

As discussed above, a further image processing device according to the present invention is equivalent to structure (23), in which, further, the matching processing means, based on a standard of a predetermined threshold value, extract feature points of each area of the matrix of predetermined size, perform matching processing based on the extracted feature points, and, if it is determined that matching processing has not been completed within a predetermined length of time, change the predetermined threshold value which is the standard for extracting the feature points.

Consequently, in addition to the effects of structure (23), since the threshold value (density difference) which is the standard for extracting the feature points is changed if matching processing cannot be completed within a predetermined length of time, an effect of the foregoing structure is that pattern matching of the connecting domain where the two partial original images meet can be performed with certainty.

As discussed above, a further image processing device according to the present invention is equivalent to structure (23), in which, further, the matching processing means, based on a standard of a predetermined threshold value, extract feature points of each area of the matrix of predetermined size, perform matching processing based on the extracted feature points, and, if it is determined that matching processing has not been completed within a matching processing time set for each original document size, change the predetermined threshold value which is the standard for extracting the feature points.

Consequently, in addition to the effects of structure (23), since the threshold value (density difference) which is the standard for extracting the feature points is changed if matching processing cannot be completed within a predetermined length of time determined according to the original document size, an effect of the foregoing structure is that pattern matching of the connecting domain where the two partial original images meet can be performed with certainty, in accordance with the original document size.

As discussed above, a further image processing device according to the present invention is made up of original image scanning input means, which input an original image as a plurality of partial original images by scanning the original image in a plurality of scans; matching determining means, which, on the basis of predetermined edge domains of the respective partial original images inputted by the original image scanning input means, determine a matching relationship between the respective partial original images; and image recreating means, which recreate a single original image from the partial original images on the basis of the matching relationship between the partial original images determined by the matching determining means; in which the matching determining means include edge domain image extracting means, which extract images of predetermined edge domains of each partial original image; matching processing means, which perform matching processing, in a matrix of predetermined size, of each edge domain image extracted by the edge domain image extracting means; and control means, which, during matching of the edge domain images by the matching processing means, perform control such that the image recreating means commence recreating part of the original image with a predetermined timing (hereinafter referred to as "structure (27)").

Consequently, an effect of the present structure (27) is that, in comparison with a case in which the two partial original images are joined by successive recording, the time required for joining the two partial original images and outputting them as a single image can be shortened.

As discussed above, a further image processing device according to the present invention is equivalent to structure (27), in which, further, the control means control the image recreating means such that one of the partial original images inputted by the original scanning input means is recreated and recorded successively, beginning with an end thereof opposite an end from which the edge domain image extracting means extracted an edge domain image.

Consequently, in addition to the effects of structure (27), since joining of the two partial original images is carried out while one of the partial original images is read out successively from an end thereof opposite the end which meets the other partial original image, by the time the area where the two partial original images meet is ready for recording, the partial original image preceding that area has been recorded. Accordingly, an effect of the foregoing structure is to shorten the time required to join the two partial original images and output them as a single image.

As discussed above, a further image processing device according to the present invention is equivalent to structure (27), in which, further, the control means control the image recreating means such that one of the partial original images inputted by the original scanning input means is recreated and recorded successively, beginning with an end thereof opposite an end from which the edge domain image extracting means extracted an edge domain image, onto paper transported in a longitudinal direction of the edge domain.

Consequently, in addition to the effects of structure (27), paper is supplied to the recording section in a longitudinal orientation, and since joining of the two partial original images is carried out while one of the partial original images is read out successively from an end thereof opposite the end thereof which meets the other partial original image, and thereafter, first the area where the two partial original images meet and then the other partial original image are recorded. Accordingly, by the time the area where the two partial original images meet is ready for recording, the partial original image preceding that area has been recorded, and thus an effect of the foregoing structure is to shorten the time required to join the two partial original images and output them as a single image.

As discussed above, a further image processing device according to the present invention is equivalent to structure (27), in which, further, the control means control a timing with which the image recreating means commence recreating part of an original image on the basis of the size of the original image (hereinafter referred to as "structure (30)").

Consequently, in addition to the effects of structure (27), the timing with which recording of one of the partial original images is begun, during confirmation of matching between the partial original images, is controlled on the basis of the size of the original document, and thus an effect of the present structure (30) is to shorten the time needed to join the two partial original images and output them as a single original image, without being influenced by the size of the original image being processed.

As discussed above, a further image processing device according to the present invention is equivalent to structure (30), in which, further, the timing with which the image recreating means begin recreating part of an original image is a time at which a number of matching candidates in the matrix reaches a predetermined number (hereinafter referred to as "structure (31)").

With the foregoing structure, in addition to the effects of structure (30), recording of one partial original image is begun when a predetermined number of matching candidates is found in the matrix of predetermined size for confirmation of matching between the two partial original images.

Consequently, an effect of the present structure (31) is to shorten the time needed to join the two partial original images and output them as a single original image, and to eliminate problems such as stoppage of recording of an original image because joining processing is not completed by the completion of recording of one partial original image.

As discussed above, a further image processing device according to the present invention is equivalent to structure (31), in which, further, the number of matching candidates used as a standard is changed according to the size of the original image.

With the foregoing structure, in addition to the effects of structure (31), recording of one partial original image is begun when a predetermined number of matching candidates is found in the matrix of predetermined size for confirmation of matching between the two partial original images, and the predetermined number is changed according to the size of the original image being processed.

Consequently, an effect of the foregoing structure is to shorten the time needed to join the two partial original images and output them as a single original image, without being influenced by the size of the original image, and to eliminate problems such as stoppage of recording of an original image because joining processing is not completed by the completion of recording of one partial original image.

As discussed above, a further image processing device according to the present invention is made up of original image scanning input means, which input an original image as a plurality of partial original images by scanning the original image in a plurality of scans; matching determining means, which, on the basis of predetermined edge domains of the respective partial original images inputted by the original image scanning input means, determine a matching relationship between the respective partial original images; and image recreating means, which recreate a single original image from the partial original images on the basis of the matching relationship between the partial original images determined by the matching determining means; in which the matching determining means include joining means, which join two partial original images using a predetermined edge domain image of one partial original image as a standard, by moving a predetermined edge domain image of the other partial original image in a longitudinal direction of the edge domain; misalignment quantity detecting means, which detect a quantity of misalignment between the edge domain image determined by the joining means to be the standard, and the other edge domain image; and original image shifting/recreating means, which, during recreating of the original image by the image recreating means, shift one partial original image based on the quantity of misalignment detected by the misalignment quantity detecting means, such that the two partial original images align.

Consequently, an effect of the foregoing structure is to shorten the time required to join the two partial original images and output them as a single image, and since there is no need for processing to shift the entirety of the misaligned partial original image in the memory in accordance with the quantity of misalignment where the two partial original images meet, joining processing itself can also be completed in a short time.

The embodiments and concrete examples of implementation discussed in the foregoing detailed explanation of the present invention serve solely to illustrate the technical contents of the present invention, which should not be narrowly interpreted within the limits of such concrete examples, but rather may be applied in many variations without departing from the spirit of the present invention and the scope of the patent claims set forth below.

What is claimed is:

1. An image processing device comprising:

input means, which read a plurality of images and input each image as multivalue digital image data;

matching data producing means, which produce matching data for joining the inputted images;

binarizing means, which binarizes the multivalue digital image data inputted by said input means, thus obtaining binary data corresponding to image date of each inputted image;

joining means, which, on the basis of the matching data produced by said matching data producing means, synthesize the inputted images into a single image by joining the binary data for the inputted images, obtained by the binarizing means; and output means, which output the single image synthesized by said joining means;

wherein said matching data producing means produce the matching data from the multivalue digital image data inputted by said input means.

2. The image processing device set forth in claim 1, further comprising:

first memory means, for storing the multivalue digital image data inputted by said input means;

second memory means, for storing the matching data produced by said matching data producing means; and third memory means, for storing, as image data for synthesis, the binary data for the inputted images, obtained by said binarizing means;

wherein said matching data producing means produce the matching data on the basis of the multivalue digital image data stored in said first memory means, and said joining means join the binary data for the inputted images, stored in said third memory means, on the basis of the matching data stored in said second memory means.

3. The image processing device set forth in claim 2, wherein said joining means include:

matching point extracting means, which extract matching points necessary for joining from the matching data stored in said second memory means; and address producing means, which, based on the matching points, produce addresses in said second and third memory means for joining the inputted images, such that the addresses in said second and third memory means correspond to each other by pixel;

wherein the binary data corresponding to image data of the two inputted images, stored in said third memory means, is joined in accordance with the addresses in said second and third memory means obtained by said address producing means.

4. The image processing device set forth in claim 3, wherein:

said matching point extracting means extract matching points by matching in levels, in which a predetermined quantity of matching data stored in said second memory means is reduced at several different reduction rates, the matching data reduced at each reduction rate is pattern-matched in order of decreasing reduction rate, reducing the size of the area to be pattern matched for each decrease in reduction rate, and the matching points resulting from matching at each reduction rate are used as the addresses.

5. The image processing device set forth in claim 3, wherein:

said matching point extracting means divide into a plurality of areas the matching data stored in said second memory means, perform pattern matching thereof, and, for matching points obtained thereby, set a first threshold value for the result of pattern matching calculations, and, if a given matching point is less than or equal to the first threshold value, judge that area to be all white or all black, and do not output the given matching point to said address producing means.

6. The image processing device set forth in claim 5, wherein:

said matching point extracting means divide into a plurality of areas the matching data stored in said second memory means, perform pattern matching thereof to obtain matching points of the respective areas, and output to said address producing means matching points of areas in which a pattern matching calculation result does not exceed a second threshold value greater than the first threshold value, but do not output to said address producing means matching points of areas in which the pattern matching calculation result exceeds the second threshold value.

7. The image processing device set forth in claim 6, wherein:

when the pattern matching calculation result for a given area is less than or equal to the first threshold value, or greater than or equal to the second threshold value, said matching point extracting means output to said address producing means, as the matching point for the given area, a middle point between matching points of areas above and below the given area.

8. The image processing device set forth in claim 5, wherein:

when an area corresponding to a matching point is judged to be all white or all black, said matching point extracting means use linear approximation to find a middle point between matching points of areas above and below the area judged all white or all black, and output the found point to said address producing means as the matching point of the area judged all white or all black.

9. The image processing device set forth in claim 5, wherein:

said matching point extracting means include control means, which control whether to output to said address producing means matching points obtained for areas according to a proportion, with respect to the total number of areas, of areas judged to be all white or all black;

wherein said control means perform image processing to join the inputted images using the matching points corresponding to the respective areas when the proportion is less than a predetermined value, and to place the inputted images adjacent to one another, without joining, when the proportion is greater than or equal to the predetermined value.

10. The image processing device set forth in claim 5, wherein:

the areas are rectangular in shape.

11. The image processing device set forth in claim 9, wherein:

the areas are rectangular in shape.

12. The image processing device set forth in claim 3, wherein:

when joining the synthesis data, said address producing means produce addresses, for the matching points obtained by said matching point extracting means by pattern matching the matching data divided into a plurality of areas, which correct inclination of an inputted image which inclined at the time of input by said input means.

13. The image processing device set forth in claim 1, wherein:

said matching data producing means perform matrix processing of the image data inputted by said input means, in which a matrix is used to divide the image data into a plurality of groups of pixels, and produce the matching data on the basis of the data of each group of pixels within the matrix.

14. The image processing device set forth in claim 13, wherein:

the matching data is a difference between maximum and minimum brightness values of each group of pixels within the matrix.

15. The image processing device set forth in claim 13, wherein:

the matching data is a difference between maximum and minimum density values of each group of pixels within the matrix.

16. The image processing device set forth in claim 1, further comprising memory means;

wherein said joining means include:

matching point extracting means, which extract matching points necessary for joining from the matching data produced by said matching data producing means; and address producing means, which, based on the matching points, produce addresses in said memory means for joining the inputted images; and wherein said address producing means divide into a plurality of reference areas the image data of one of the two inputted images to be joined, and produce addresses which set, in the image data of the other image, pattern matching areas corresponding to the reference areas.

17. The image processing device set forth in claim 16, wherein:

the respective areas are rectangular in shape.

18. The image processing device set forth in claim 1, wherein said joining means include:

matching point extracting means, which extract matching points necessary for joining by dividing the matching data for each inputted image into a plurality of areas, and performing pattern matching of each area.

19. The image processing device set forth in claim 1, wherein:

said output means are a printing device.

20. The image processing device set forth in claim 1, wherein:

said input means read as the plurality of input images a plurality of extents of an original image which mutually overlap in part;

said matching data producing means produce the matching data for an inputted image on the basis of image data, among the multivalue digital image data corresponding to the inputted image, which corresponds to part of the inputted image overlapping with another inputted image; and said joining means synthesize the inputted images so as to recreate the original image.

21. An image processing device comprising:

original image scanning input means, which input an original image as a plurality of partial original images by scanning the original image in a plurality of scans;

matching determining means, which, on the basis of predetermined edge domains of the respective partial original images inputted by said original image scanning input means, determine a matching relationship between the respective partial original images; and image recreating means, which recreate a single original image from the partial original images on the basis of the matching relationship between the partial original images determined by said matching determining means;

wherein said matching determining means match the two partial original images using a predetermined edge domain image of one partial original image as a standard, by moving a predetermined edge domain image of the other partial original image in a longitudinal direction of the edge domain, and then add white image data in an area of misalignment created by the movement.

22. The image processing device set forth in claim 21, wherein:

a quantity of movement in a longitudinal direction of the predetermined edge domain of one partial original image required to match it with the standard of the predetermined edge domain of the other partial original image is treated by said matching determining means as the matching relationship between the partial original images.

23. The image processing device set forth in claim 21, further comprising:

paper size indicating means for indicating the size of paper on which the original image is to be recreated;

wherein said image recreating means recreate and record the original image in the center of paper of the size indicated by said paper size indicating means.

24. The image processing device set forth in claim 21, further comprising:

processing status display means, which display the progress of processing in said matching determining means for determining the matching relationship between the partial original images;

processing time managing means, which manage determining processing time required for processing in said matching determining means for determining the matching relationship between the partial original images; and control means, which, when said processing time managing means confirm that a predetermined length of time has passed, suspend processing by said matching determining means, and display on said processing status display means the fact that the processing has been suspended.

25. An image processing device comprising:

original image scanning input means, which input an original image as a plurality of partial original images by scanning the original image in a plurality of scans;

first scaling means, which perform reduction/enlargement, at a previously set first scaling rate, of the partial original images inputted by said original image scanning input means;

matching determining means, which, on the basis of predetermined edge domains of each partial original image reduced or enlarged by said first scaling means, determine a matching relationship between the respective partial original images;

image recreating means, which recreate a single original image from the partial original images on the basis of the matching relationship between the partial original images determined by said matching determining means;

indicating means, which indicate a size of the original image recreated by said image recreating means; and second scaling means, which determine a second scaling rate from the image size indicated by said indicating means and the size of the original image recreated by said image recreating means, and perform reduction/enlargement, at the second scaling rate, of the partial original images inputted by said original image scanning input means.

26. The image processing device set forth in claim 25, wherein:

the first scaling rate used in reduction/enlargement by said first scaling means is set based on a relationship between an original document size able to be inputted by said original scanning input means in each scan and the maximum image size able to be recreated by said image recreating means.

27. An image processing device comprising:

original image scanning input means, which input an original image as a plurality of partial original images by scanning the original image in a plurality of scans;

first scaling means, which perform reduction/enlargement, at a previously set first scaling rate, of the partial original images inputted by said original image scanning input means;

matching determining means, which, on the basis of predetermined edge domains of each partial original image reduced or enlarged by said first scaling means, determine a matching relationship between the respective partial original images;

image synthesis means, which synthesize a single synthesized image from the partial original images on the basis of the matching relationship between the partial original images determined by said matching determining means;

image recreating means, which recreate the original image from the synthesized image;

indicating means, which indicate a size of the original image recreated by said image recreating means; and second scaling means, which perform reduction/enlargement of the synthesized image synthesized by said image synthesizing means at a second scaling rate, such that the synthesized image is reduced or enlarged to the size indicated by said indicating means.

28. An image processing device comprising:

original image scanning input means, which input an original image as a plurality of partial original images by scanning the original image in a plurality of scans;

matching determining means, which, on the basis of predetermined edge domains of the respective partial original images inputted by said original image scanning input means, determine a matching relationship between the respective partial original images; and image recreating means, which recreate a single original image from the partial original images on the basis of the matching relationship between the partial original images determined by said matching determining means;

wherein said matching determining means include:

edge domain image extracting means, which extract images of predetermined edge domains of the partial original images;

matching processing means, which perform matching processing, in a matrix of predetermined size, of each edge domain image extracted by said edge domain image extracting means; and directing means, which, during matching processing by said matching processing means, direct said matching processing means to divide the matrix into a first number of areas and perform a first matching processing, and then, based on the results of the first matching processing, to divide the matrix into a second number of areas greater than the first number of areas, and perform a second matching processing.

29. The image processing device set forth in claim 28, wherein:

said matching processing means, after performing the foregoing matching processing, perform matching of areas of the matrix of predetermined size in which a predetermined change in density is found.

30. The image processing device set forth in claim 28, wherein:

said matching processing means, based on a standard of a predetermined threshold value, extract feature points of each area of the matrix of predetermined size, perform matching processing based on the extracted feature points, and, if it is determined that matching processing has not been completed within a predetermined length of time, change the threshold value which is the standard for extracting the feature points.

31. The image processing device set forth in claim 28, wherein:

said matching processing means extract as feature points pixels, within the matrix of predetermined size, for which a difference in density between a pixel adjacent and on the right thereof and a pixel adjacent and therebelow exceeds a predetermined threshold value, and, if it is determined that matching processing has not been completed within a predetermined length of time, change the threshold value which is the standard for extracting the feature points.

32. The image processing device set forth in claim 28, wherein:

said matching processing means, based on a standard of a predetermined threshold value, extract feature points of each area of the matrix of predetermined size, perform matching processing based on the extracted feature points, and, if it is determined that matching processing has not been completed within a matching processing time set for each original document size, change the threshold value which is the standard for extracting the feature points.

33. The image processing device set forth in claim 28, wherein:

said matching processing means extract as feature points pixels, within the matrix of predetermined size, for which a difference in density between a pixel adjacent and on the right thereof and a pixel adjacent and therebelow exceeds a predetermined threshold value, and, if it is determined that matching processing has not been completed within a matching processing time set for each original document size, change the threshold value which is the standard for extracting the feature points.

34. An image processing device comprising:

original image scanning input means, which input an original image as a plurality of partial original images by scanning the original image in a plurality of scans;

matching determining means, which, on the basis of predetermined edge domains of the respective partial original images inputted by said original image scanning input means, determine a matching relationship between the respective partial original images; and image recreating means, which recreate a single original image from the partial original images on the basis of the matching relationship between the partial original images determined by said matching determining means;

wherein said matching determining means include:

edge domain image extracting means, which extract images of predetermined edge domains of each partial original image;

matching processing means, which perform matching processing, in a matrix of predetermined size, of each edge domain image extracted by said edge domain image extracting means; and control means, which, during matching of the edge domain images by said matching processing means, perform control such that said image recreating means commence recreating part of the original image with a predetermined timing.

35. The image processing device set forth in claim 34, wherein:

said control means control said image recreating means such that one of the partial original images inputted by said original scanning input means is recreated and recorded successively, beginning with an end thereof opposite an end from which said edge domain image extracting means extracted an edge domain image.

36. The image processing device set forth in claim 34, wherein:

said control means control said image recreating means such that one of the partial original images inputted by said original scanning input means is recreated and recorded successively, beginning with an end thereof opposite an end from which said edge domain image extracting means extracted an edge domain image, onto paper transported in a longitudinal direction of the edge domain.

37. The image processing device set forth in claim 34, wherein:

said control means control a timing with which said image recreating means commence recreating part of an original image on the basis of size of the original image.

38. The image processing device set forth in claim 37, wherein:

the timing with which said image recreating means begin recreating part of an original image is a time at which a number of matching candidates in the matrix reaches a predetermined number.

39. The image processing device set forth in claim 38, wherein:

the number of matching candidates used as a standard is changed according to size of the original image.

40. An image processing device comprising:

original image scanning input means, which input an original image as a plurality of partial original images by scanning the original image in a plurality of scans;

matching determining means, which, on the basis of predetermined edge domains of the respective partial original images inputted by said original image scanning input means, determine a matching relationship between the respective partial original images; and image recreating means, which recreate a single original image from the partial original images on the basis of the matching relationship between the partial original images determined by said matching determining means;

wherein said matching determining means include:

joining means, which join two partial original images using a predetermined edge domain image of one partial original image as a standard, by moving a predetermined edge domain image of the other partial original image in a longitudinal direction of the edge domain;

misalignment quantity detecting means, which detect a quantity of misalignment between the edge domain image determined by said joining means to be the standard, and the other edge domain image; and original image shifting/recreating means, which, during recreating of the original image by said image recreating means, shift one partial original image based on the quantity of misalignment detected by said misalignment quantity detecting means, such that the two partial original images align.

41. An image processing method comprising the steps of:

(a) scanning a plurality of images and inputting each image as multivalue digital image data;

(b) producing matching data for joining the respective inputted images;

(c) binarizing the multivalue digital image data for each inputted image, thus producing binary data corresponding to image data for each inputted image; and (d) synthesizing the inputted images into a single image by joining the binary data corresponding to the respective inputted images on the basis of the matching data;

wherein, in step (b), the matching data is produced from the multivalue digital image data inputted in said step (a).

42. The image processing method set forth in claim 41, wherein said step (d) includes the steps of:

(e) obtaining first and second matching data by reducing the matching data at different respective reduction rates, the first matching data having fewer pixels than the matching data, and the second matching data having fewer pixels than the matching data but more pixels than the first matching data;

(f) extracting matching points necessary for joining by performing pattern matching in first areas using the first matching data; and (g) extracting matching points by performing pattern matching in second areas, smaller than the first areas, in the vicinity of the matching points in the first areas.

* * * * *

UNITED STATES PATENT AND TRADEMARK OFFICE
CERTIFICATE OF CORRECTION

PATENT NO.    : 6,507,415 B1
DATED         : January 14, 2003
INVENTOR(S)   : Masanori Toyoda et al.

It is certified that error appears in the above-identified patent and that said Letters Patent is hereby corrected as shown below:

<u>Title page,</u>
Item [30], change "10036422" to read -- 10-36422 --.
Item [56], References Cited, U.S. PATENT DOCUMENTS, add:
-- 5,982,951    11/1999    Katayama        382/284
   6,128,416    10/2000    Oura            382/284
   4,712,134    12/1987    Murakami        358/213
   6,002,492    12/1999    Kamon           358/450
   5,721,624    02/1998    Kunashiro       358/450
   5,144,448    09/1992    Hornbaker III   358/213.13 --

Signed and Sealed this

Twenty-third Day of September, 2003

JAMES E. ROGAN
*Director of the United States Patent and Trademark Office*